(12) United States Patent
Fleizach et al.

(10) Patent No.: US 8,881,269 B2
(45) Date of Patent: Nov. 4, 2014

(54) DEVICE, METHOD, AND GRAPHICAL USER INTERFACE FOR INTEGRATING RECOGNITION OF HANDWRITING GESTURES WITH A SCREEN READER

(71) Applicant: Apple Inc., Cupertino, CA (US)

(72) Inventors: Christopher B. Fleizach, Santa Clara, CA (US); Darren C. Minifie, Cupertino, CA (US); Gregory F. Hughes, Cupertino, CA (US); Ryan N. Dour, San Francisco, CA (US); Ian M. Fisch, Santa Cruz, CA (US); Joel M. Lopes Da Silva, San Francisco, CA (US); Michael M. Pedersen, II, San Francisco, CA (US); Eric T. Seymour, San Jose, CA (US); Devang K. Naik, San Jose, CA (US); Ryan S. Dixon, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 13/710,385

(22) Filed: Dec. 10, 2012

(65) Prior Publication Data

US 2013/0263251 A1     Oct. 3, 2013

Related U.S. Application Data

(60) Provisional application No. 61/618,760, filed on Mar. 31, 2012.

(51) Int. Cl.
*G06F 21/36* (2013.01)
*G06F 3/0488* (2013.01)

(52) U.S. Cl.
CPC ............ *G06F 21/36* (2013.01); *G06F 3/04883* (2013.01)
USPC .............................................. 726/19; 345/175

(58) Field of Classification Search
CPC ....................................................... G06F 21/36

USPC .............................................. 726/19; 345/175
See application file for complete search history.

(56) References Cited

U.S. PATENT DOCUMENTS

| 4,746,770 A | 5/1988 | McAvinney |
| 5,053,758 A | 10/1991 | Cornett et al. |

(Continued)

FOREIGN PATENT DOCUMENTS

| DE | 43 40 679 | 6/1995 |
| EP | 0 776 097 A2 | 11/1996 |

(Continued)

OTHER PUBLICATIONS

American Thermoform Corp., "Touch Screen, Talking Tactile Tablet," downloaded Jul. 30, 2008, http://www.americanthermoform.com/tactiletablet.htm, 2 pages.

(Continued)

*Primary Examiner* — Saleh Najjar
*Assistant Examiner* — Oleg Korsak
(74) *Attorney, Agent, or Firm* — Morrison & Foerster LLP

(57) ABSTRACT

While an electronic device with a display and a touch-sensitive surface is in a screen reader accessibility mode, the device displays an application launcher screen including a plurality of application icons. A respective application icon corresponds to a respective application stored in the device. The device detects a sequence of one or more gestures on the touch-sensitive surface that correspond to one or more characters. A respective gesture that corresponds to a respective character is a single finger gesture that moves across the touch-sensitive surface along a respective path that corresponds to the respective character. The device determines whether the detected sequence of one or more gestures corresponds to a respective application icon of the plurality of application icons, and, in response to determining that the detected sequence of one or more gestures corresponds to the respective application icon, performs a predefined operation associated with the respective application icon.

20 Claims, 64 Drawing Sheets

(56) References Cited

U.S. PATENT DOCUMENTS

| | | | |
|---|---|---|---|
| 5,119,079 A | 6/1992 | Hube et al. | |
| 5,327,528 A | 7/1994 | Hidaka et al. | |
| 5,347,589 A * | 9/1994 | Meeks et al. | 382/119 |
| 5,488,204 A | 1/1996 | Mead et al. | |
| 5,502,803 A | 3/1996 | Yoshida et al. | |
| 5,761,485 A | 6/1998 | Munyan | |
| 5,832,528 A | 11/1998 | Kwatinetz et al. | |
| 5,943,043 A | 8/1999 | Furuhata et al. | |
| 6,046,722 A | 4/2000 | McKiel, Jr. | |
| 6,073,036 A | 6/2000 | Heikkinen et al. | |
| 6,088,023 A | 7/2000 | Louis et al. | |
| 6,115,482 A | 9/2000 | Sears et al. | |
| 6,128,007 A | 10/2000 | Seybold | |
| 6,211,856 B1 | 4/2001 | Choi et al. | |
| 6,246,983 B1 | 6/2001 | Zou et al. | |
| 6,384,743 B1 | 5/2002 | Vanderheiden | |
| 6,396,523 B1 | 5/2002 | Segal et al. | |
| 6,442,523 B1 | 8/2002 | Siegel | |
| 6,446,041 B1 | 9/2002 | Reynar et al. | |
| 6,466,203 B2 | 10/2002 | Van Ee | |
| 6,489,951 B1 | 12/2002 | Wong et al. | |
| 6,493,464 B1 * | 12/2002 | Hawkins et al. | 382/189 |
| 6,664,989 B1 | 12/2003 | Snyder et al. | |
| 6,765,557 B1 | 7/2004 | Segal et al. | |
| 6,926,609 B2 | 8/2005 | Martin | |
| 7,062,437 B2 | 6/2006 | Kovales et al. | |
| 7,098,896 B2 | 8/2006 | Kushler et al. | |
| 7,187,394 B2 | 3/2007 | Chandane | |
| 7,250,938 B2 | 7/2007 | Kirkland et al. | |
| 7,376,523 B2 | 5/2008 | Sullivan et al. | |
| 7,408,538 B2 | 8/2008 | Hinckley et al. | |
| 7,479,949 B2 | 1/2009 | Jobs et al. | |
| 7,603,621 B2 | 10/2009 | Toyama et al. | |
| 7,614,008 B2 | 11/2009 | Ording | |
| 7,637,421 B1 | 12/2009 | Trocme | |
| 7,657,849 B2 * | 2/2010 | Chaudhri et al. | 715/863 |
| 7,944,437 B2 | 5/2011 | Imamura | |
| 8,059,101 B2 | 11/2011 | Westerman et al. | |
| 8,103,554 B2 | 1/2012 | Tom | |
| 8,237,666 B2 | 8/2012 | Soo et al. | |
| 8,448,095 B1 | 5/2013 | Haussila et al. | |
| 8,452,600 B2 | 5/2013 | Fleizach | |
| 8,466,873 B2 | 6/2013 | Vertegaal et al. | |
| 8,493,344 B2 | 7/2013 | Fleizach et al. | |
| 8,681,106 B2 * | 3/2014 | Fleizach et al. | 345/173 |
| 8,707,195 B2 * | 4/2014 | Fleizach et al. | 715/773 |
| 2002/0046195 A1 | 4/2002 | Martin et al. | |
| 2002/0133350 A1 | 9/2002 | Cogliano | |
| 2003/0020754 A1 | 1/2003 | Berman | |
| 2003/0046082 A1 | 3/2003 | Siegel | |
| 2004/0263491 A1 | 12/2004 | Ishigki | |
| 2005/0134578 A1 | 6/2005 | Chambers et al. | |
| 2005/0216867 A1 | 9/2005 | Marvit et al. | |
| 2006/0119588 A1 | 6/2006 | Yoon et al. | |
| 2006/0230340 A1 | 10/2006 | Parsons et al. | |
| 2006/0242607 A1 | 10/2006 | Hudson | |
| 2007/0011011 A1 | 1/2007 | Cogliano | |
| 2007/0033543 A1 | 2/2007 | Ngari et al. | |
| 2007/0220444 A1 | 9/2007 | Sunday et al. | |
| 2007/0230748 A1 | 10/2007 | Foss | |
| 2007/0236475 A1 | 10/2007 | Wherry | |
| 2007/0262964 A1 | 11/2007 | Zotov et al. | |
| 2007/0268270 A1 | 11/2007 | Onodera et al. | |
| 2007/0268317 A1 | 11/2007 | Banay | |
| 2008/0027726 A1 | 1/2008 | Hansen et al. | |
| 2008/0114566 A1 | 5/2008 | Slotznick et al. | |
| 2008/0122796 A1 | 5/2008 | Jobs et al. | |
| 2008/0140413 A1 | 6/2008 | Millman et al. | |
| 2008/0165141 A1 | 7/2008 | Christie | |
| 2008/0300874 A1 | 12/2008 | Gavalda et al. | |
| 2008/0316183 A1 | 12/2008 | Westerman et al. | |
| 2009/0222770 A1 | 9/2009 | Chang | |
| 2009/0235203 A1 | 9/2009 | Iizuka | |
| 2009/0303187 A1 | 12/2009 | Pallakoff | |
| 2009/0313020 A1 | 12/2009 | Koivunen | |
| 2010/0001953 A1 | 1/2010 | Yamamoto et al. | |
| 2010/0063880 A1 | 3/2010 | Atsmon et al. | |
| 2010/0070281 A1 | 3/2010 | Conkie et al. | |
| 2010/0231541 A1 | 9/2010 | Cruz-Hernandez et al. | |
| 2010/0283742 A1 | 11/2010 | Lam | |
| 2010/0289757 A1 | 11/2010 | Budelli | |
| 2010/0306718 A1 | 12/2010 | Shim et al. | |
| 2010/0309147 A1 | 12/2010 | Fleizach et al. | |
| 2010/0309148 A1 | 12/2010 | Fleizach et al. | |
| 2010/0313125 A1 | 12/2010 | Fleizach et al. | |
| 2010/0324903 A1 | 12/2010 | Kurzweil et al. | |
| 2011/0050594 A1 | 3/2011 | Kim et al. | |
| 2011/0083104 A1 | 4/2011 | Minton | |
| 2011/0157028 A1 | 6/2011 | Stallings et al. | |
| 2011/0264452 A1 | 10/2011 | Venkataramu et al. | |
| 2011/0298723 A1 | 12/2011 | Fleizach et al. | |
| 2011/0302519 A1 | 12/2011 | Fleizach et al. | |
| 2011/0310026 A1 | 12/2011 | Davis et al. | |

FOREIGN PATENT DOCUMENTS

| | | |
|---|---|---|
| EP | 1 942 398 A1 | 7/2008 |
| JP | 63 271516 | 11/1988 |
| JP | 01 283621 | 11/1989 |
| JP | 02 244214 | 9/1990 |
| JP | 7 321889 | 12/1995 |
| JP | 09 190436 | 7/1997 |
| JP | 2001 147775 | 5/2001 |
| JP | 2003 316254 | 11/2003 |
| JP | 2004 151614 | 5/2004 |
| JP | 2005 010894 | 1/2005 |
| JP | 2006 501567 | 1/2006 |
| JP | 2006 134090 | 5/2006 |
| JP | 2007 095024 | 4/2007 |
| JP | 2008 508600 | 3/2008 |
| JP | 2009 093291 | 4/2009 |
| WO | WO 92/08183 | 5/1992 |

OTHER PUBLICATIONS

Apple.com, "VoiceOver," May 2009, http://www.apple.com/accessibility/vocieover, 5 pages.

Apple Inc., "iPad User Guide," Apple Inc., © 2010, 154 pages.

Appshopper, "GDial Free—Speed Dial with Gesture," appshopper.com, Mar. 25, 2009, http://appshopper.com/utilities/gdial-free-speed-dial-with-gesture, 2 pages.

CNET, "Sony Ericsson W910," posts, the earliest of which is Oct. 17, 2007, 4 pages, http://news.cnet.com/crave/?keyword=Sony+Ericsson+W910.

Esther, "GarageBand," AppleVis, Mar. 11, 2011, http://www.applevis.com/app-directory/music/garageband, 4 pages.

Frantz et al., "Design case history: Speak & Spell learns to talk," IEEE spectrum, Feb. 1982, 5 pages.

Immersion, "Haptics: Improving the Mobile User Experience through Touch," Immersion Corporation White Paper, © 2007 Immersion Corporation, 12 pages, http://www.immersion.com/docs/haptics_mobile-ue_nov07v1.pdf.

Jaques, R., "HP unveils Pocket PC for blind users," vnunet.com, Jul. 5, 2004, http://www.vnunet.com/vnunet/news/2125404/hp-unveils-pocket-pc-blind-users, 3 pages.

Joe, "Gesture commander—Amazing feature exclusive to Dolphin Browser," dolphin-browser.com, Jul. 27, 2010, http://dolphin-browser.com/2010/07/amazing-feature-exclusive-to-dolphin-browser-gesture-commander/, 3 pages.

Kane et al., "Slide Rule: Making Mobile Touch Screens Accessible to Blind People Using Multi-Touch Interaction Techniques," Proceedings of ACM SIGACCESS Conference on Computers and Accessibility, Halifax, Nova Scotia, Canada, Oct. 2008, 8 pages.

Kendrick, D., "The Touch That Means So Much: Training Materials for Computer Users Who are Deaf-Blind," AFB AccessWorld, Mar. 2005, vol. 6, No. 2, http://www.afb.org/afbpress/pub.asp?DocID=aw060207, 9 pages.

Law et al., "Ez Access Strategies for Cross-Disability Access to Kiosks, Telephones and VCRs," DINF (Disability Information Resources), Feb. 16, 1998, http://www.dinf.ne.jp/doc/english/Us_Eu/conf/csun_98/csun98_074.html, 6 pages.

(56) References Cited

OTHER PUBLICATIONS

Microsoft, "Pocket PC Device for Blind Users Debuts during National Disability Employment Awareness Month," Microsoft.com PressPass, Oct. 16, 2002, http://www.microsoft.com/presspass/features/2002/oct02/10-16ndeam.mspx, 4 pages.
Okada et al., "CounterVision: A Screen Reader with Multi-Access Interface for GUI," Proceedings of Technology and Persons With Disabilities Conference, Center on Disabilities, CSU Northridge, Mar. 1997, http://www.csun.edu/cod/conf/1997/proceedings/090.htm, 6 pages.
Raman, T., "Eyes-Free User Interaction," Google Research, Feb. 9, 2009, http://emacspeak.sf.net/raman, 25 pages.
tiresias.org, "Touchscreens," tiresias.org, Jul. 15, 2008, http://www.tiresias.org/research/guidelines/touch/htm.
Touch Usability, "Mobile," Mar. 12, 2009, http://www.touchusability.com/mobile/, 9 pages.
Vanderheiden, G., "Use of audio-haptic interface techniques to allow non visual access to touchscreen appliances," Sep., Oct. 1995, http://trace.wisc.edu/docs/touchscreen/chi_conf.htm, 9 pages.
Vanderheiden, G., "Universal Design and Assistive Technology in Communication and Information Technologies: Alternatives or Complements?" Assistive Technology: The Official Journal of RESNA, 1998, vol. 10, No. 1, 9 pages.
Vintage, "TSI Speech + & other speaking calculators," Vintage Calculators Web Museum, retrieved from the internet May 4, 2012, http://www.vintagecalculators.com/html/speech_.html, 6 pages.
Extended Search Report dated Sep. 27, 2012, received in European Patent Application No. 12154609.7, which corresponds to U.S. Appl. No. 12/565,744, 7 pages (Fleizach).
European Search Report and Written Opinion dated Jun. 29, 2012, received in European Patent Application No. 12154613.9, which corresponds to U.S. Appl. No. 12/565,744, 7 pages (Fleizach).
International Search Report and Written Opinion dated Jun. 22, 2011, received in International Application No. PCT/US2010/034109, which corresponds to U.S. Appl. No. 12/565,744, 17 pages (Fleizach).
International Search Report and Written Opinion dated Aug. 30, 2012, received in International Application No. PCT/US2012/040703, which corresponds to U.S. Appl. No. 13/221,833, 11 pages (Fleizach).
Office Action dated May 25, 2012, received in U.S. Appl. No. 12/565,744, 16 pages (Fleizach).
Final Office Action dated Dec. 6, 2012, received in U.S. Appl. No. 12/565,744, 18 pages (Fleizach).
Office Action dated Nov. 20, 2012, received in European Patent Application No. 10719502.6, which corresponds to U.S. Appl. No. 12/565,744, 5 pages (Fleizach).
Office Action dated Jul. 12, 2012, received in U.S. Appl. No. 12/565,745, 8 pages (Fleizach).
Notice of Allowance dated Nov. 26, 2012, received in U.S. Appl. No. 12/565,745, 9 pages (Fleizach).
Office Action dated Dec. 21, 2011, received in U.S. Appl. No. 12/795,633, 9 pages (Fleizach).
Office Action dated Aug. 30, 2012, received in U.S. Appl. No. 12/795,633, 13 pages (Fleizach).
Office Action dated Feb. 13, 2013, received in Austrialian Patent Application No. 2010259191, which corresponds to U.S. Appl. No. 12/565,744, 3 pages (Fleizach).

U.S. Appl. No. 10/826,878, filed Apr. 16, 2004, 61 pages (Migos).
U.S. Appl. No. 10/956,720, filed Oct. 1, 2004, 75 pages (Seymour).
U.S. Appl. No. 11/298,977, filed Dec. 9, 2005, 33 pages (Seymour).
U.S. Appl. No. 11/643,257, filed Dec. 20, 2006, 44 pages (Seymour).
U.S. Appl. No. 11/643,389, filed Dec. 20, 2006, 43 pages (Seymour).
U.S. Appl. No. 11/686,295, filed Mar. 14, 2007, 40 pages (Seymour).
Office Action dated Mar. 26, 2013, received in Austrialian Patent Application No. 2012200071, which corresponds to U.S. Appl. No. 13/710,385, 4 pages (Fleizach).
Office Action dated Apr. 10, 2013, received in Austrialian Patent Application No. 2012200073, which corresponds to U.S. Appl. No. 12/565,744, 4 pages (Fleizach).
Notice of Allowance dated Mar. 15, 2013, received in U.S. Appl. No. 12/565,745, 7 pages (Fleizach).
Office Action dated Apr. 25, 2013, received in U.S. Appl. No. 12/795,633, 14 pages (Fleizach).
Office Action dated Mar. 7, 2013, received in U.S. Appl. No. 12/795,635, 50 pages (Fleizach).
Notice of Allowance dated Feb. 11, 2013, received in U.S. Appl. No. 12/859,158, 14 pages Fleizach.
Invitation to Pay Additional Fees dated Jul. 22, 2013, received in International Patent Application No. PCT/US2013/033589, which corresponds to U.S. Appl. No. 13/710,385, 6 pages (Fleizach).
Notice of Acceptance dated Jun. 19, 2013, received in Australian Patent Application No. 2012200071, which corresponds to U.S. Appl. No. 12/665,744, 2 pages (Fleizach).
Office Action dated May 31, 2013, received in Japanese Patent Apclication No. 2012 513959, which corresponds to U.S. Appl. No. 12/565,744, 3 pages (Fleizach).
Office Action dated May 7, 2013, received in European Patent Application No. 12 154 613.9, which corresponds to U.S. Appl. No. 12/565,744, 6 pages (Fleizach).
Office Action dated May 31, 2013, received in Japanese Patent Application No. 2012-024483, which corresponds to U.S. Appl. No. 12/565,744, 2 pages (Fleizach).
Office Action dated May 27, 2013, received in Japanese Patent Application No. 2012 024484, which corresponds to U.S. Appl. No. 12/565,744, 5 pages (Fleizach).
Office Action dated May 7, 2013, received in Korean Patent Application No. 10-2012-7000663, which corresponds to U.S. Appl. No. 12/563,744, 1 page (Fieizach).
Office Action dated Jul. 19, 2013. received in U.S Appl. No. 12/565,746, 22 pages (Fleizach).
Office Action dated Jul. 25, 2013, received in U.S. Appl. No. 12/795,635, 46 pages (Fleizach).
International Search Report and Written Opinion dated Sep. 25, 2013, received in International Patent Application No. PCT/US2013/033589, which corresponds to U.S. Appl. No. 13/710,385, 20 pages (Fleizach).
Notice of Acceptance dated Jul. 8, 2013, received in Australian Patent Application No. 2012200073, which corresponds to U.S. Appl. No. 12/555,744 2 pages (Fleizach).
Office Action dated Jul. 19, 2013, received in U.S. Appl. No. 12/565,746, 22 pages (Fleizach).
Office Action dated Sep. 13, 2013, received in U.S. Appl. No. 13/221,833, 14 pages (Fleizach).

* cited by examiner

Vision

[The] ~512 revolutionary iPhone also includes an equally revolutionary screen reader, and other innovative accessibility features that make it easier to use for those with impaired vision.

553

VoiceOver

What makes VoiceOver on iPhone truly remarkable is that you control it using simple gestures that let you physically interact with items on screen. It's easy to learn and fun to use. Instead of memorizing hundreds of keyboard commands, or endlessly pressing tiny arrow keys to find what you're looking for, with VoiceOver, you simply touch the screen to hear a description of the Touch Screen 112

204

Multifunction Device 100

Figure 5AD

While an electronic device is in a locked, passcode-protected state with a screen reader accessibility mode turned on (A)

618 While the electronic device is in the locked, passcode-protected state with the screen reader accessibility mode turned on, detect a single finger gesture on the touch-sensitive surface at a location that corresponds to a character icon of the plurality of character icons; and, in response to detecting the single finger gesture on the touch-sensitive surface at the location that corresponds to the character icon, enter a respective character that corresponds to the character icon in a received passcode and forego outputting audible accessibility information associated with the respective character 620 Determine whether the detected sequence of gestures corresponds to the predefined sequence of characters in the passcode 622 In response to determining that the detected sequence of gestures does not correspond to the predefined sequence of characters in the passcode, maintain the electronic device in the locked, passcode-protected state with the screen reader accessibility mode turned on 624 In response to determining that the detected sequence of gestures corresponds to the predefined sequence of characters in the passcode, unlock the electronic device and maintain the electronic device in the screen reader accessibility mode 626 In response to determining that the detected sequence of gestures corresponds to the predefined sequence of characters in the passcode, cease to display the passcode screen 628 In response to determining that the detected sequence of gestures corresponds to the predefined sequence of characters in the passcode, cease to display the passcode screen and display an application launcher screen that includes a plurality of application icons 630 While displaying the passcode screen, forego outputting audible accessibility information associated with a respective character when the respective character is entered. While the electronic device is unlocked and in the screen reader accessibility mode, detect a single finger gesture on the touch-sensitive surface at a location that corresponds to a respective application icon of the application launcher screen, and, in response to detecting the single finger gesture, output audible accessibility information associated with the respective application icon.

Figure 6B

While an electronic device is in a screen reader accessibility mode

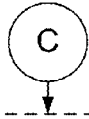

728 In response to determining that the detected sequence of one or more gestures does not correspond to any of the plurality of application icons, output audible accessibility information indicating that none of the plurality of application icons corresponds to the detected sequence of one or more gestures 730 While the electronic device is in the screen reader accessibility mode and the application launcher screen is displayed: display a first application icon of the plurality of application icons next to a second application icon of the plurality of application icons; display a current focus on the first application icon of the plurality of application icons; and detect a finger gesture on the touch-sensitive surface. The finger gesture is independent of contacting a location on the touch-sensitive surface that corresponds to the second application icon of the plurality of application icons. In response to detecting the finger gesture, move the current focus from the first application icon to the second application icon, and output audible accessibility information associated with the second application icon.

732 While the electronic device is in the screen reader accessibility mode and the application launcher screen is displayed, detect a single finger gesture on the touch-sensitive surface at a location that corresponds to a third application icon of the plurality of application icons; and, in response to detecting the single finger gesture on the touch-sensitive surface at the location that corresponds to the third application icon, perform a predefined operation associated with the third application icon.

While an electronic device is in a screen reader accessibility mode

802 Display at least a first portion of a list of entries on a display. The list includes a plurality of entries.

804 While the electronic device is in the screen reader accessibility mode, prior to detecting a sequence of one or more gestures on a touch-sensitive surface that correspond to one or more characters, detect a predefined input, and, in response to detecting the predefined input, enter a handwriting gesture recognition mode within the screen reader accessibility mode 806 Detect a sequence of one or more gestures on the touch-sensitive surface that correspond to one or more characters. A respective gesture of the one or more gestures that corresponds to a respective character of the one or more characters is a single finger gesture that moves across the touch-sensitive surface along a respective path that corresponds to the respective character.

808 The respective path traverses one or more locations on the touch-sensitive surface that correspond to one or more entries of the list of entries without activating the one or more entries 810 The respective path is in the shape of the respective character 812 The respective gesture is independent of contacting a location on the touch-sensitive surface that corresponds to any of the plurality of entries (D)

Figure 8A

DEVICE, METHOD, AND GRAPHICAL USER INTERFACE FOR INTEGRATING RECOGNITION OF HANDWRITING GESTURES WITH A SCREEN READER

RELATED APPLICATION

This application claims priority to U.S. Provisional Patent Application Ser. No. 61/618,760, filed Mar. 31, 2012, entitled "Device, Method, and Graphical User Interface for Integrating Recognition of Handwriting Gestures with a Screen Reader," which is incorporated by reference herein in its entirety.

TECHNICAL FIELD

The disclosed embodiments relate generally to electronic devices for people with impaired vision, and more particularly, to electronic devices that provide accessibility using a touch-sensitive surface, such as a touch screen display or a track pad.

BACKGROUND

The use of touch-sensitive surfaces as input devices for computers and other electronic devices has increased significantly in recent years. As the use of these touch-sensitive surfaces has increased, the need for touch-based navigation methods that provide accessible navigation feedback has also increased (e.g., audible feedback, haptic feedback, and/or Braille output), especially for people with impaired vision. For example, low-vision users, blind users, dyslexic users or others with learning disabilities, or even sighted users who simply want or need to use a device without looking at the device during operation can benefit from accessibility user interfaces that permit touch-based navigation among user interface elements on the device. For blind users in particular, an effective accessibility interface is not merely an option: it is required to use these devices without assistance from sighted users.

Unfortunately, existing accessibility interfaces on devices with touch-sensitive surfaces remain cumbersome and inefficient. Navigation and activation of user interface elements is often difficult, thereby creating a significant cognitive burden on a user with impaired vision. In addition, existing accessibility methods take longer than necessary, thereby wasting energy. This latter consideration is particularly important in battery-operated devices.

SUMMARY

Accordingly, there is a need for electronic devices with touch-sensitive surfaces (e.g., touch screen displays and/or track pads) with faster, more efficient touch-based accessibility methods and interfaces. Such methods and interfaces may complement or replace existing accessibility methods for navigating and interacting with user interface objects. Such methods and interfaces reduce the cognitive burden on a user with impaired vision and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a touch-sensitive surface. The method includes, while the electronic device is in a locked, passcode-protected state with a screen reader accessibility mode turned on, displaying a passcode screen for receiving a passcode on the display. The passcode includes a predefined sequence of characters, and the passcode screen includes a plurality of character icons. The method also includes detecting a sequence of gestures on the touch-sensitive surface that correspond to characters. A respective gesture of the sequence of gestures that corresponds to a respective character is a single finger gesture that moves across the touch-sensitive surface along a respective path that corresponds to the respective character. The method further includes determining whether the detected sequence of gestures corresponds to the predefined sequence of characters in the passcode; and, in response to determining that the detected sequence of gestures corresponds to the predefined sequence of characters in the passcode: unlocking the electronic device; and maintaining the electronic device in the screen reader accessibility mode. The method further includes, in response to determining that the detected sequence of gestures does not correspond to the predefined sequence of characters in the passcode, maintaining the electronic device in the locked, passcode-protected state with the screen reader accessibility mode turned on.

In accordance with some embodiments, a method is performed at an electronic device with a display and a touch-sensitive surface. The method includes, while the electronic device is in a screen reader accessibility mode, displaying an application launcher screen on the display. The application launcher screen includes a plurality of application icons, and a respective application icon corresponds to a respective application stored in the electronic device. The method also includes detecting a sequence of one or more gestures on the touch-sensitive surface that correspond to one or more characters. A respective gesture of the one or more gestures that corresponds to a respective character of the one or more characters is a single finger gesture that moves across the touch-sensitive surface along a respective path that corresponds to the respective character. The method further includes determining whether the detected sequence of one or more gestures corresponds to a respective application icon of the plurality of application icons; and, in response to determining that the detected sequence of one or more gestures corresponds to the respective application icon of the plurality of application icons, performing a predefined operation associated with the respective application icon.

In accordance with some embodiments, a method is performed at an electronic device with a display and a touch-sensitive surface. The method includes, while the electronic device is in a screen reader accessibility mode, displaying at least a first portion of a list of entries on the display. The list includes a plurality of entries. The method also includes detecting a sequence of one or more gestures on the touch-sensitive surface that correspond to one or more characters. A respective gesture of the one or more gestures that corresponds to a respective character is a single finger gesture that moves across the touch-sensitive surface along a respective path that corresponds to the respective character. The method further includes determining whether the detected sequence of one or more gestures corresponds to a respective entry of the list of entries; and, in response to determining that the detected sequence of one or more gestures corresponds to the respective entry of the list of entries, performing a predefined operation associated with the respective entry.

In accordance with some embodiments, a method is performed at an electronic device with a display and a touch-sensitive surface. The method includes, while the electronic device is in a screen reader accessibility mode, displaying at least a portion of a web page on the display. The web page includes a plurality of user interface elements. The method also includes detecting a first navigation gesture on the touch-sensitive surface; and, in response to detecting the first navigation gesture on the touch-sensitive surface, navigating to a first set of one or more user interface elements of the plurality of user interface elements that corresponds to a current navigable unit type. The current navigable unit type is set to a first navigable unit type selected from a plurality of predefined navigable unit types. The method further includes detecting a navigation setting gesture on the touch-sensitive surface that corresponds to a respective character. The navigation setting gesture that corresponds to the respective character is a single finger gesture that moves across the touch-sensitive surface along a respective path that corresponds to the respective character. The method further includes determining whether the navigation setting gesture corresponds to a second navigable unit type of the plurality of predefined navigable unit types; and, in response to determining that the navigation setting gesture corresponds to the second navigable unit type of the plurality of predefined navigable unit types: changing the current navigable unit type from the first navigable unit type to the second navigable unit type; and outputting audible accessibility information indicating that the second navigable unit type has been selected. The method further includes, after changing the current navigable unit type from the first navigable unit type to the second navigable unit type, detecting a second navigation gesture on the touch-sensitive surface; and, in response to detecting the second navigation gesture on the touch-sensitive surface, navigating to a second set of one or more user interface elements of the plurality of user interface elements that corresponds to the second navigable unit type.

In accordance with some embodiments, a method is performed at an electronic device with a display and a touch-sensitive surface. The method includes, while the electronic device is in a screen reader accessibility mode, displaying a character input area and a keyboard on the display. The keyboard includes a plurality of key icons. The method also includes detecting a sequence of one or more gestures on the touch-sensitive surface that correspond to one or more characters. A respective gesture of the one or more gestures that corresponds to a respective character is a single finger gesture that moves across the touch-sensitive surface along a respective path that corresponds to the respective character, and the respective path traverses one or more locations on the touch-sensitive surface that correspond to one or more key icons of the plurality of key icons without activating the one or more key icons. The method further includes, in response to detecting the respective gesture, entering the corresponding respective character in the character input area of the display.

In accordance with some embodiments, an electronic device includes a display, a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, a touch-sensitive surface, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by an electronic device with a display, a touch-sensitive surface, cause the device to perform the operations of any of the methods described above. In accordance with some embodiments, an electronic device includes: a display, a touch-sensitive surface; and means for performing the operations of any of the methods described above. In accordance with some embodiments, an information processing apparatus, for use in an electronic device with a display and a touch-sensitive surface, includes means for performing the operations of any of the methods described above.

In accordance with some embodiments, an electronic device includes a display unit configured to display a passcode screen for receiving a passcode while the electronic device is in a locked, passcode-protected state with a screen reader accessibility mode turned on. The passcode includes a predefined sequence of characters, the passcode screen including a plurality of character icons. The electronic device also includes a touch-sensitive surface unit configured to detect a sequence of gestures on the touch-sensitive surface unit that correspond to characters. A respective gesture of the sequence of gestures that corresponds to a respective character is a single finger gesture that moves across the touch-sensitive surface unit along a respective path that corresponds to the respective character. The electronic device further includes a processing unit coupled to the display unit and the touch-sensitive surface unit. The processing unit is configured to: determine whether the detected sequence of gestures corresponds to the predefined sequence of characters in the passcode; and, in response to determining that the detected sequence of gestures corresponds to the predefined sequence of characters in the passcode: unlock the electronic device; and maintain the electronic device in the screen reader accessibility mode. The processing unit is also configured to, in response to determining that the detected sequence of gestures does not correspond to the predefined sequence of characters in the passcode, maintain the electronic device in the locked, passcode-protected state with the screen reader accessibility mode turned on.

In accordance with some embodiments, an electronic device includes a display unit configured to display an application launcher screen while the electronic device is in a screen reader accessibility mode. The application launcher screen includes a plurality of application icons. A respective application icon corresponds to a respective application stored in the electronic device. The electronic device also includes a touch-sensitive surface unit configured to detect a sequence of one or more gestures on the touch-sensitive surface unit that correspond to one or more characters. A respective gesture of the one or more gestures that corresponds to a respective character of the one or more characters is a single finger gesture that moves across the touch-sensitive surface unit along a respective path that corresponds to the respective character. The electronic device further includes a processing unit coupled to the display unit and the touch-sensitive surface unit. The processing unit is configured to: determine whether the detected sequence of one or more gestures corresponds to a respective application icon of the plurality of application icons; and, in response to determining that the detected sequence of one or more gestures corresponds to the respective application icon of the plurality of application icons, perform a predefined operation associated with the respective application icon.

In accordance with some embodiments, an electronic device includes a display unit configured to display at least a first portion of a list of entries while the electronic device is in a screen reader accessibility mode. The list includes a plurality of entries. The electronic device also includes a touch-sensitive surface unit configured to detect a sequence of one or more gestures on the touch-sensitive surface unit that correspond to one or more characters. A respective gesture of the one or more gestures that corresponds to a respective character is a single finger gesture that moves across the touch-sensitive surface unit along a respective path that corresponds to the respective character. The electronic device further includes a processing unit coupled to the display unit and the touch-sensitive surface unit. The processing unit is configured to: determine whether the detected sequence of one or more gestures correspond to a respective entry of the list of entries; and, in response to determining that the detected sequence of one or more gestures corresponds to the respective entry of the list of entries, perform a predefined operation associated with the respective entry.

In accordance with some embodiments, an electronic device includes a display unit configured to display at least a portion of a web page while the electronic device is in a screen reader accessibility mode. The web page includes a plurality of user interface elements. The electronic device also includes a touch-sensitive surface unit configured to detect a first navigation gesture on the touch-sensitive surface unit. The electronic device further includes a processing unit coupled to the display unit and the touch-sensitive surface unit. The processing unit is configured to, in response to detecting the first navigation gesture on the touch-sensitive surface unit, navigate to a first set of one or more user interface elements of the plurality of user interface elements that corresponds to a current navigable unit type. The current navigable unit type is set to a first navigable unit type selected from a plurality of predefined navigable unit types. The processing unit is also configured to detect a navigation setting gesture on the touch-sensitive surface unit that corresponds to a respective character. The navigation setting gesture that corresponds to the respective character is a single finger gesture that moves across the touch-sensitive surface unit along a respective path that corresponds to the respective character. The processing unit is further configured to: determine whether the navigation setting gesture corresponds to a second navigable unit type of the plurality of predefined navigable unit types; and, in response to determining that the navigation setting gesture corresponds to the second navigable unit type of the plurality of predefined navigable unit types: change the current navigable unit type from the first navigable unit type to the second navigable unit type; and output audible accessibility information indicating that the second navigable unit type has been selected. The processing unit is further configured to: after changing the current navigable unit type from the first navigable unit type to the second navigable unit type, detect a second navigation gesture on the touch-sensitive surface unit; and, in response to detecting the second navigation gesture on the touch-sensitive surface unit, navigate to a second set of one or more user interface elements of the plurality of user interface elements that corresponds to the second navigable unit type.

In accordance with some embodiments, an electronic device includes a display unit configured to display a character input area and a keyboard while the electronic device is in a screen reader accessibility mode. The keyboard includes a plurality of key icons. The electronic device also includes a touch-sensitive surface unit configured to detecting a sequence of one or more gestures on the touch-sensitive surface unit that correspond to one or more characters. A respective gesture of the one or more gestures that corresponds to a respective character is a single finger gesture that moves across the touch-sensitive surface unit along a respective path that corresponds to the respective character, and the respective path traverses one or more locations on the touch-sensitive surface unit that correspond to one or more key icons of the plurality of key icons without activating the one or more key icons. The electronic device further includes a processing unit coupled to the display unit and the touch-sensitive surface unit. The processing unit is configured to, in response to detecting the respective gesture, enter the corresponding respective character in the character input area of the display.

Thus, electronic devices with displays and touch-sensitive surfaces are provided with new and improved accessibility methods and user interfaces that integrate recognition of handwriting gestures with a screen reader, thereby increasing the effectiveness, efficiency, and user satisfaction with such devices. Such methods and interfaces may complement or replace existing accessibility methods.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 6A-6B are flow diagrams illustrating a method of unlocking an electronic device in accordance with some embodiments.

FIGS. 7A-7C are flow diagrams illustrating a method of selecting an application icon in accordance with some embodiments.

FIGS. 8A-8B are flow diagrams illustrating a method of selecting a list entry in accordance with some embodiments.

DESCRIPTION OF EMBODIMENTS

Described below are devices and methods that integrate recognition of handwriting gestures with a screen reader to make touch-based user interfaces more accessible to people with impaired vision. The methods described herein, which are performed while the device is in a screen reader accessibility mode, include:

Using a sequence of handwritten characters on a touch-sensitive surface to unlock an electronic device;

Using a sequence of handwritten characters on a touch-sensitive surface to select an application icon;

Using a sequence of handwritten characters on a touch-sensitive surface to select a list entry;

Using handwritten characters on a touch-sensitive surface to navigate web pages; and Using handwriting gestures on a touch-sensitive user interface to enter characters.

These methods make device unlocking, application selection, list entry selection, web page navigation, and character input while using a screen reader more efficient for users who have impaired vision.

Figure 2:
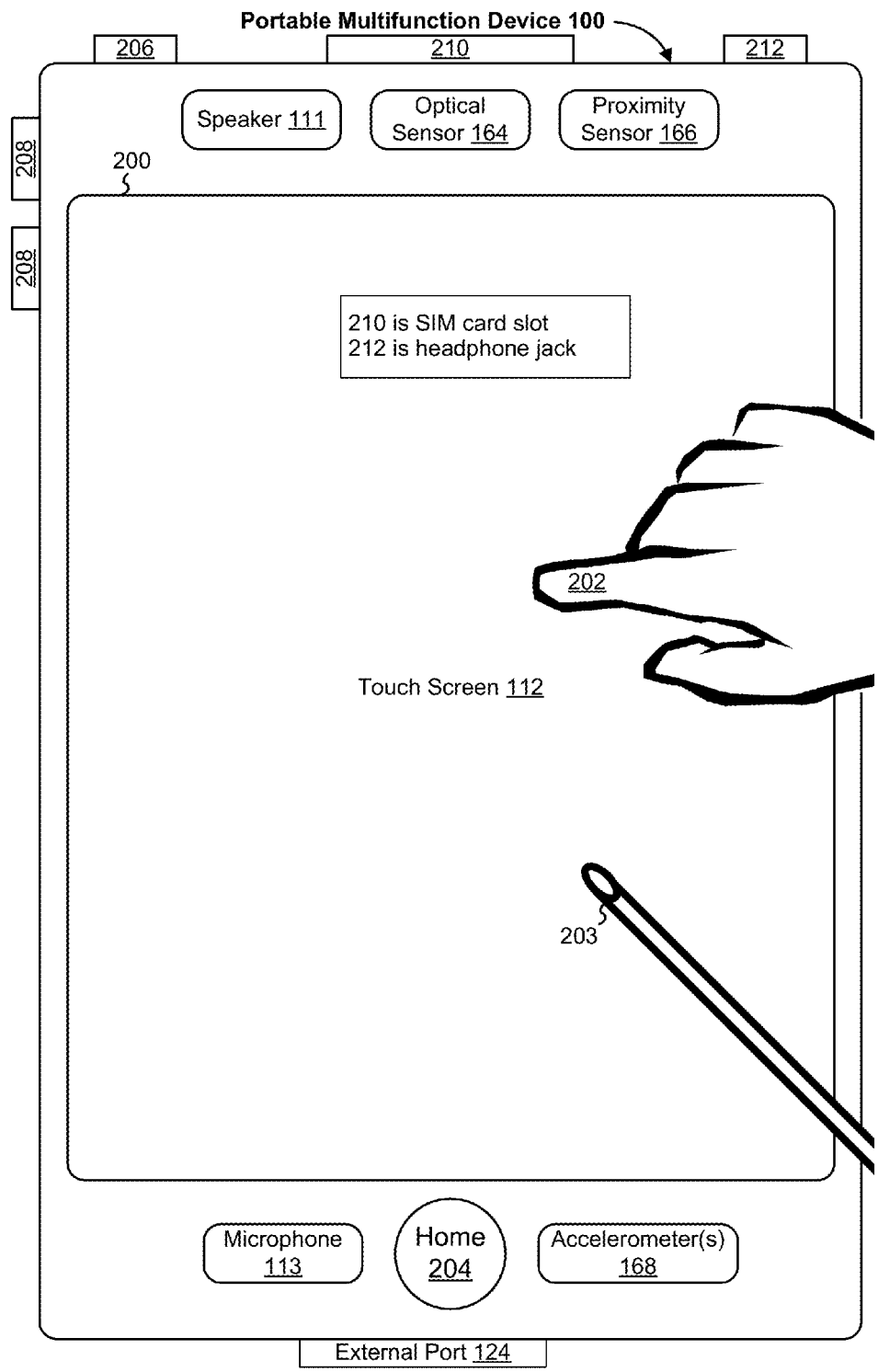
FIG. 2 illustrates a portable multifunction device having a touch screen in accordance with some embodiments.
Figure 3:
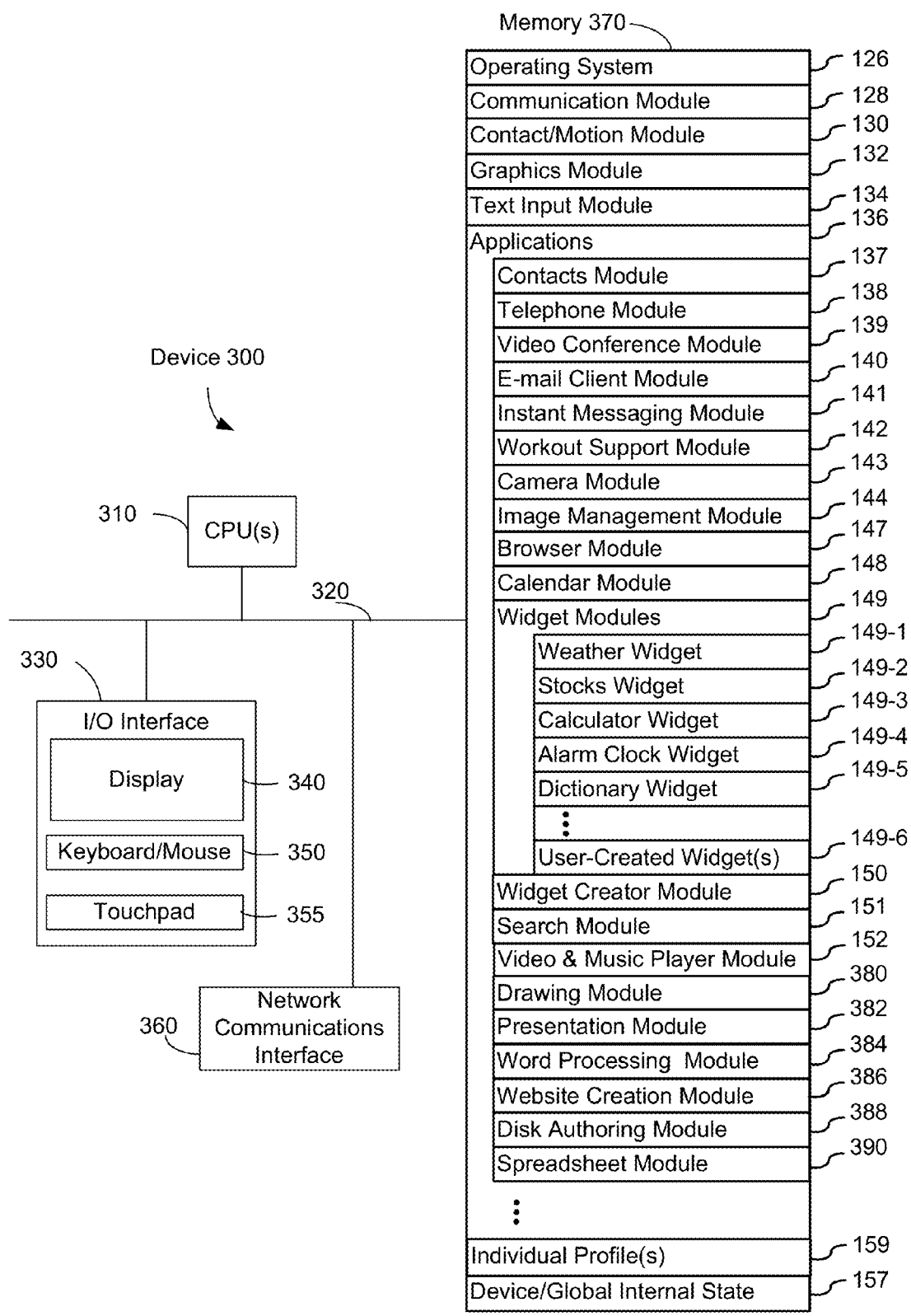
FIG. 3 is a block diagram of an exemplary multifunction device with a display and a touch-sensitive surface in accordance with some embodiments.
Figure 4A:
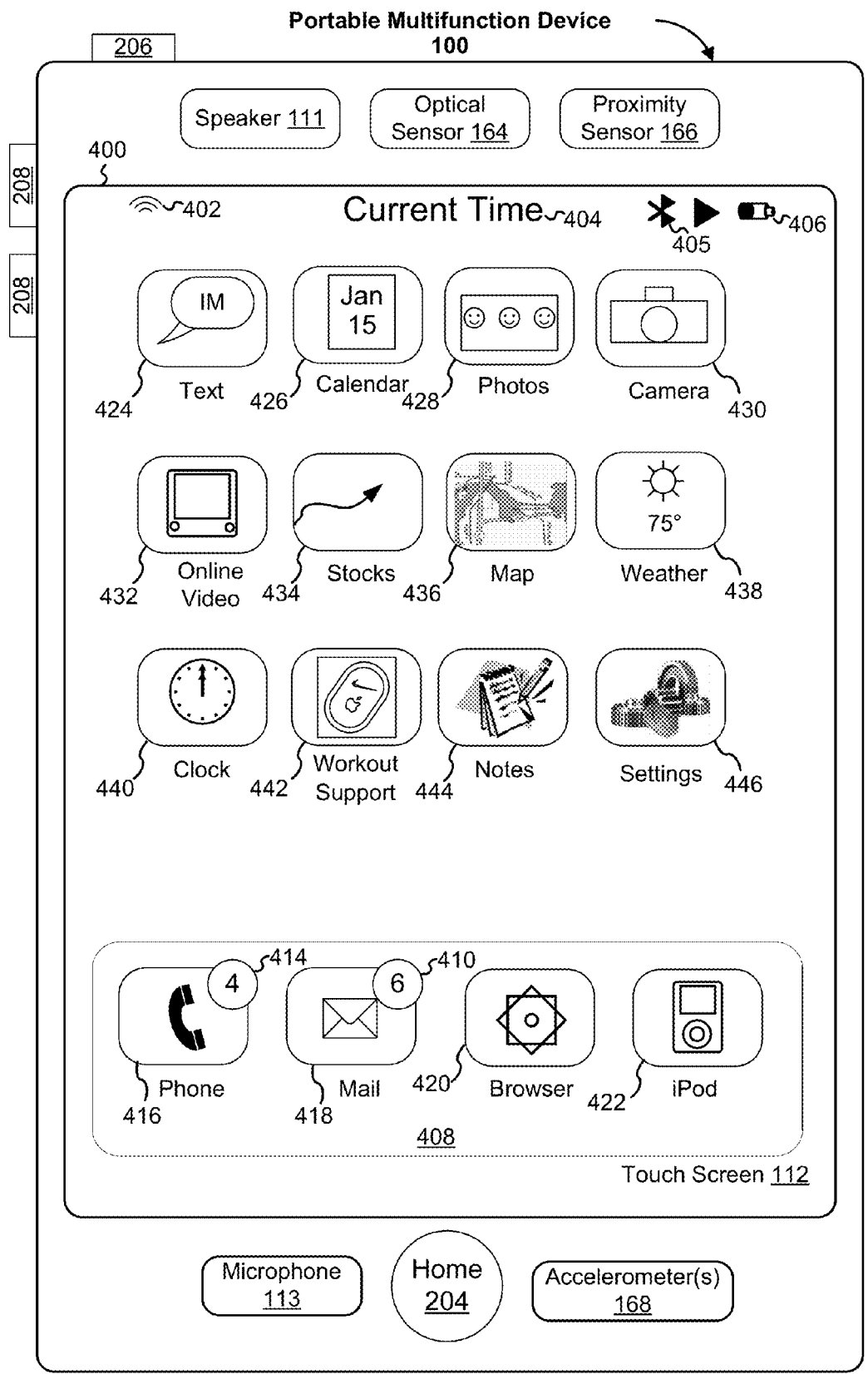
FIG. 4A illustrates an exemplary user interface for a menu of applications on a portable multifunction device in accordance with some embodiments.
Figure 4B:
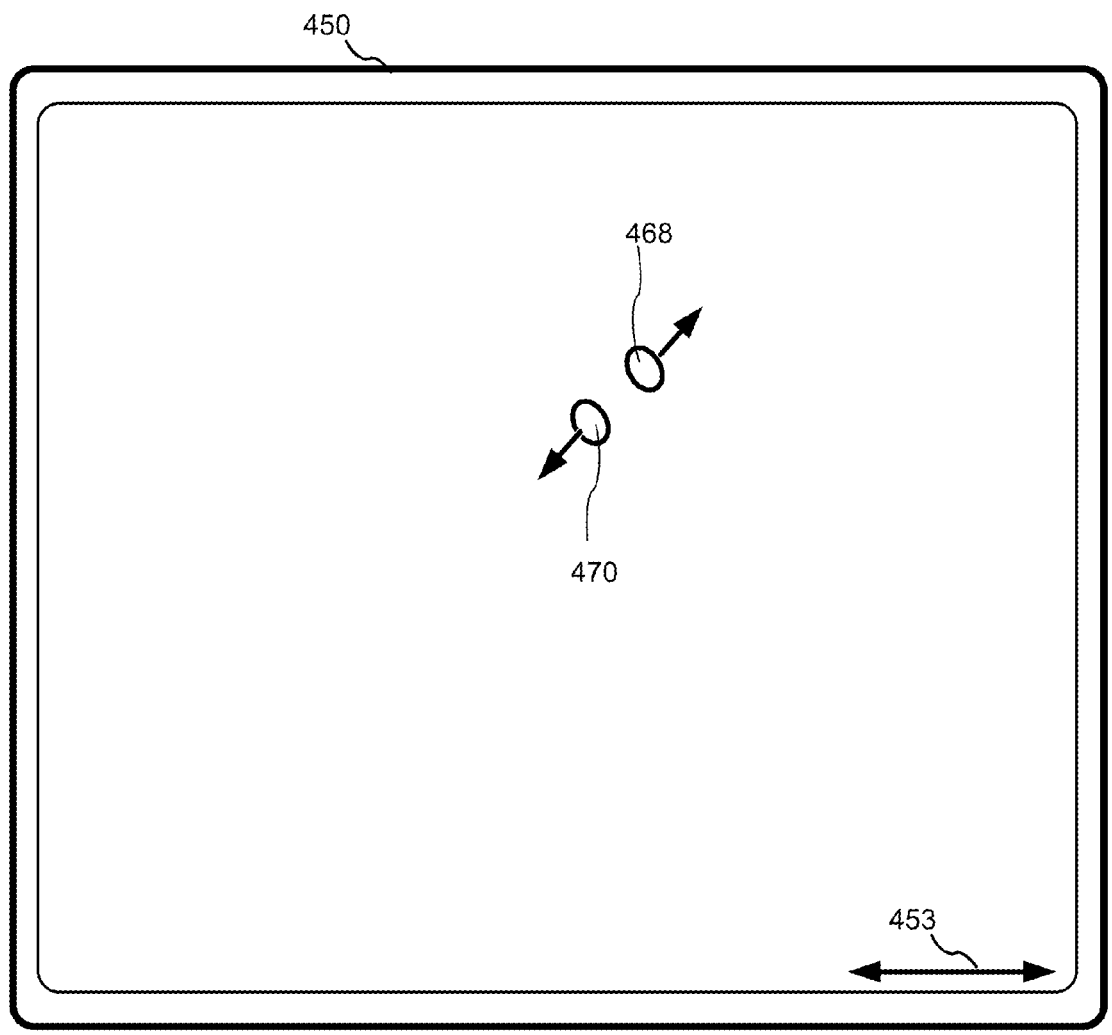
FIG. 4B illustrates an exemplary user interface for a multifunction device with a touch-sensitive surface that is separate from the display in accordance with some embodiments.
Figure 4B:
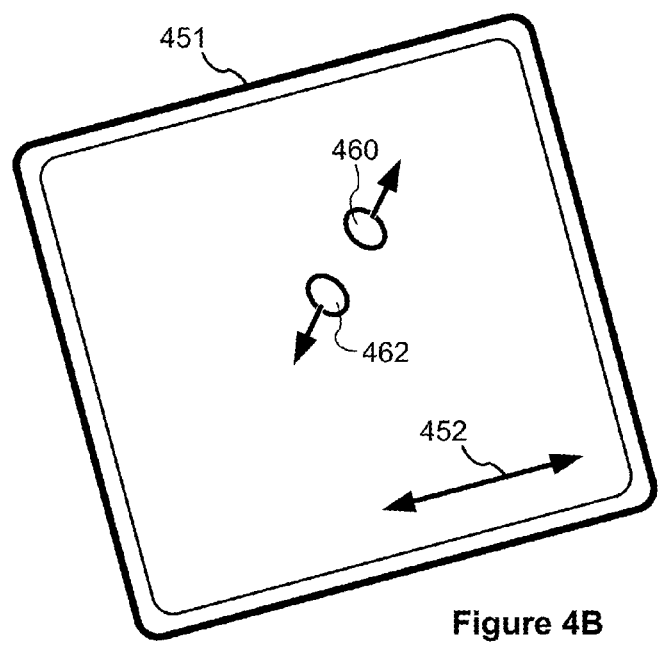
Figure 5A:
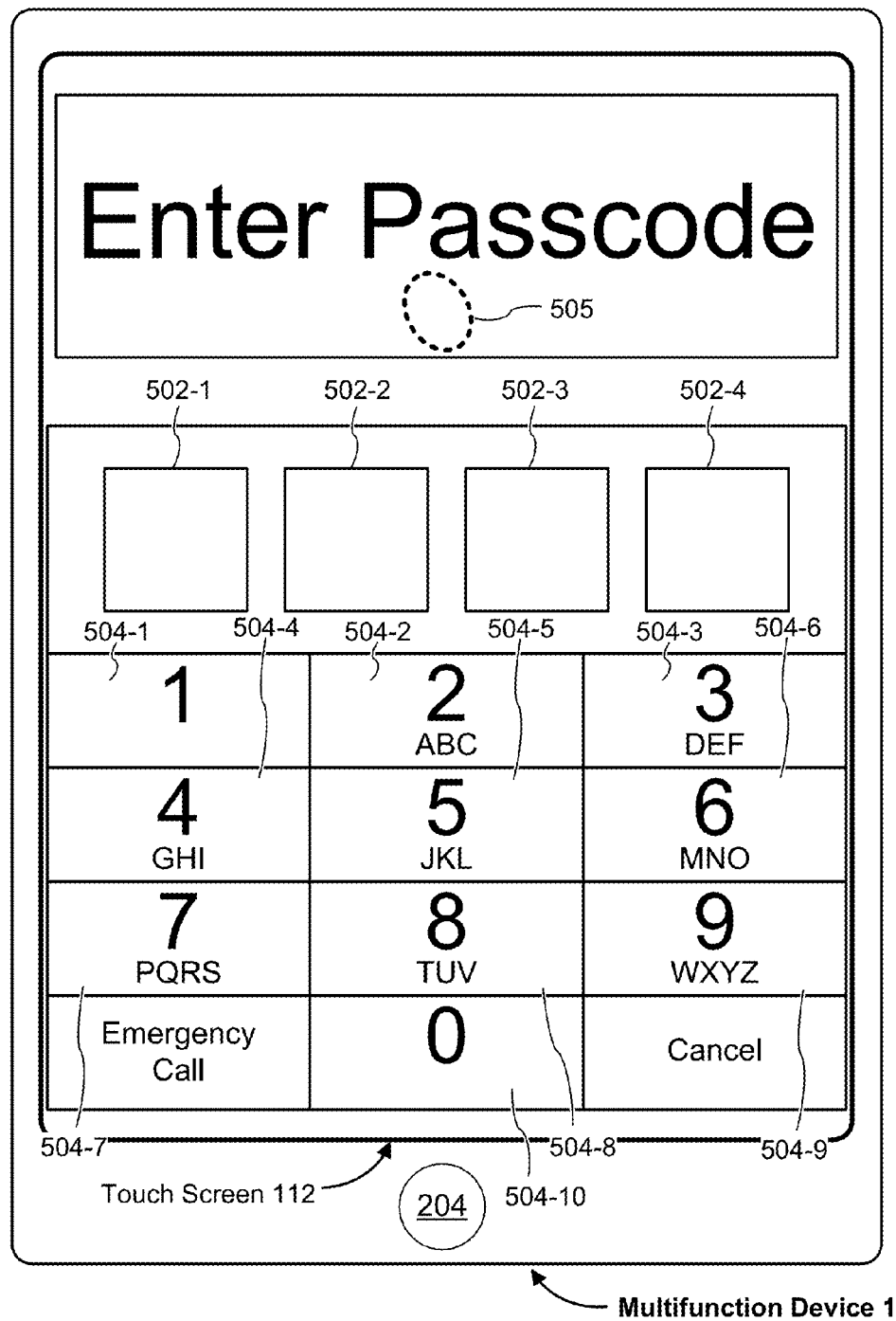
FIGS. 5A-5AO illustrate exemplary user interfaces that are displayed while receiving handwriting gestures in accordance with some embodiments.
Figure 6A:
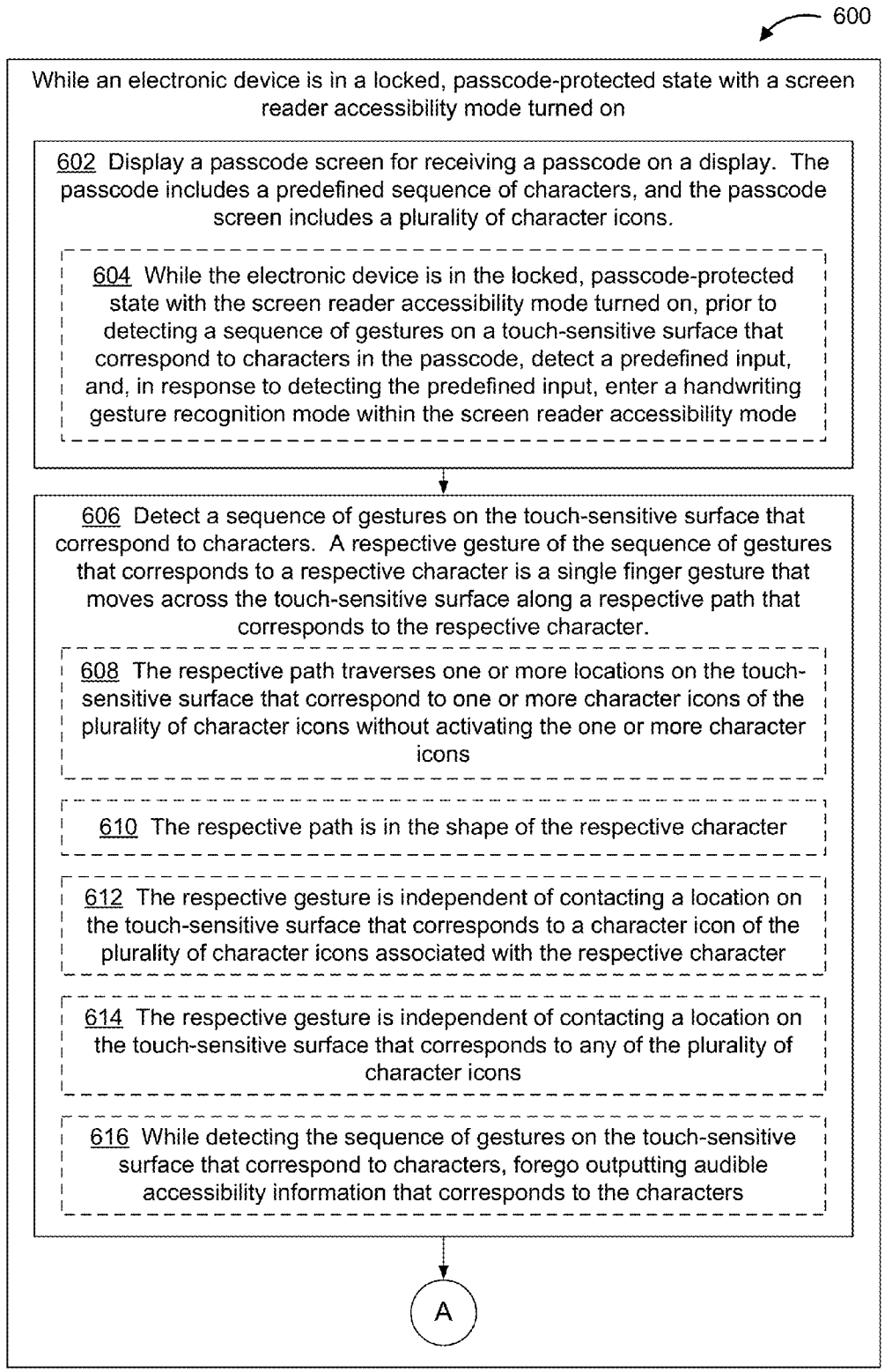
Figure 7A:
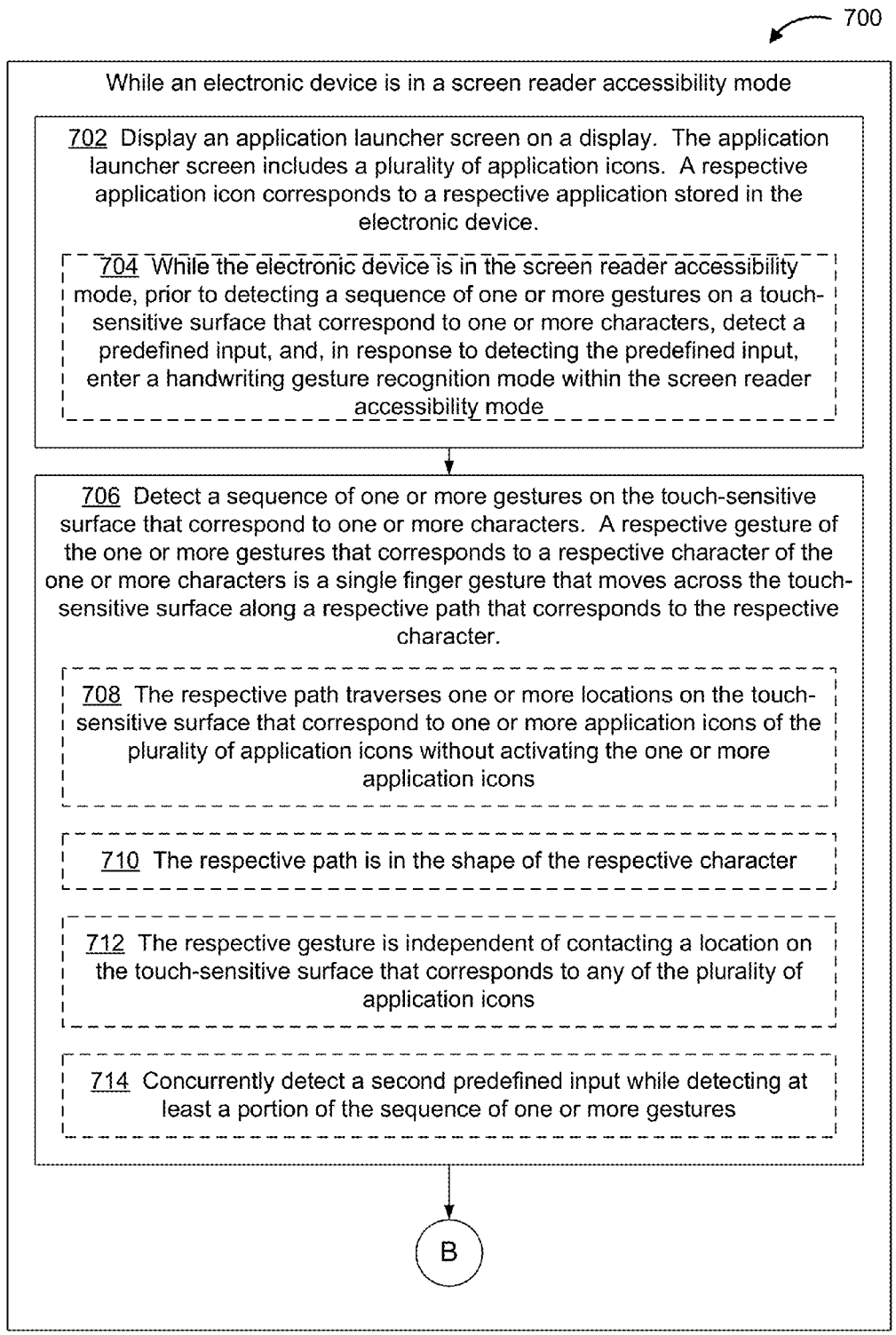
Figure 7B:
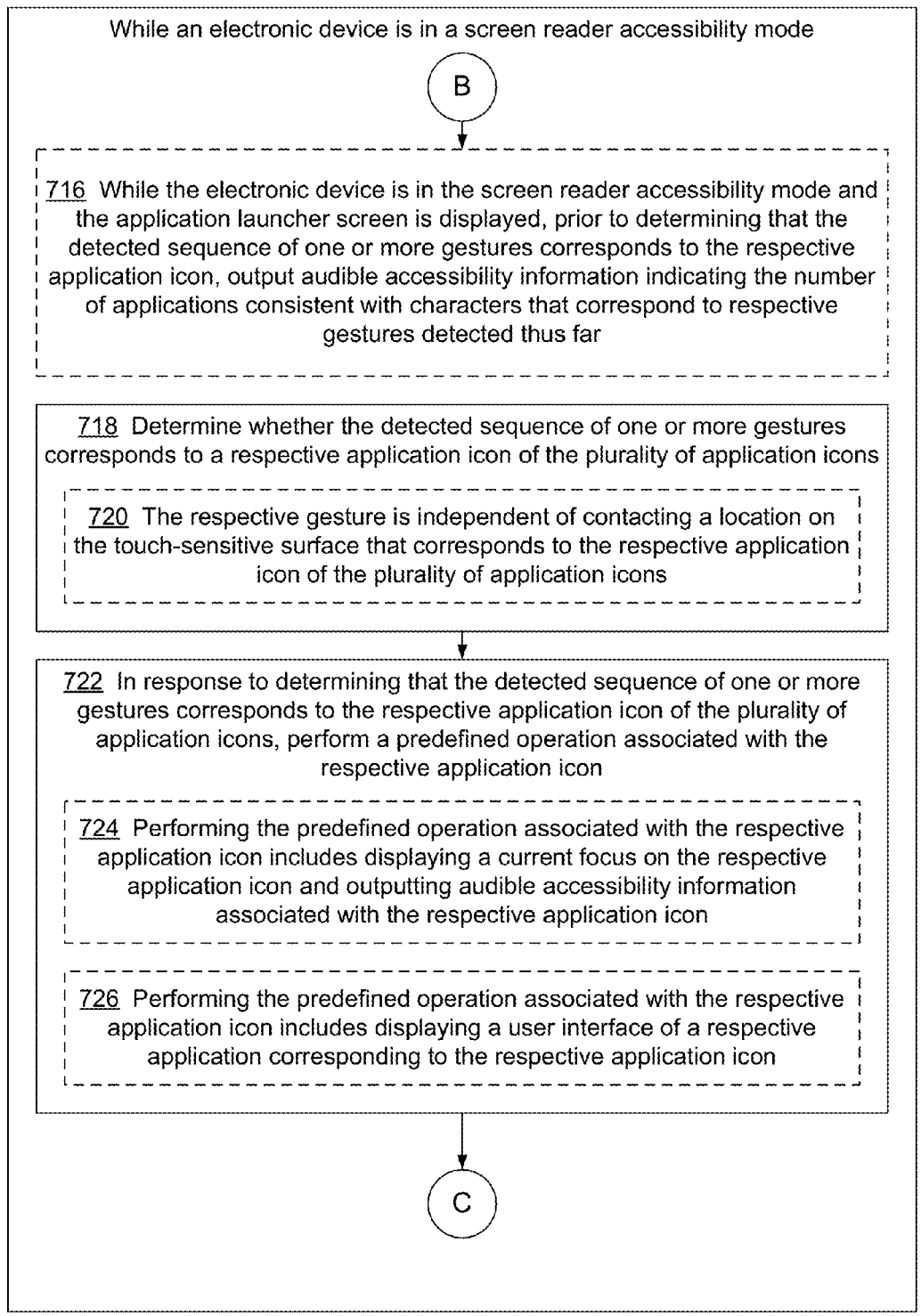
Figure 8B:
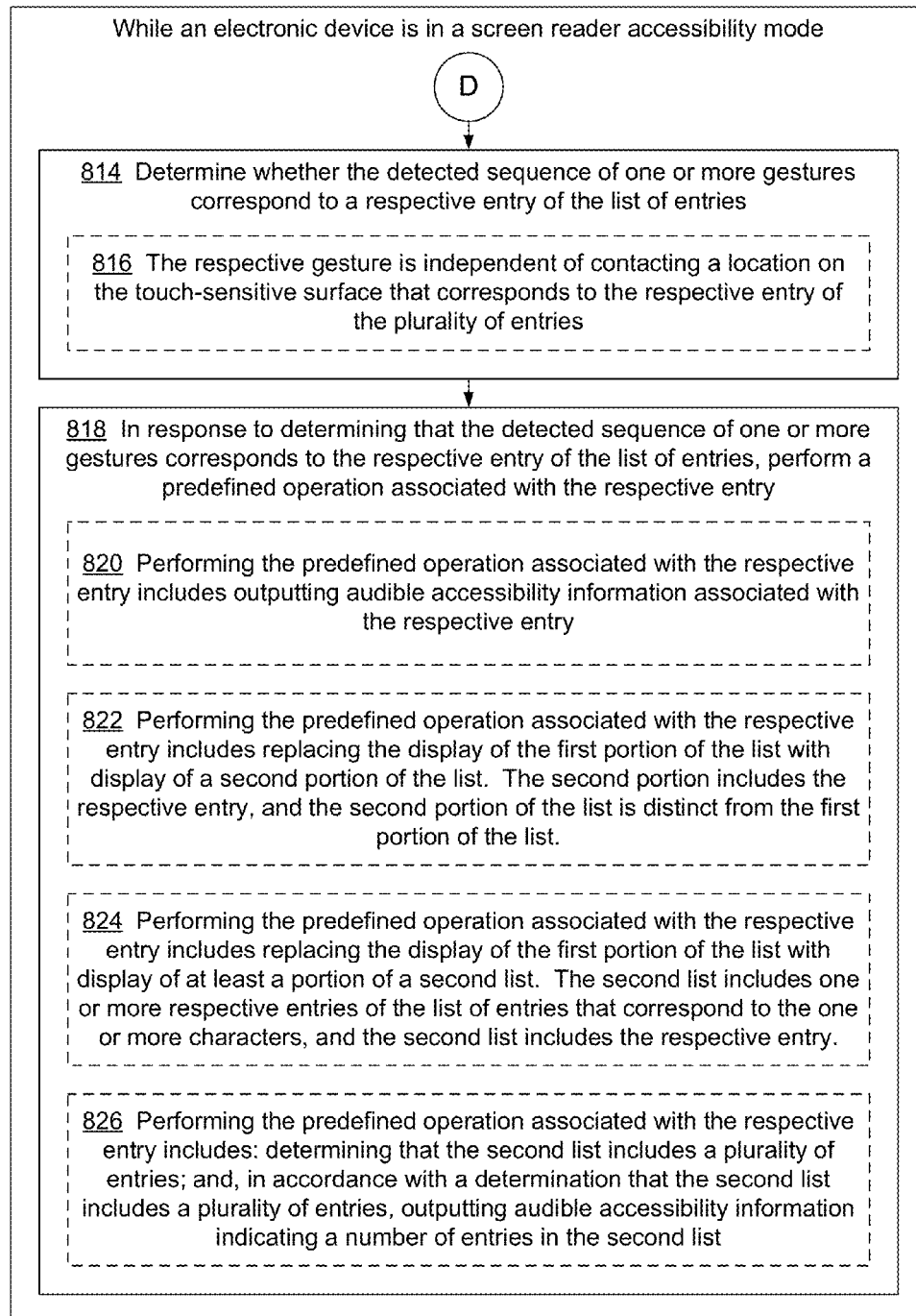
Figure 9A:
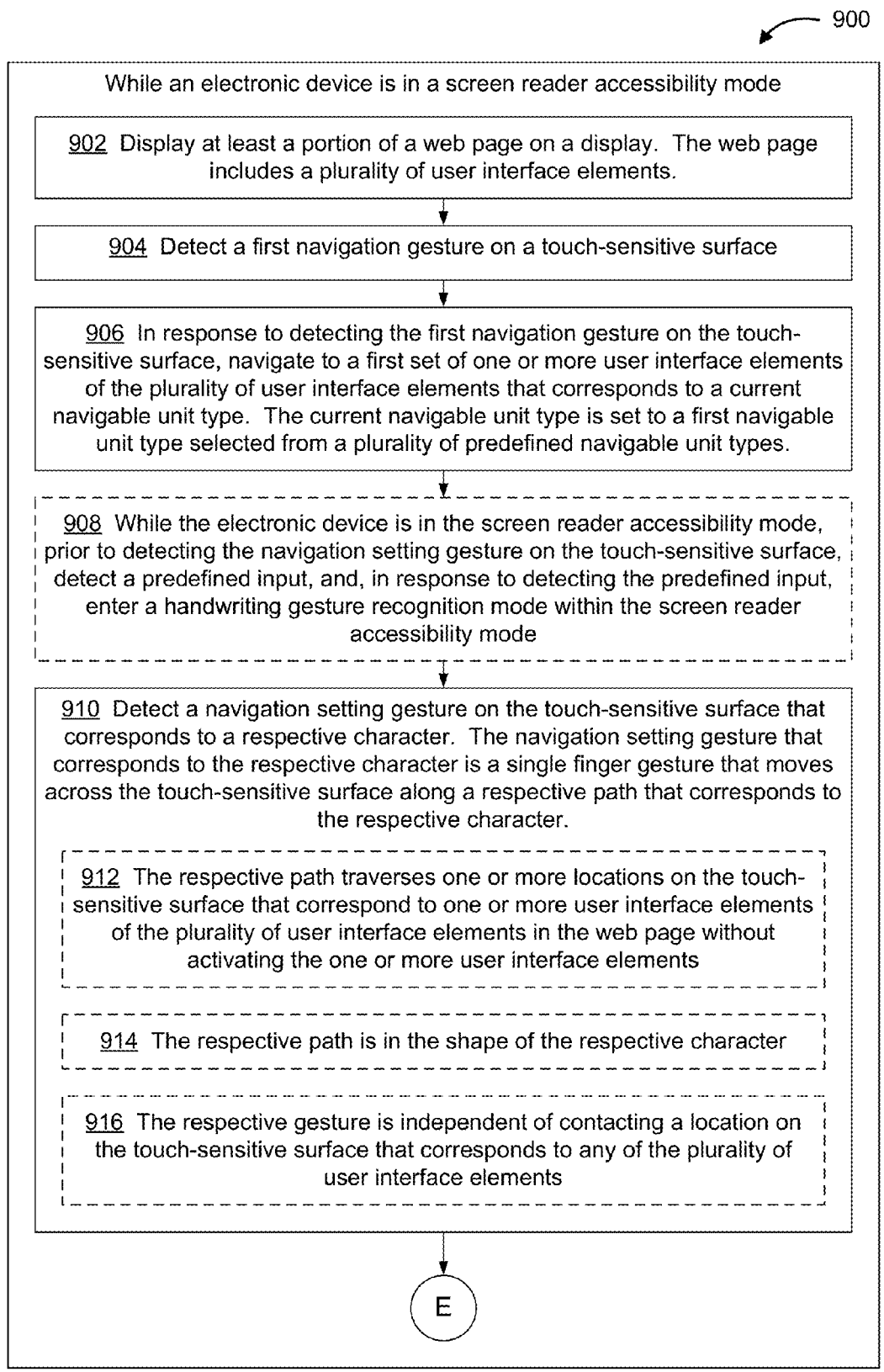
FIGS. 9A-9C are flow diagrams illustrating a method of navigating a web page in accordance with some embodiments.
Figure 9B:
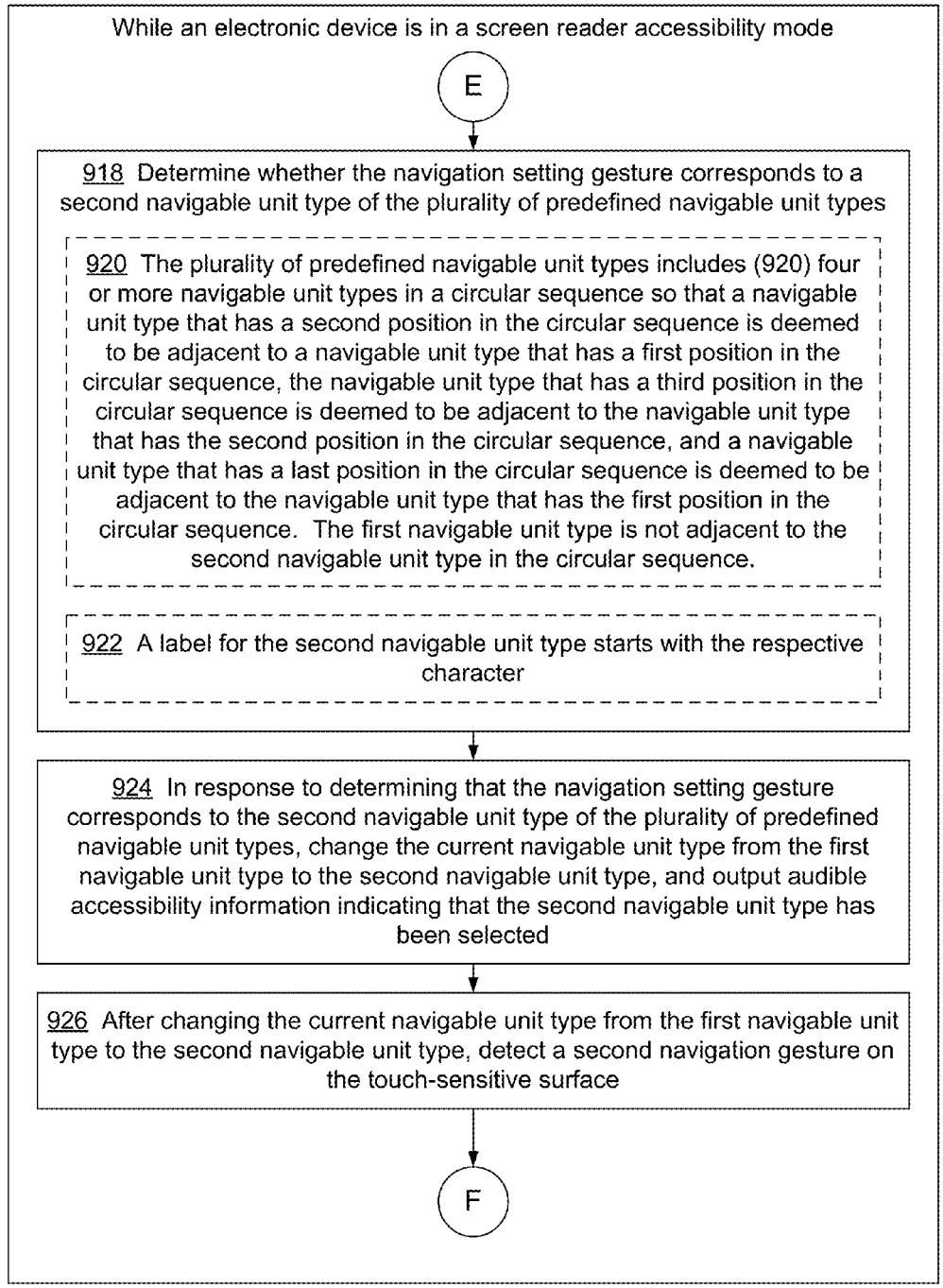
Figure 9C:
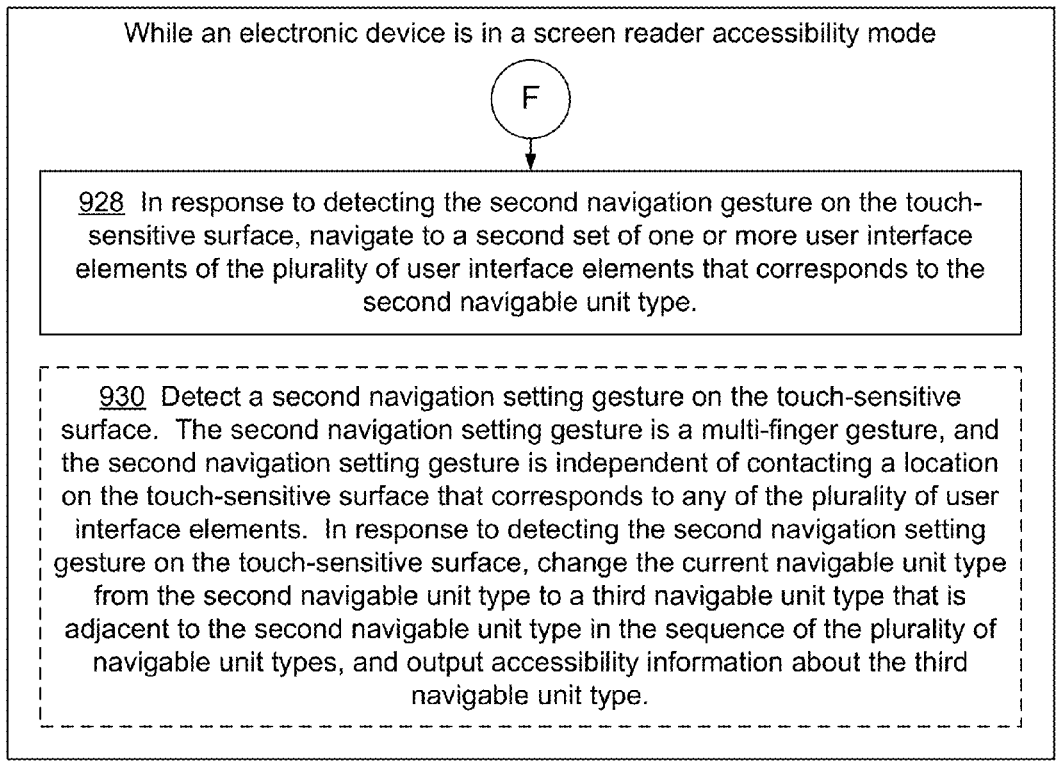
Figure 10A:
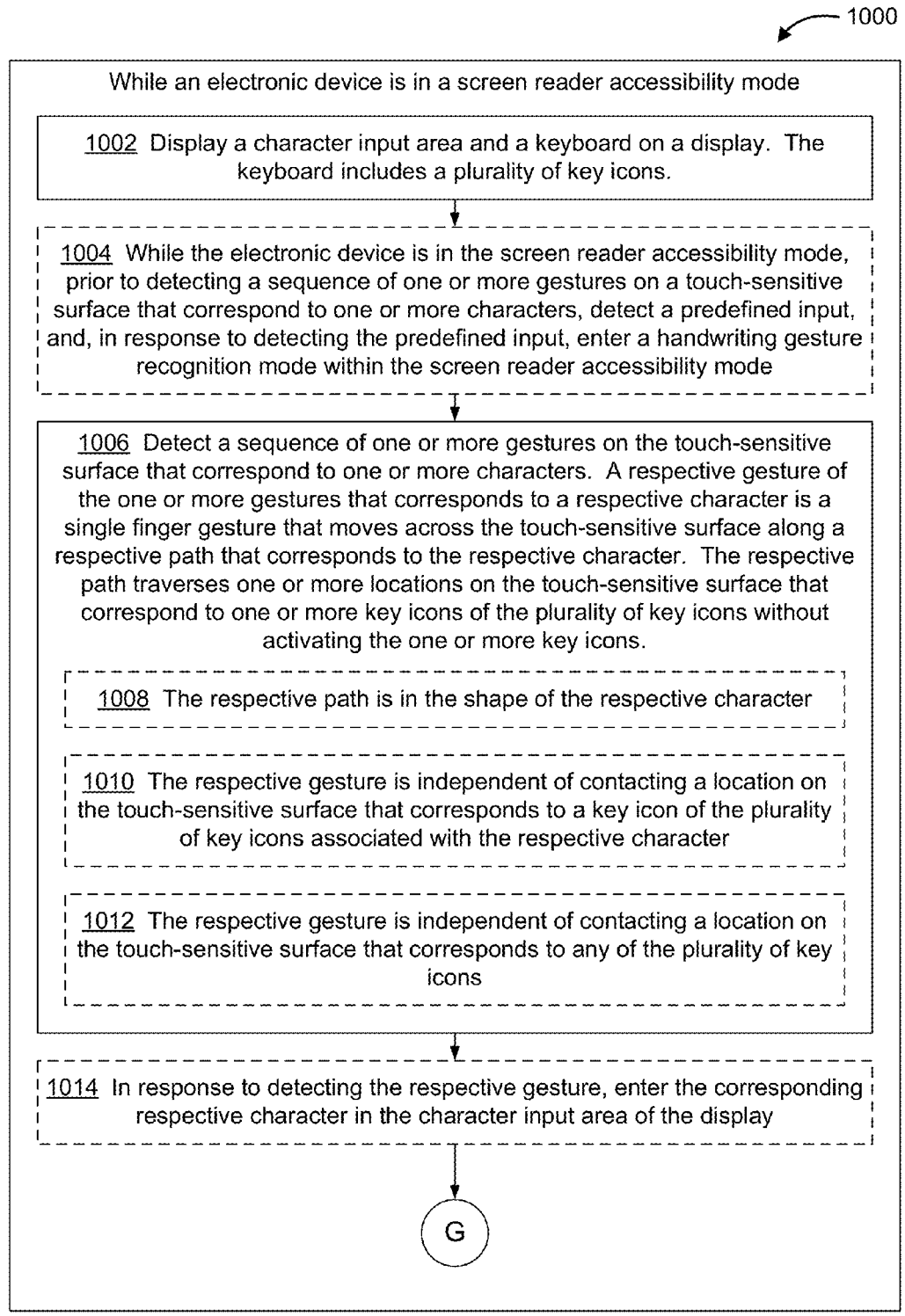
FIGS. 10A-10B are flow diagrams illustrating a method of receiving handwriting gestures in accordance with some embodiments.
Figure 10B:
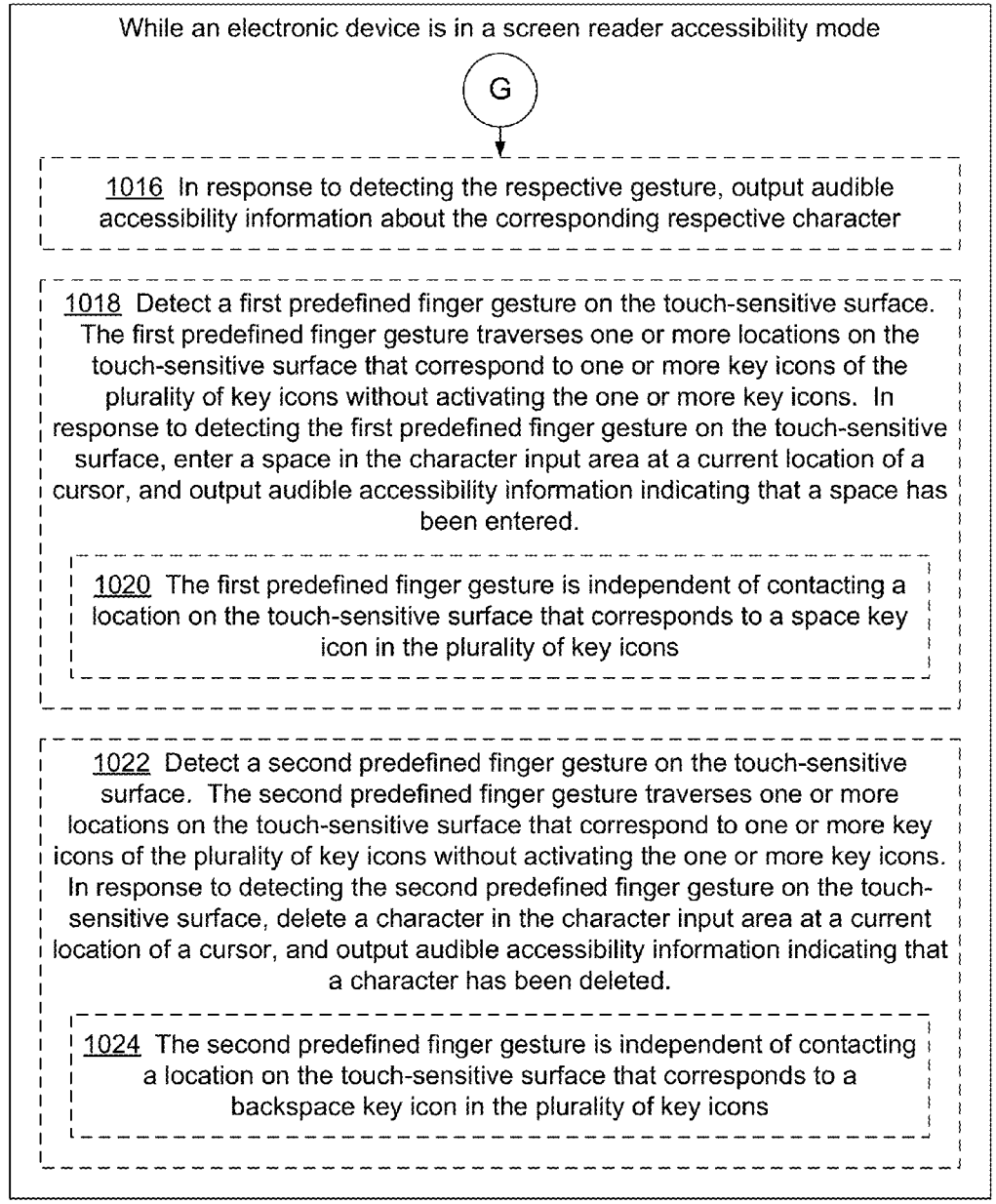

Below, FIGS. 1A-1B, 2, and 3 provide a description of exemplary devices. FIGS. 4A-4B and 5A-5AO illustrate exemplary user interfaces that are displayed while receiving handwriting gestures. FIGS. 6A-6B are flow diagrams illustrating a method of unlocking an electronic device in accordance with some embodiments. FIGS. 7A-7C are flow diagrams illustrating a method of selecting an application icon in accordance with some embodiments. FIGS. 8A-8B are flow diagrams illustrating a method of selecting a list entry in accordance with some embodiments. FIGS. 9A-9C are flow diagrams illustrating a method of navigating a web page in accordance with some embodiments. FIGS. 10A-10B are flow diagrams illustrating a method of receiving handwriting gestures in accordance with some embodiments. The user interfaces in FIGS. 5A-5AO are used to illustrate the processes in FIGS. 6A-6B, 7A-7C, 8A-8B, 9A-9C, and 10A-10B.

EXEMPLARY DEVICES

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 1A:
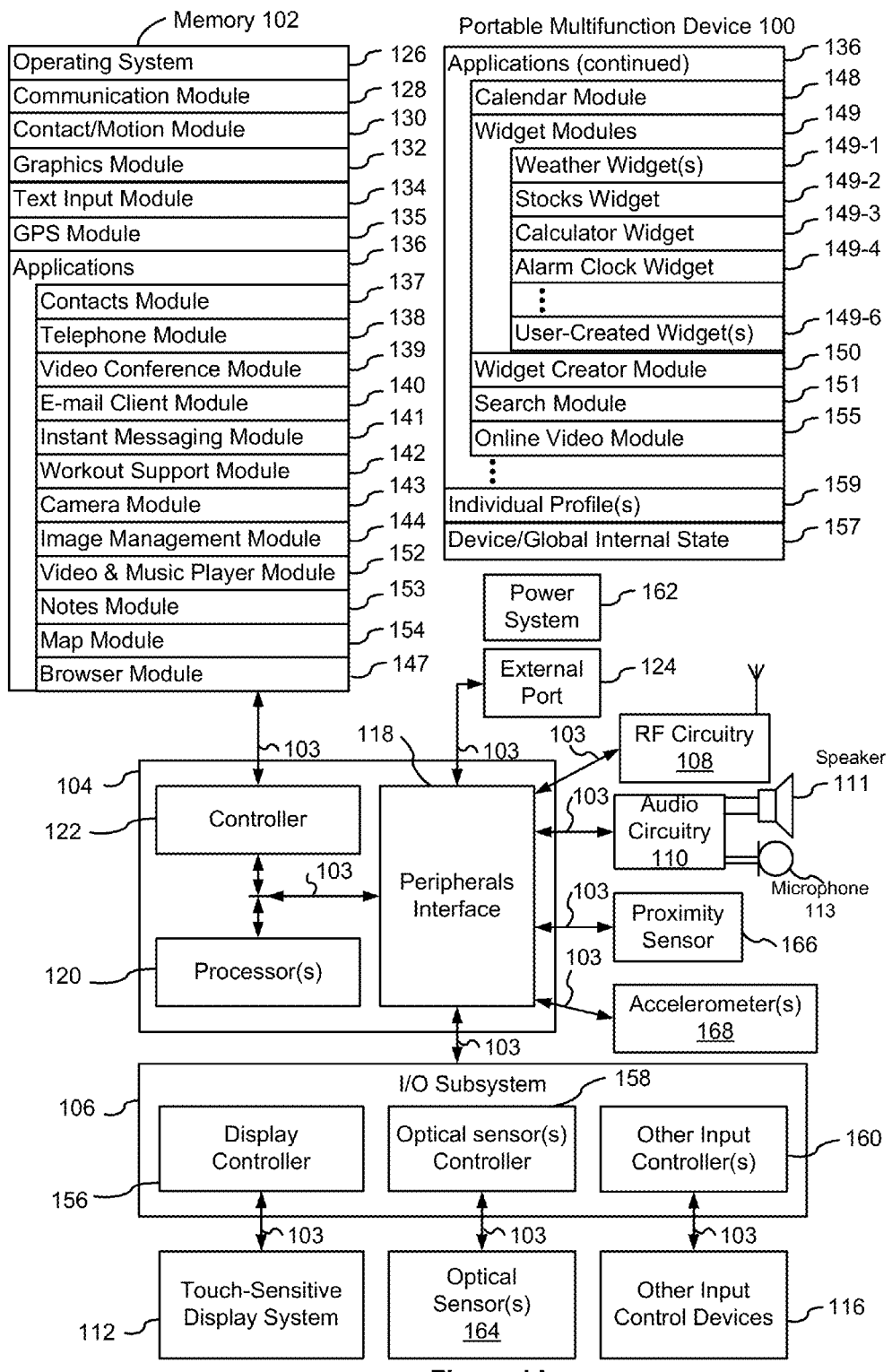
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), evolution-data-only (EV-DO), HSPA, HSPA+, Dual-Cell HSPA (DC-HSPDA), long term evolution (LTE), near field communication (NFC), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, instant messaging (IM) 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:

contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which may be made up of a video player module and a music player module;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
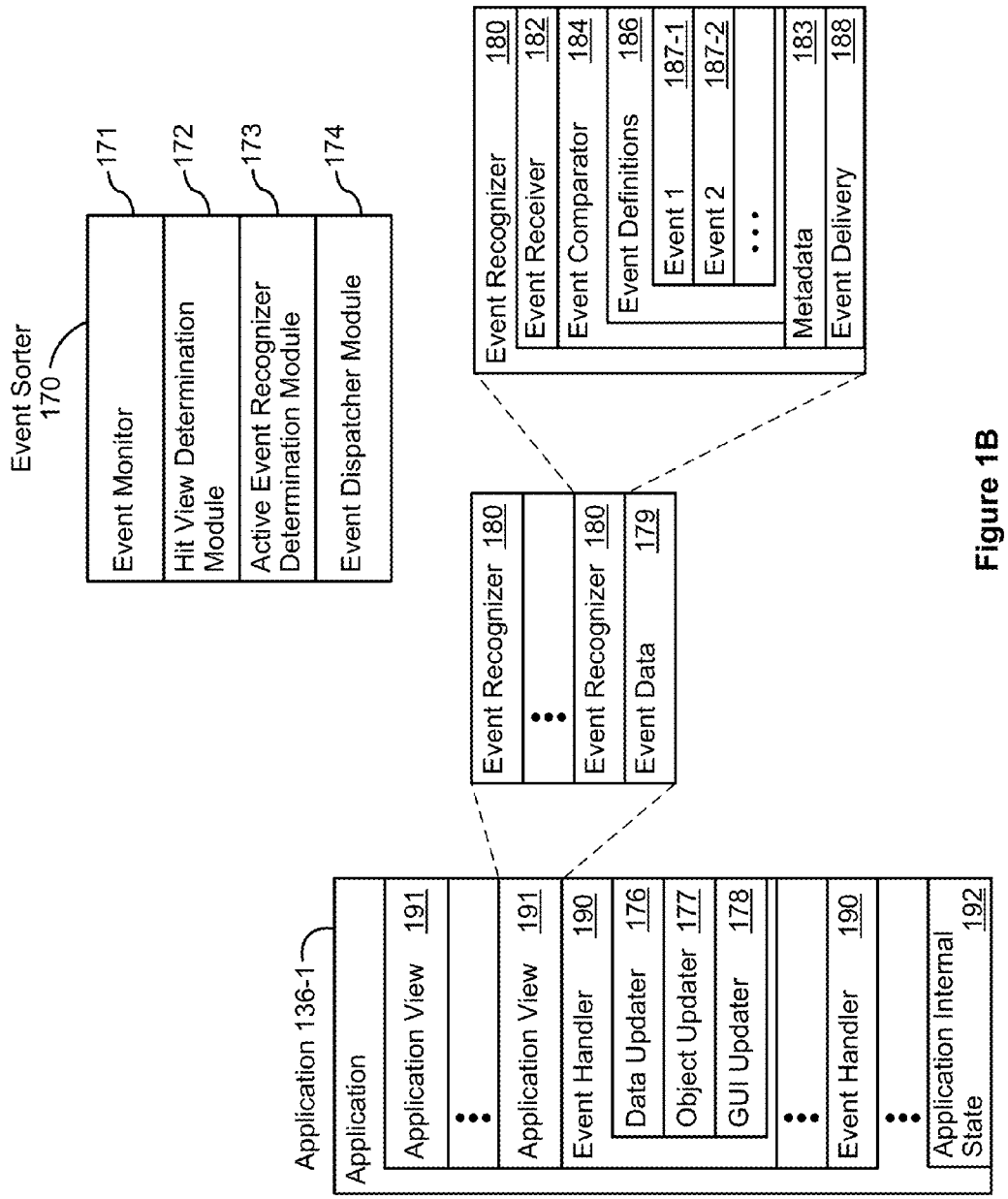
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which may include an indicator 414 of the number of missed calls or voicemail messages;
  Icon 418 for e-mail client module 140, labeled "Mail," which may include an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"

Icon 436 for map module 154, labeled "Map;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely exemplary. For example, icon 422 for video and music player module 152 may be labeled "Music" or "Music Player." Other labels may be used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5AO illustrate exemplary user interfaces that are displayed while receiving handwriting gestures in accordance with some embodiments. The user interfaces in these figures are used to illustrate the processes described below, including the processes in FIGS. 6A-6B, 7A-7C, 8A-8B, 9A-9C, and 10A-10B.

FIG. 5A illustrates a passcode screen that includes a plurality of character icons 504-1 through 504-10 (e.g., numeric keys corresponding to numbers 1 through 9 and 0, respectively) and passcode input fields 502-1 through 502-4. FIG. 5A also illustrates that, in some embodiments, touch gesture 505 (e.g., a double-tap gesture) is detected on touch screen 112. In some embodiments, device 100 enters a handwriting gesture recognition mode in response to detecting touch gesture 505. Alternatively, device 100 may already be in the handwriting gesture recognition mode regardless of touch gesture 505.

Figure 5B:
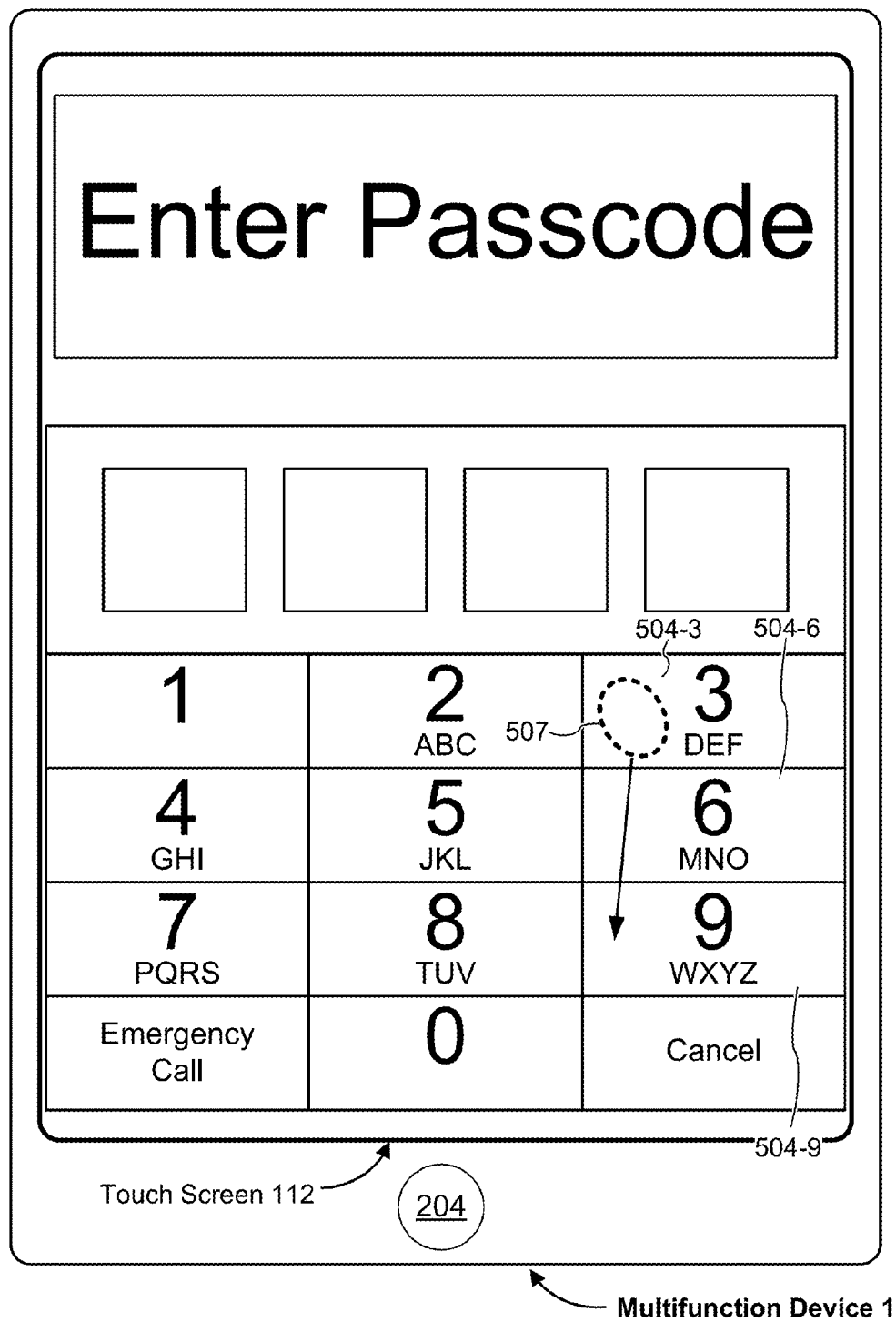

FIG. 5B illustrates touch gesture 507 detected on touch screen 112. Touch gesture 507 includes a movement of a finger contact across touch screen 112 along a path that corresponds to the character "1" (e.g., the path corresponds to the shape of the character "1"), thereby providing the character "1" (number one) as an input. In FIG. 5B, touch gesture 507 traverses locations on touch screen 112 that correspond to character icons 504-3, 504-6, and 504-9 without activating any of character icons 504-3, 504-6, and 504-9. For example, characters corresponding to character icons 504-3, 504-6, and 504-9 (e.g., "3," "6," and "9") are not entered into passcode input fields 502 in response to detecting touch gesture 507.

Figure 5C:
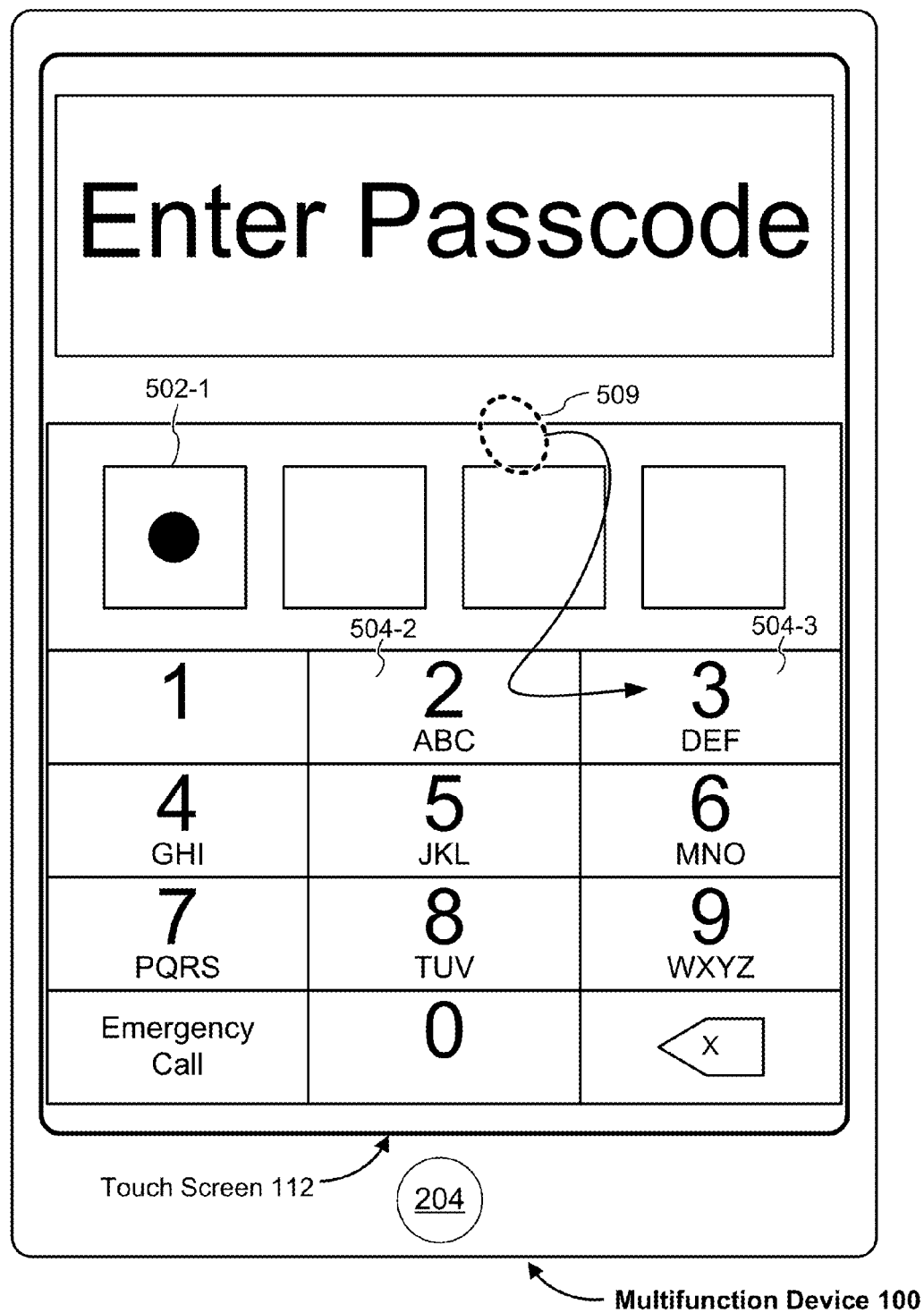

FIG. 5C illustrates that passcode input field 502-1 is updated (e.g., a circle is displayed in passcode input field 502-1 to indicate the receipt of a first character). FIG. 5C also illustrates touch gesture 509 detected on touch screen 112. Touch gesture 509 includes a movement of a finger contact across touch screen 112 along a path that corresponds to the character "2" (e.g., the path corresponds to the shape of the character "2"), thereby providing the character "2" as an input. In FIG. 5C, touch gesture 509 traverses locations on touch screen 112 that correspond to character icons 504-2 and 504-3 without activating any of character icons 504-2 and 504-3. For example, characters corresponding to character icons 504-2 and 504-3 (e.g., "2" and "3") are not entered into passcode input fields 502 in response to detecting touch gesture 509.

Figure 5D:
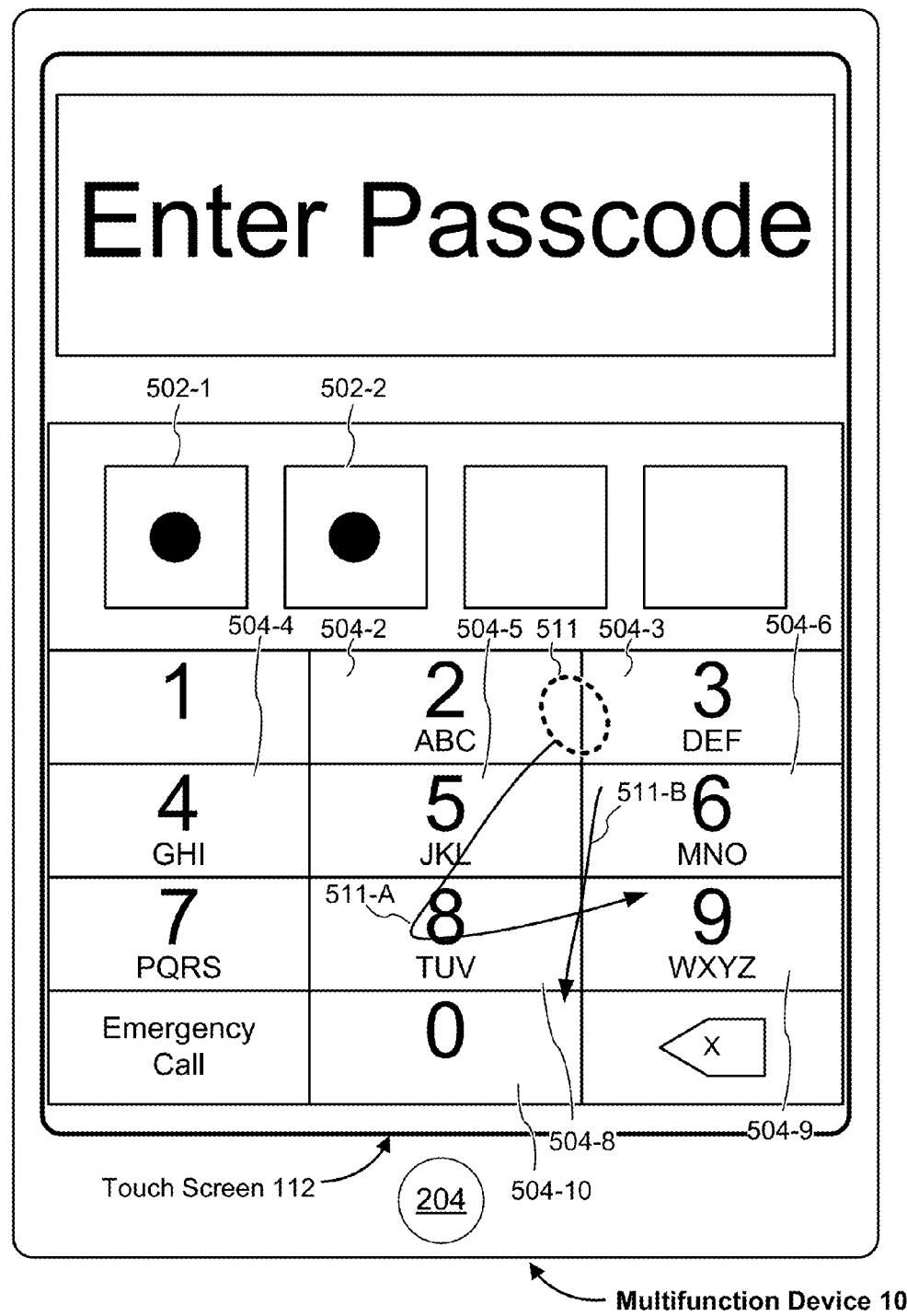

FIG. 5D illustrates that passcode input field 502-2 is updated (e.g., a circle is displayed in passcode input field 502-2 to indicate the receipt of a second character). FIG. 5D also illustrates touch gesture 511 detected on touch screen 112. Touch gesture 511 includes a movement of a finger contact across touch screen 112 along a path that corresponds to the character "4" (e.g., the path corresponds to the shape of the character "4"), thereby providing the character "4" as an input. As illustrated in FIG. 5D, the path of touch gesture 511 corresponding to the character "4" typically includes two or more discrete sub-paths 511-A and 511-B. For example, touch gesture 511 may include a finger contact moving across touch screen 112 along sub-path 511-A, followed by a lift-off of the finger contact off touch screen 112, and a subsequent finger contact moving across touch screen 112 along sub-path 511-B. Similarly, each of touch gestures that correspond to alphabet characters "A," "B," "E," "F," "G," "H," "K," "M," "N," "P," "Q," "R," "T," "X," and "Y" may include a plurality of sub-paths. In FIG. 5D, touch gesture 511 traverses locations on touch screen 112 that correspond to character icons 504-2, 504-3, 504-5, 504-6, 504-8, 504-9, and 504-10 without activating any of character icons 504-2, 504-3, 504-5, 504-6, 504-8, 504-9, and 504-10.

Figure 5E:
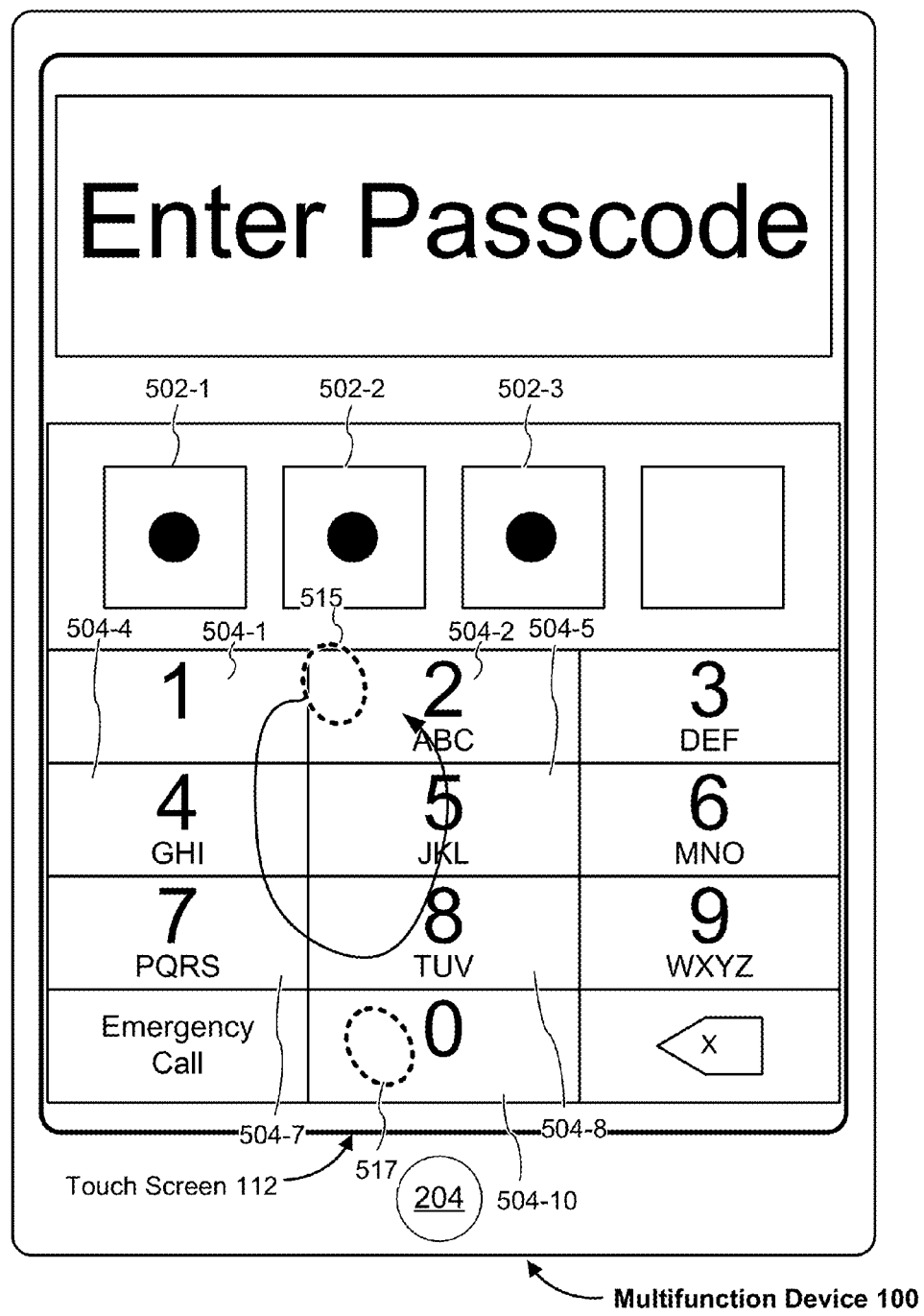

FIG. 5E illustrates that passcode input field 502-3 is updated (e.g., a circle is displayed in passcode input field 502-3 to indicate the receipt of a third character). FIG. 5E also illustrates touch gesture 515 detected on touch screen 112. Touch gesture 515 includes a movement of a finger contact across touch screen 112 along a path that corresponds to the character "0" (e.g., the path corresponds to the shape of the character "0"), thereby providing the character "0" as an input. In FIG. 5E, touch gesture 515 traverses locations on touch screen 112 that correspond to character icons 504-1, 504-2, 504-4, 504-5, 504-7, and 504-8 without activating any of character icons 504-1, 504-2, 504-4, 504-5, 504-7, and 504-8. Alternatively, instead of a handwriting gesture, a finger gesture 517 (e.g., a tap gesture) at a location that corresponds to character icon 504-10 may be used to provide the character "0" as an input.

Figure 5F:
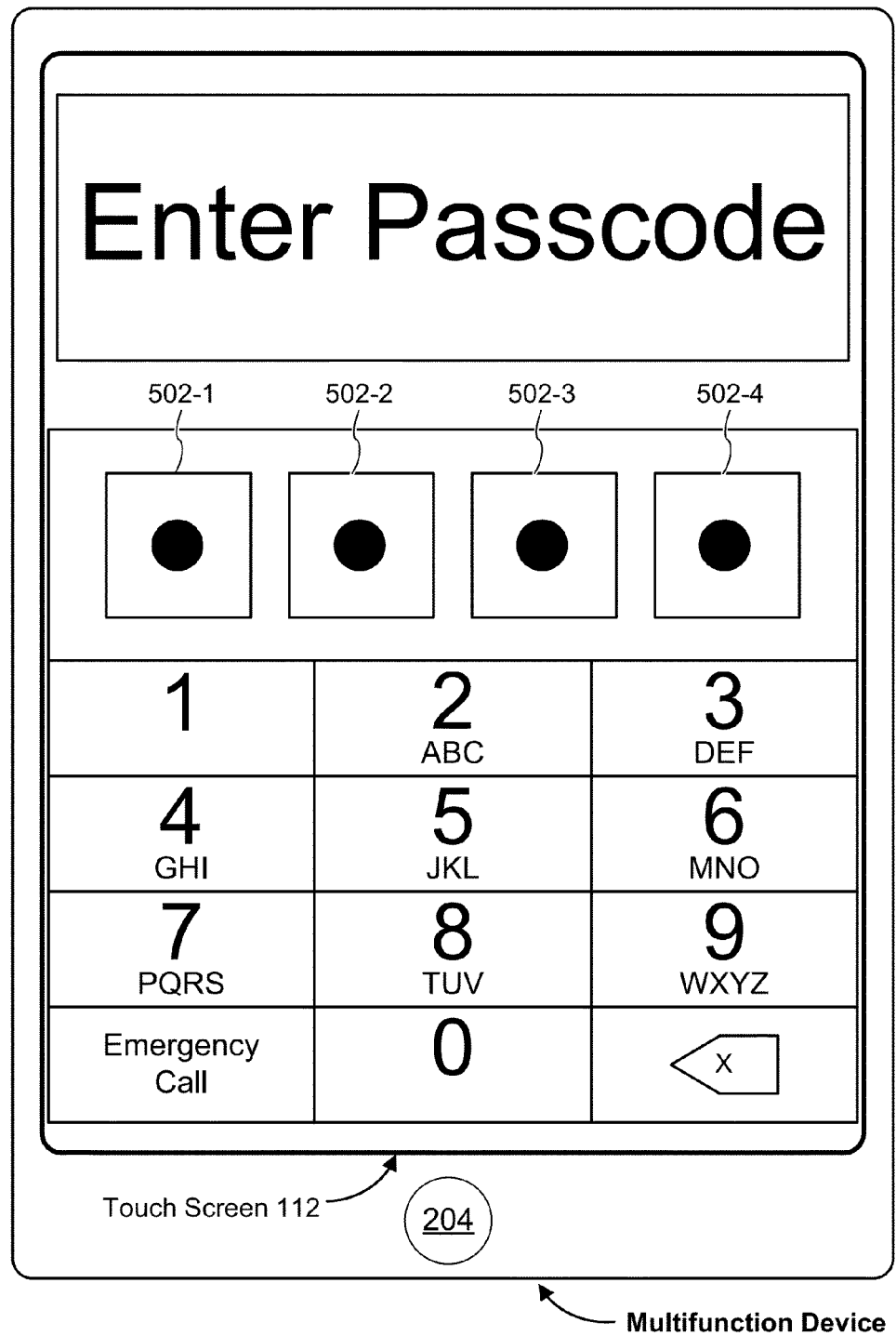

FIG. 5F illustrates that, in some embodiments, passcode input field 502-4 is updated (e.g., a circle is displayed in passcode input field 502-4 to indicate the receipt of a fourth character). In some embodiments, in response to determining that the sequence of received characters matches a predefined passcode (e.g., a predefined sequence of characters), device 100 displays an application launcher screen (e.g., FIG. 5G) or a screen from the application being used when the device was locked (not shown), without updating passcode input field 502-4.

Figure 5G:
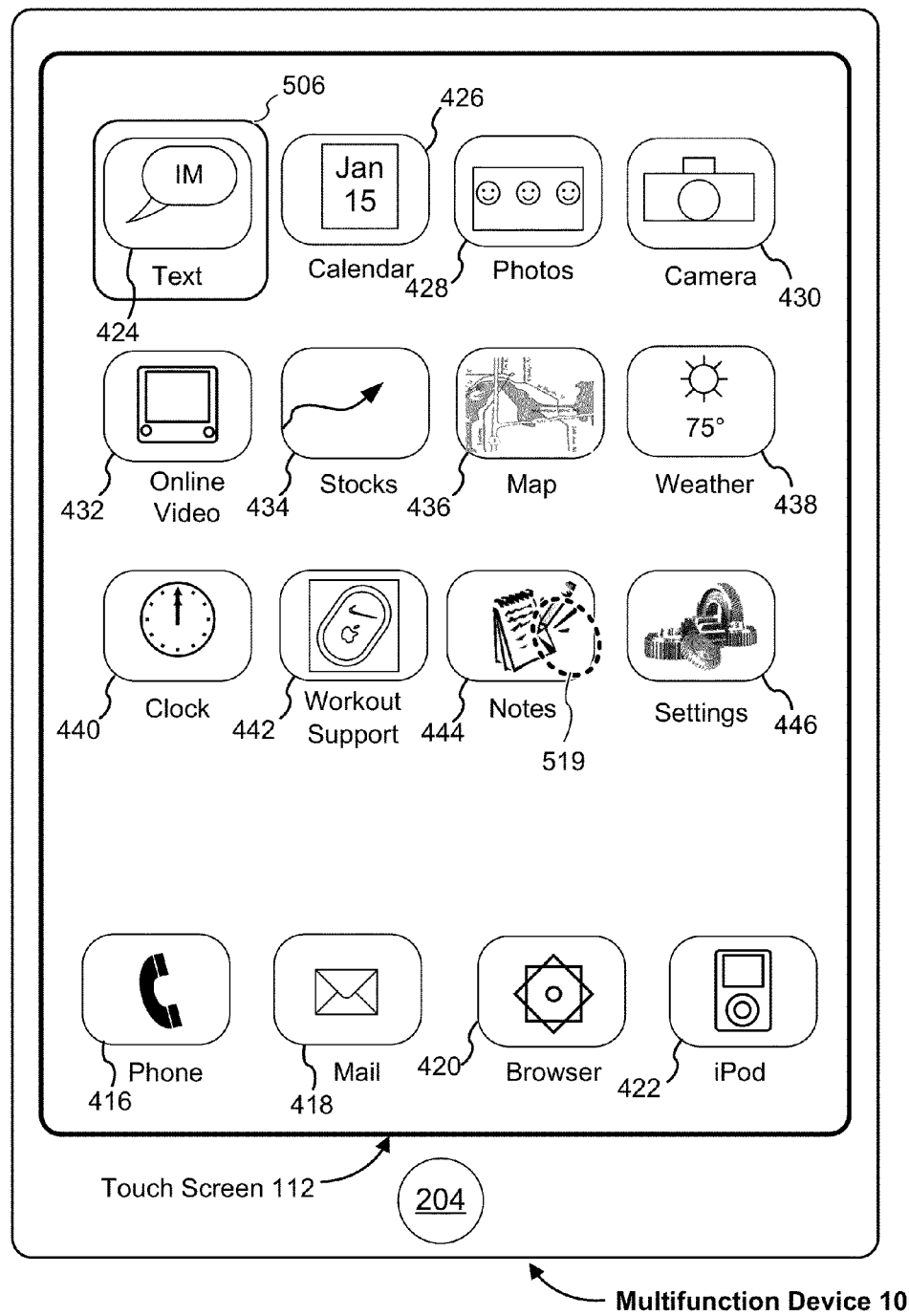

FIG. 5G illustrates an application launcher screen (e.g., a home screen) displayed in response to determining that the received characters correspond to a predefined passcode. The application launcher screen includes a plurality of application icons (e.g., icons 416, 418, 420, 422, 424, 426, 428, 430, 432, 434, 436, 438, 440, 442, 444, and 446 as described above with respect to FIG. 4A).

In FIG. 5G, current focus 506 is displayed at a location corresponding to application icon 424. In some embodiments, device 100 outputs audible accessibility information indicating that current focus 506 is located at the location corresponding to application icon 424 (e.g., audio output of the label of a corresponding application, "text").

FIG. 5G also illustrates that touch gesture 519 (e.g., a tap gesture) is detected at a location that corresponds to application icon 444.

Figure 5H:
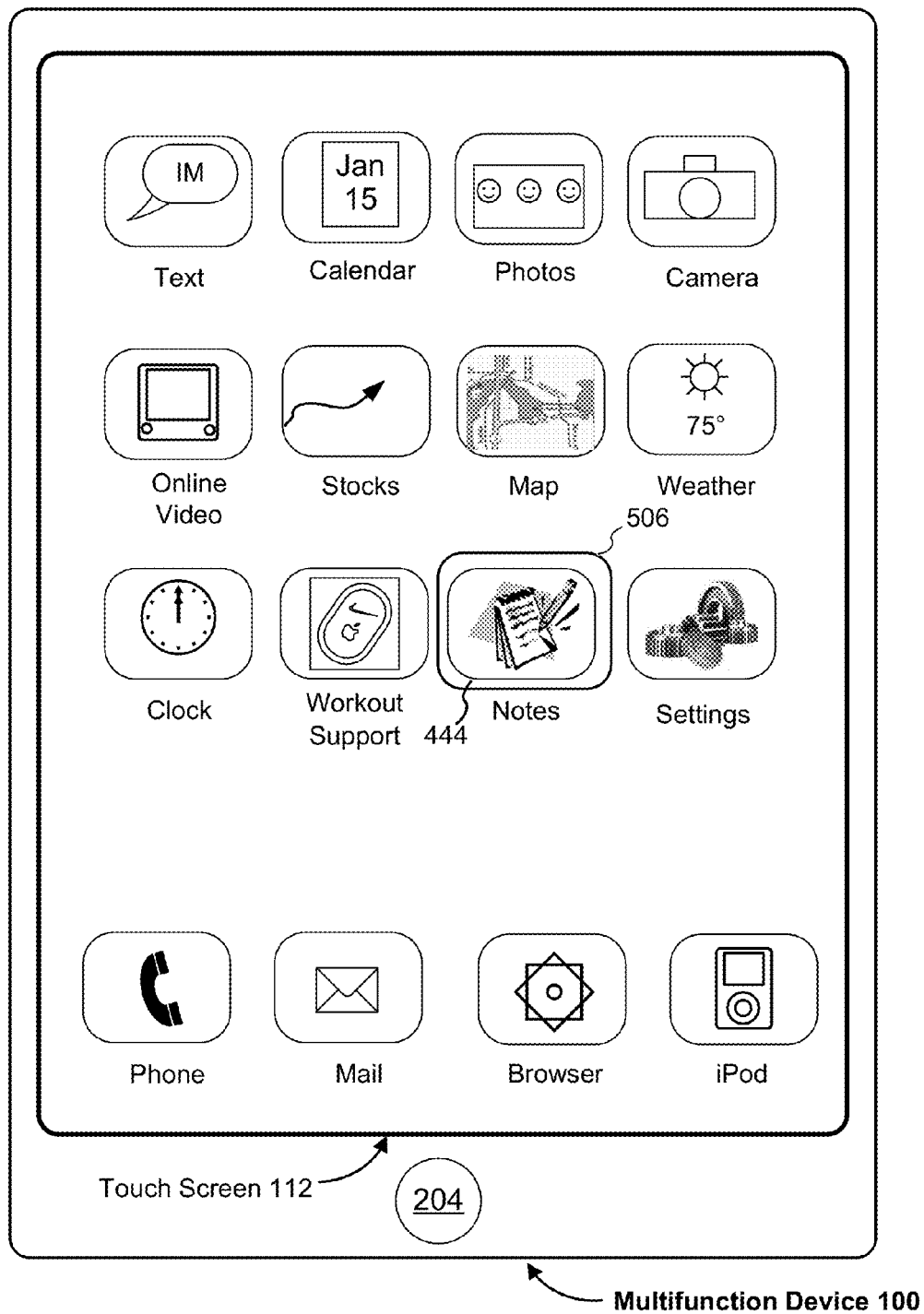

FIG. 5H illustrates that, in response to touch gesture 519 (FIG. 5G), current focus 506 is moved to a location corresponding to application icon 444. In some embodiments, device 100 outputs audible accessibility information indicating that current focus 506 is located at the location corresponding to application icon 444 (e.g., audio output of the label of a corresponding application, "notes").

Figure 5I:

FIG. 5I illustrates a passcode retry screen displayed in response to determining that the characters received on the passcode screen (e.g., "1240" as illustrated in FIGS. 5B-5E) do not correspond to the predefined passcode. While displaying the passcode retry screen, device 100 may receive handwritten characters again.

Figure 5J:
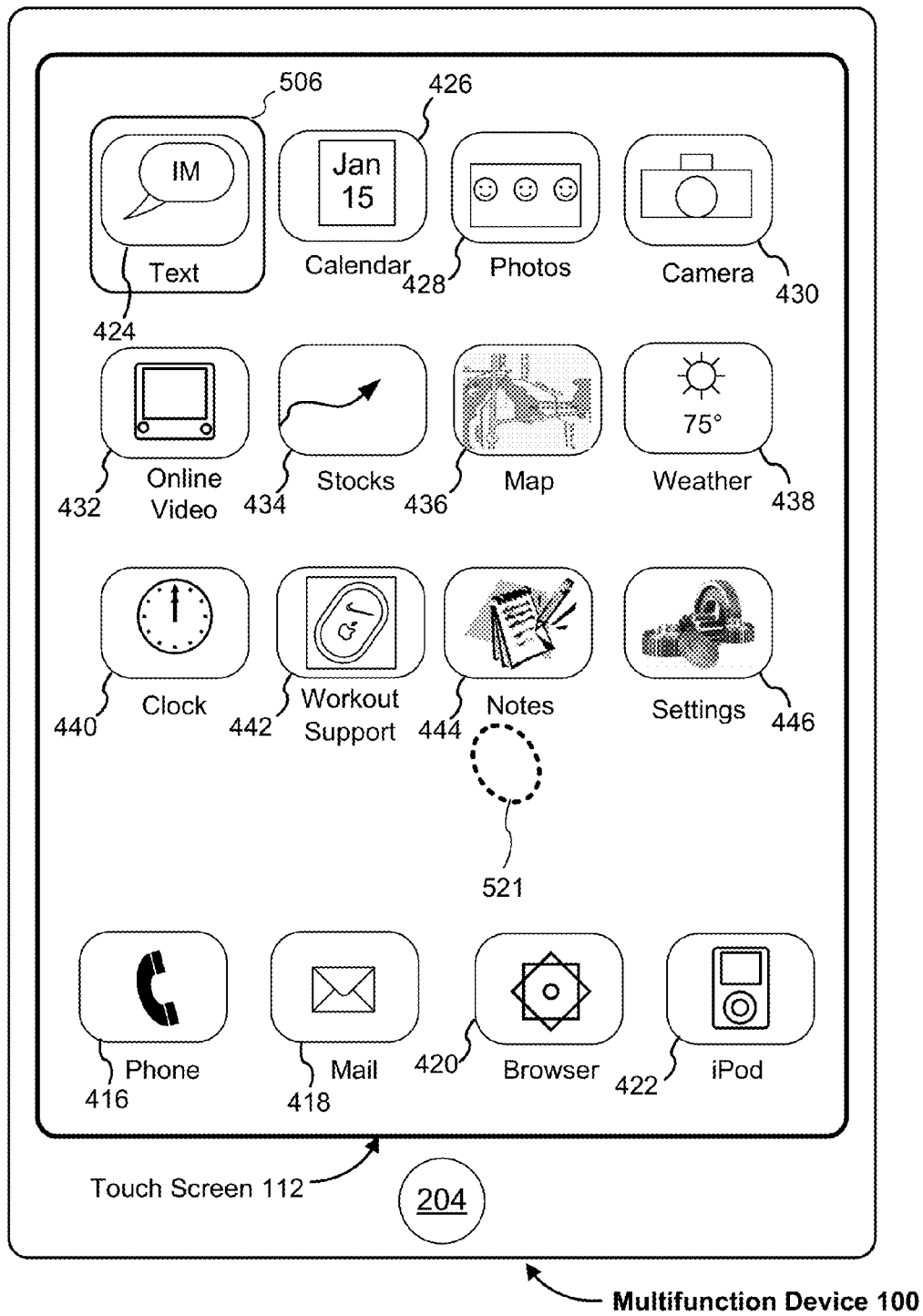

FIG. 5J illustrates an application launcher screen (e.g., a home screen) with a plurality of application icons. In FIG. 5J, current focus 506 is displayed at a location corresponding to application icon 424. FIG. 5J also illustrates that, in some embodiments, touch gesture 521 (e.g., a double-tap gesture) is detected on touch screen 112. In some embodiments, device 100 enters a handwriting gesture recognition mode in response to detecting touch gesture 521. Alternatively, device 100 may already be in the handwriting gesture recognition mode regardless of touch gesture 521.

Figure 5K:
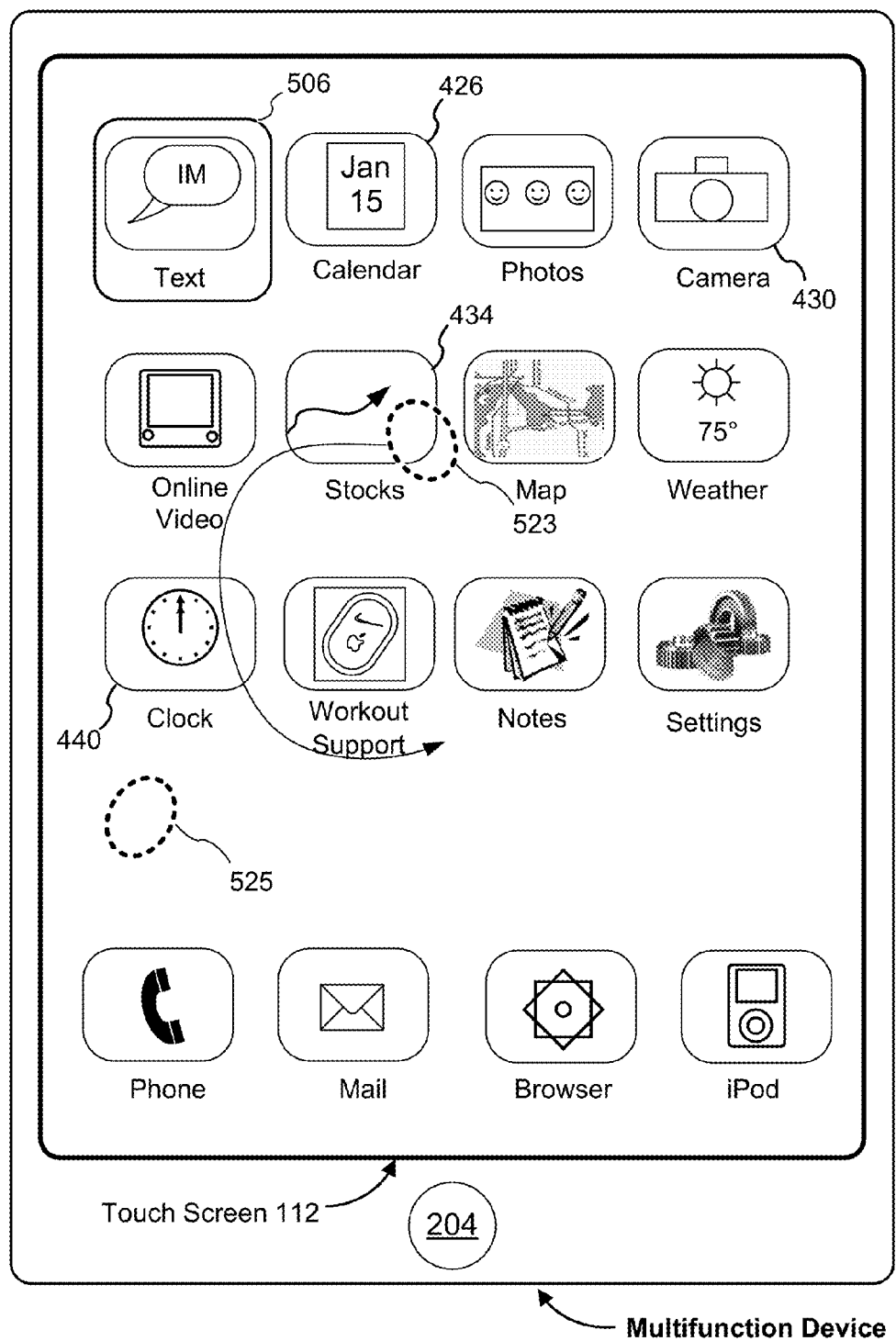

FIG. 5K illustrates touch gesture 523 detected on touch screen 112. Touch gesture 523 includes a movement of a finger contact across touch screen 112 along a path that corresponds to the character "c" (e.g., the path corresponds to the shape of the character "c"). In FIG. 5K, touch gesture 523 traverses locations on touch screen 112 that correspond to application icons 434 and 440 without activating any of application icons 434 and 440.

FIG. 5K also illustrates that, in some embodiments, finger contact 525 is concurrently detected with at least a portion of touch gesture 523 (e.g., finger contact 525 is detected while an initial portion of touch gesture 523 is detected). In some embodiments, finger contact 525 on touch screen 112 indicates that concurrent touch gesture 523 is a handwriting gesture.

In some embodiments, in response to detecting touch gesture 523 (FIG. 5K) that corresponds to the character "c," device 100 outputs audible accessibility information indicating the number of applications, for which application icons are displayed on touch screen 112, that have respective labels starting with the character "c." For example, in FIG. 5K, device 100 may generate a voice output that includes "three applications," because there are three application icons, namely "calendar," "camera," and "clock" application icons, that have respective labels starting with the character "c." Alternatively, in some embodiments, device 100 outputs audible accessibility information indicating the number of applications in the device that have respective labels starting with the character "c," regardless of whether application icons are currently being displayed for those applications starting with the character "c."

Figure 5L:
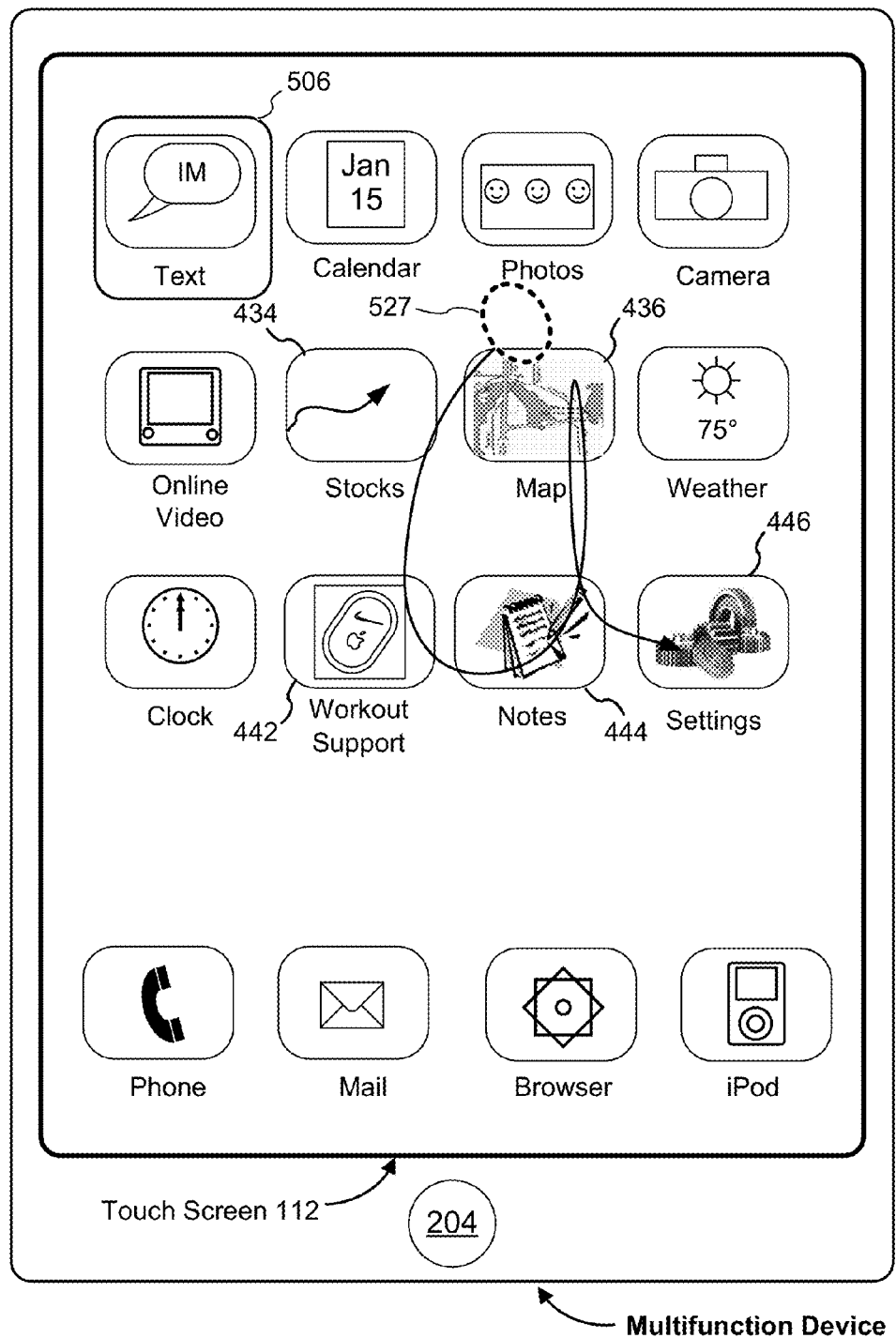

FIG. 5L illustrates touch gesture 527 detected on touch screen 112. Touch gesture 527 includes a movement of a finger contact across touch screen 112 along a path that corresponds to the character "a." In FIG. 5L, touch gesture 527 traverses locations on touch screen 112 that correspond to application icons 434, 436, 442, 444, and 446 without activating any of application icons 434, 436, 442, 444, and 446. In some embodiments, in response to detecting touch gesture 527 corresponding to the character "a" (so that the received characters correspond to "ca"), device 100 outputs audible accessibility information indicating the number of applications, for which application icons are displayed on touch screen 112, that start with the characters "ca." For example, in FIG. 5L, device 100 may generate a voice output that includes "two applications," because there are two applications icons, namely "calendar" and "camera" application icons, that have respective labels starting with the characters "ca." Alternatively, in some embodiments, device 100 outputs audible accessibility information indicating the number of applications in the device that have respective labels starting with the characters "ca," regardless of whether application icons are currently being displayed for those applications starting with the characters "ca."

Figure 5M:
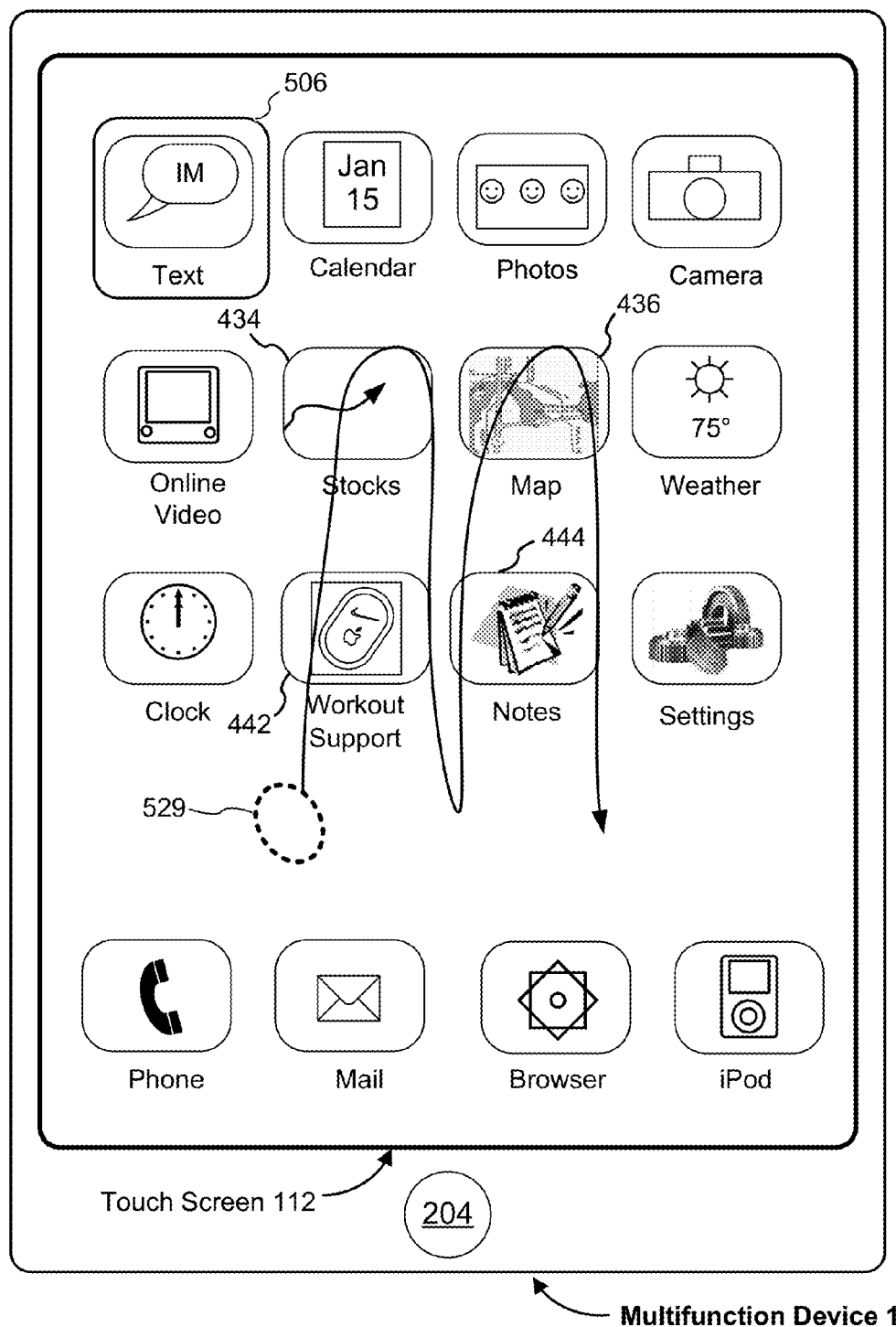

FIG. 5M illustrates touch gesture 529 detected on touch screen 112. Touch gesture 529 includes a movement of a finger contact across touch screen 112 along a path that corresponds to the character "m" (e.g., the path corresponds to the shape of the character "m"). In FIG. 5M, touch gesture 529 traverses locations on touch screen 112 that correspond to application icons 434, 436, 442, and 444 without activating any of application icons 434, 436, 442, and 444.

Figure 5N:
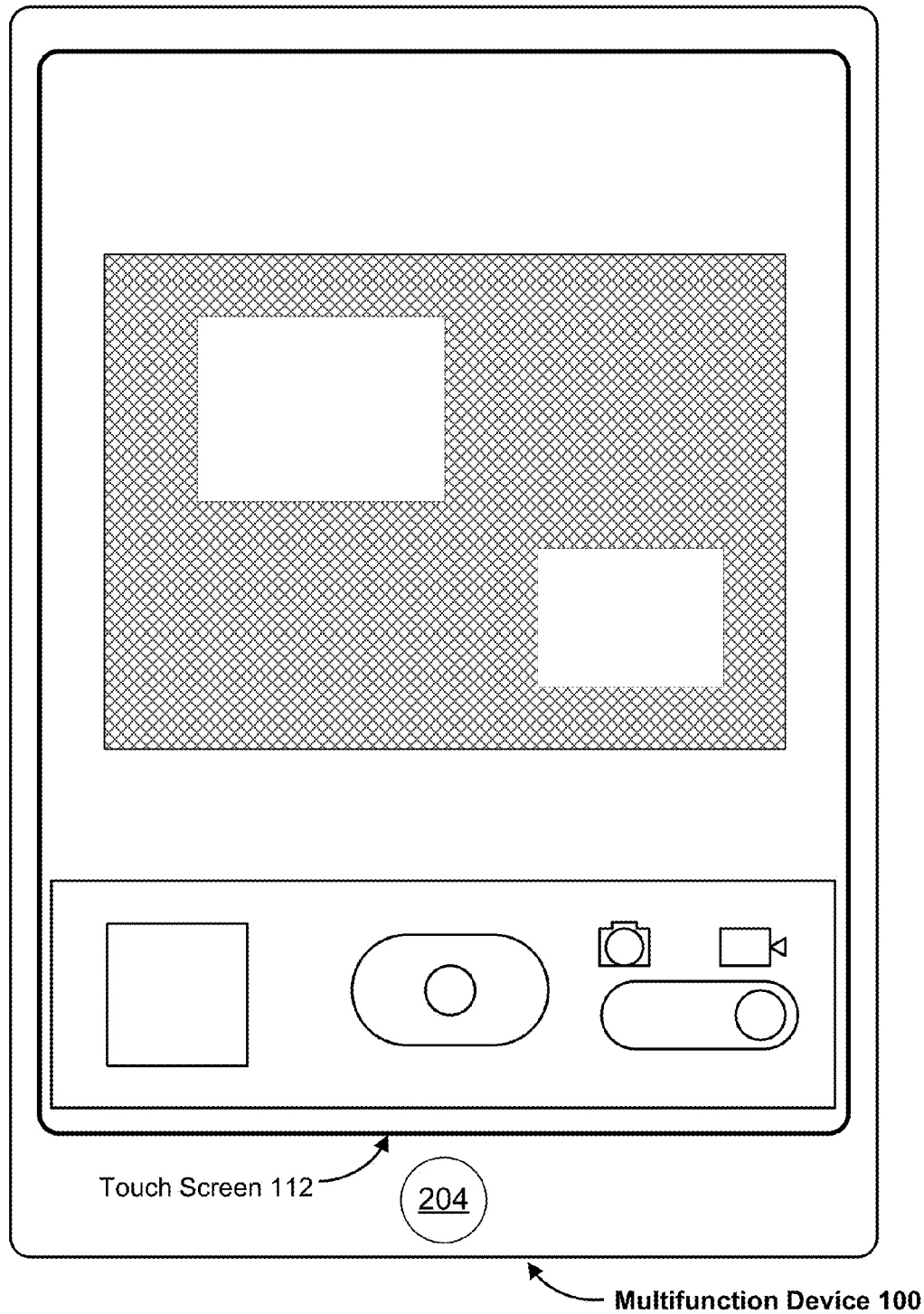

FIG. 5N illustrates that, in some embodiments, in response to detecting touch gesture 529 (FIG. 5M) corresponding to the character "m" (so that the received characters correspond to "cam", which in this example corresponds to a single application icon on the display or a single application in the device), a user interface of an application that corresponds to the received characters is displayed on touch screen 112. The user interface illustrated in FIG. 5N is an exemplary user interface of camera module 143 (FIG. 1A) that has a label "camera" corresponding to the received characters "cam."

Figure 5O:
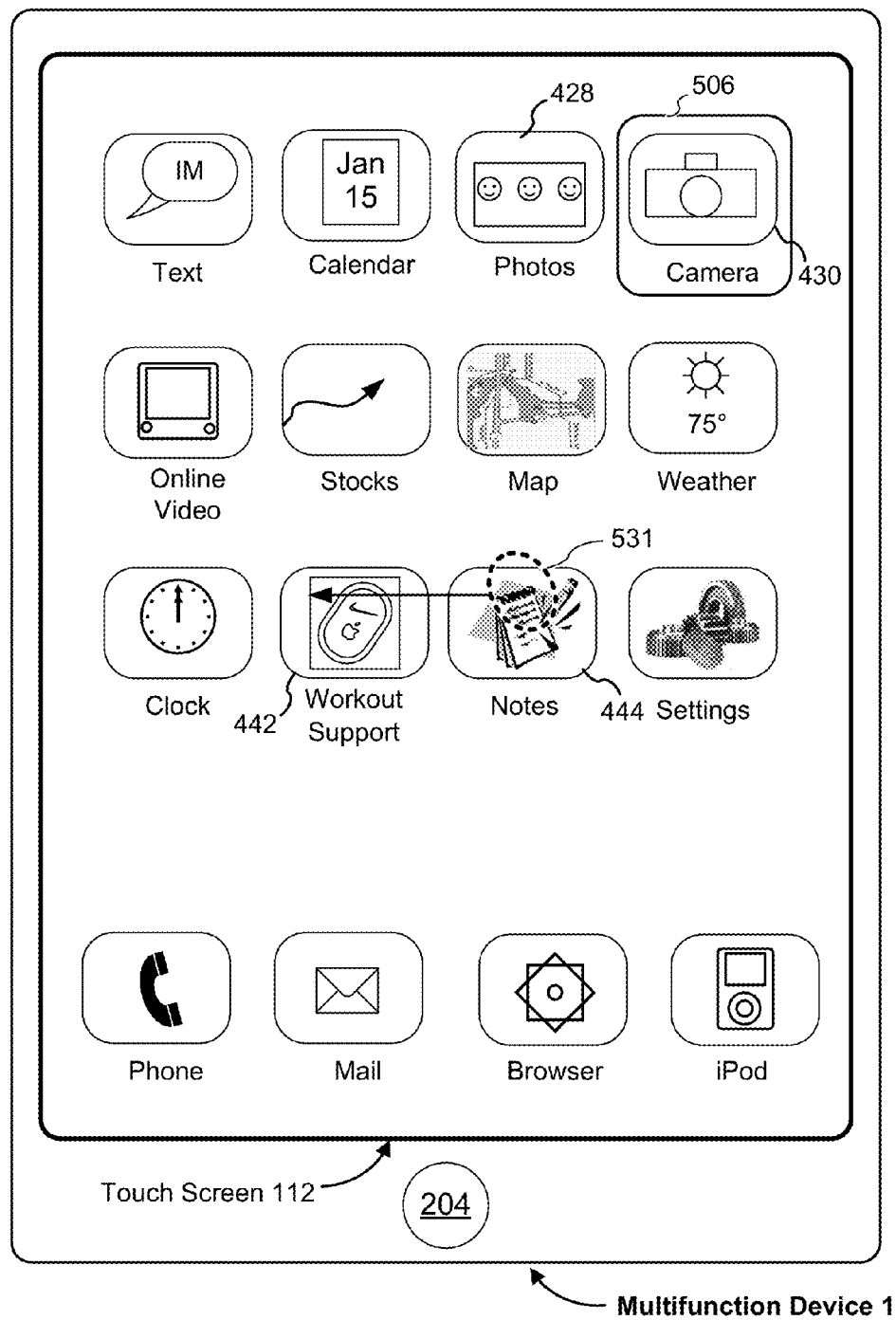

FIG. 5O illustrates an alternative user interface displayed in response to detecting touch gesture 529 (FIG. 5M) in accordance with some embodiments. FIG. 5O illustrates that, in some embodiments, in response to detecting touch gesture 529 corresponding to the character "m" (so that the received characters correspond to "cam"), instead of launching an application that corresponds to the received characters, current focus 506 moves to a location that corresponds to application icon 430. In FIG. 5O, application icon 430 corresponds to the received characters "cam," because the label for the corresponding application "camera" begins with the characters "cam." In some embodiments, in response to detecting touch gesture 529 (FIG. 5M) corresponding to the character "m," device 100 generates a voice output that includes the name of the single application that begins with the letters "cam," such as outputting "camera," "camera application," or "camera application, double tap to open the camera application."

FIG. 5O also illustrates touch gesture 531 (e.g., a left-swipe gesture) detected on touch screen 112. In FIG. 5O, touch gesture 531 traverses locations on touch screen 112 that correspond to application icons 442 and 444 without activating any of application icons 442 and 444.

Figure 5P:
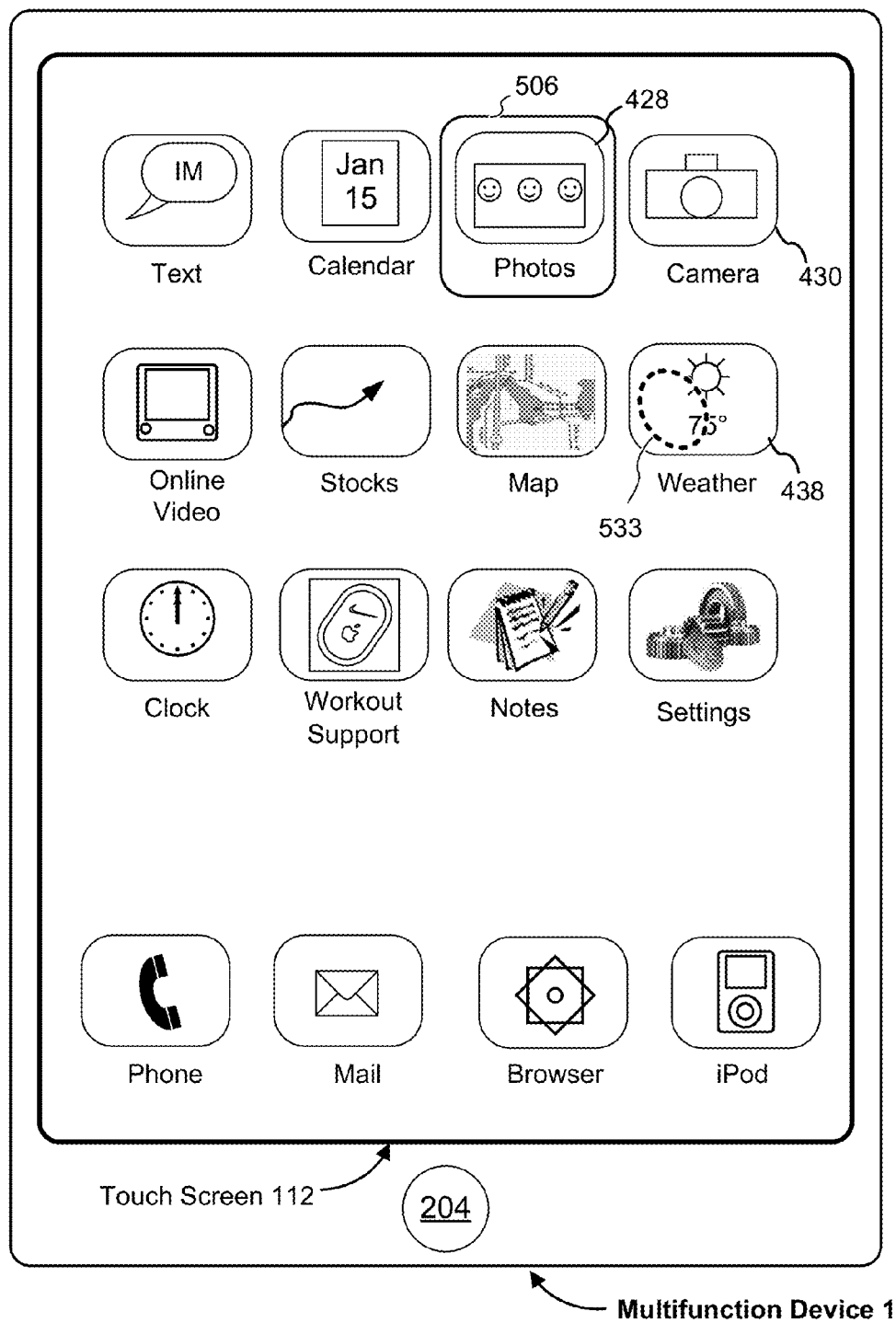

FIG. 5P illustrates that, in response to detecting touch gesture 531 (FIG. 5O), current focus 506 moves to a location corresponding to application icon 428 that is located next to application icon 430, around which current focus 506 was displayed before detecting touch gesture 531 (FIG. 5O).

FIG. 5P also illustrates touch gesture 533 (e.g., a tap gesture) detected at a location that corresponds to application icon 438.

Figure 5Q:
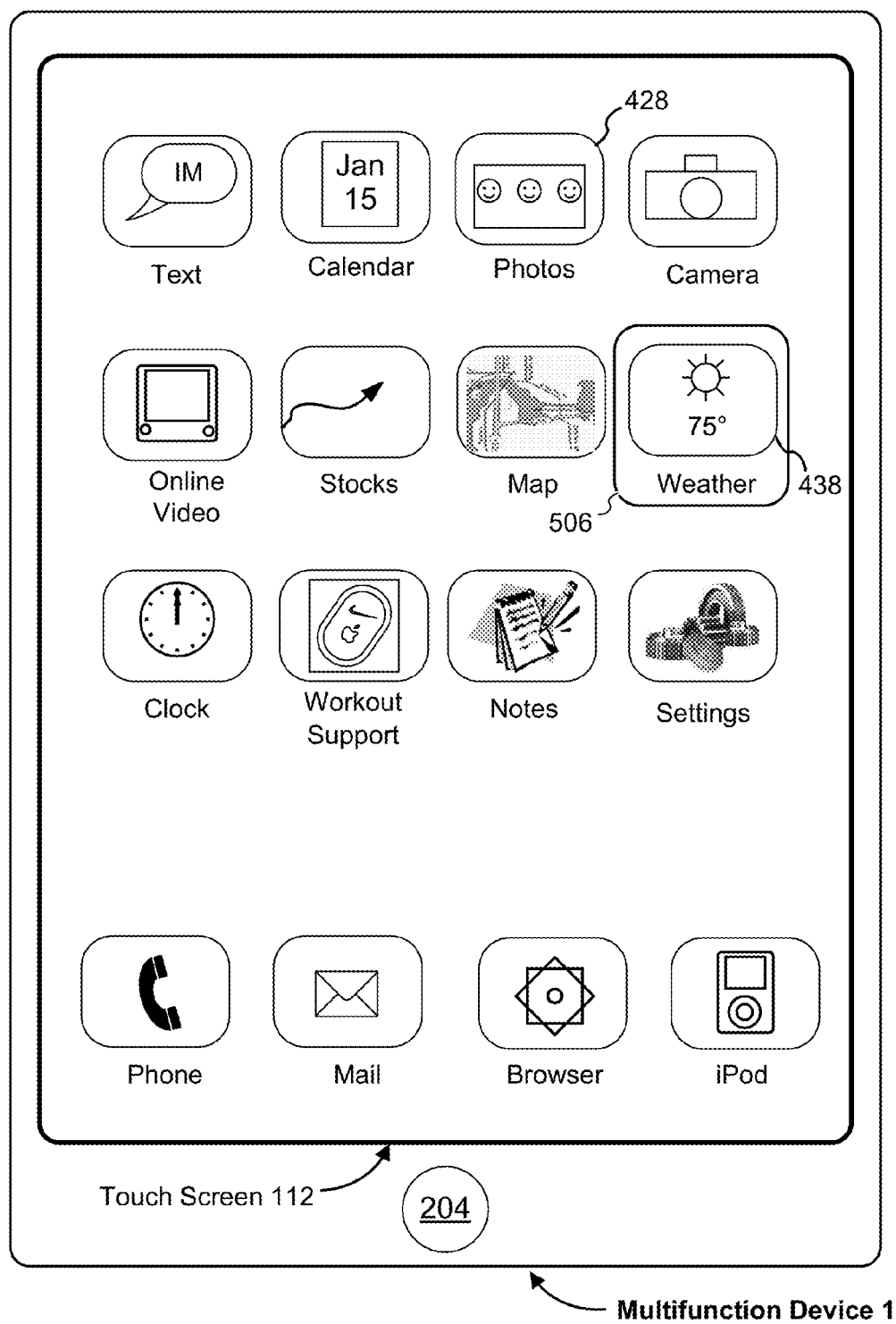

FIG. 5Q illustrates that, in response to detecting touch gesture 533 (FIG. 5P), current focus 506 moves to a location that corresponds to application icon 438.

FIGS. 5R-5V and 5AM-5AO illustrate exemplary user interfaces associated with one or more lists of entries in accordance with some embodiments.

Figure 5R:
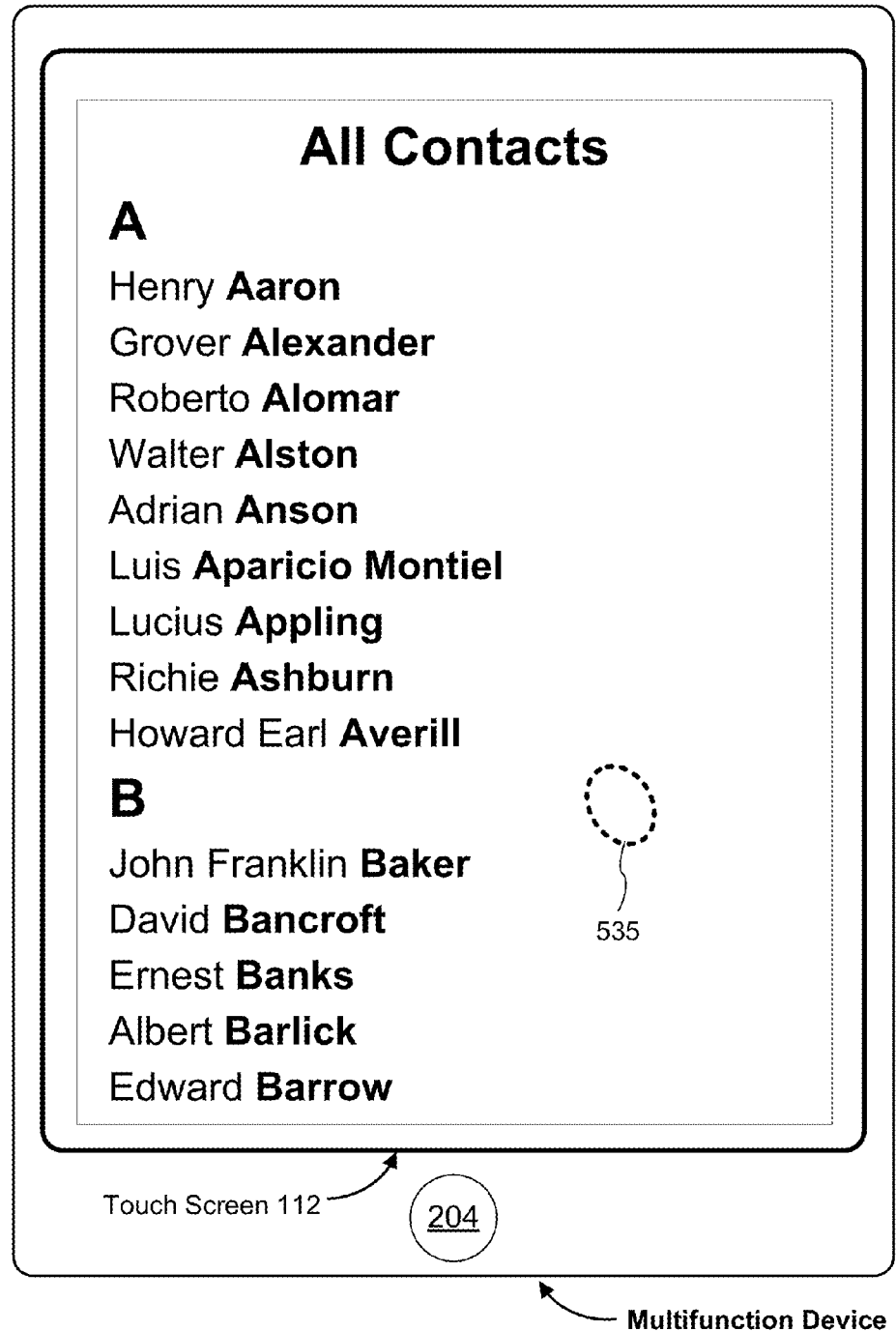

FIG. 5R illustrates an exemplary user interface including a portion (e.g., an initial portion) of a list of entries (e.g., a list of contacts or names). FIG. 5R also illustrates touch gesture 535 (e.g., a double-tap gesture) detected on touch screen 112. In some embodiments, device 100 enters a handwriting gesture recognition mode in response to detecting touch gesture 535. Alternatively, device 100 may already be in the handwriting gesture recognition mode regardless of touch gesture 535.

Figure 5S:
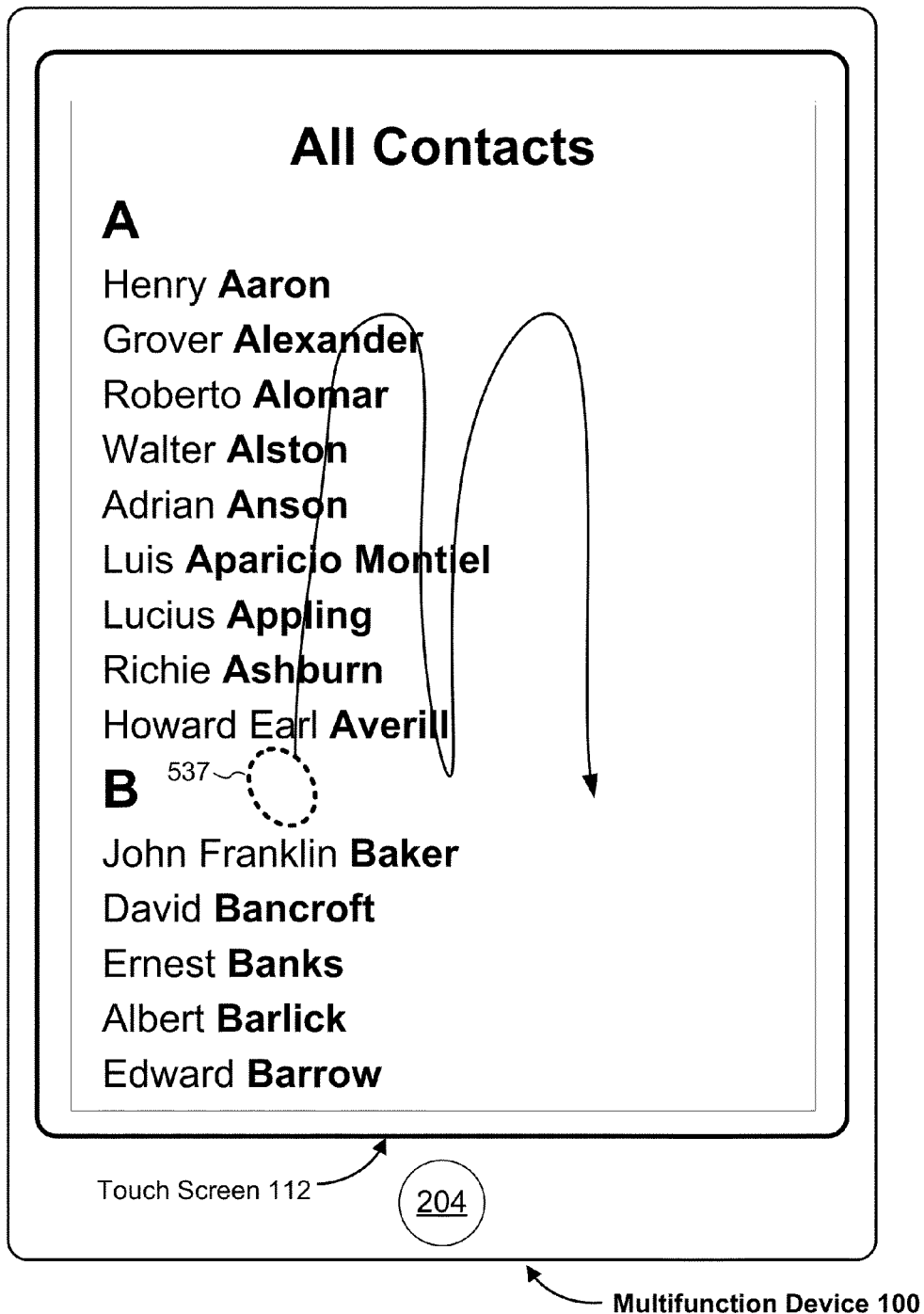

FIG. 5S illustrates touch gesture 537 detected on touch screen 112. Touch gesture 537 includes a movement of a finger contact across touch screen 112 along a path that corresponds to the character "m" (e.g., the path corresponds to the shape of the character "m"). In FIG. 5S, touch gesture 537 traverses locations on touch screen 112 that correspond to a plurality of entries (e.g., from "Grover Alexander" to "Howard Earl Averill") without activating any of the plurality of entries. In some embodiments, activating a respective entry initiates displaying additional information about the respective entry (e.g., contact information, such as a phone number, address, email address, etc.).

Figure 5T:
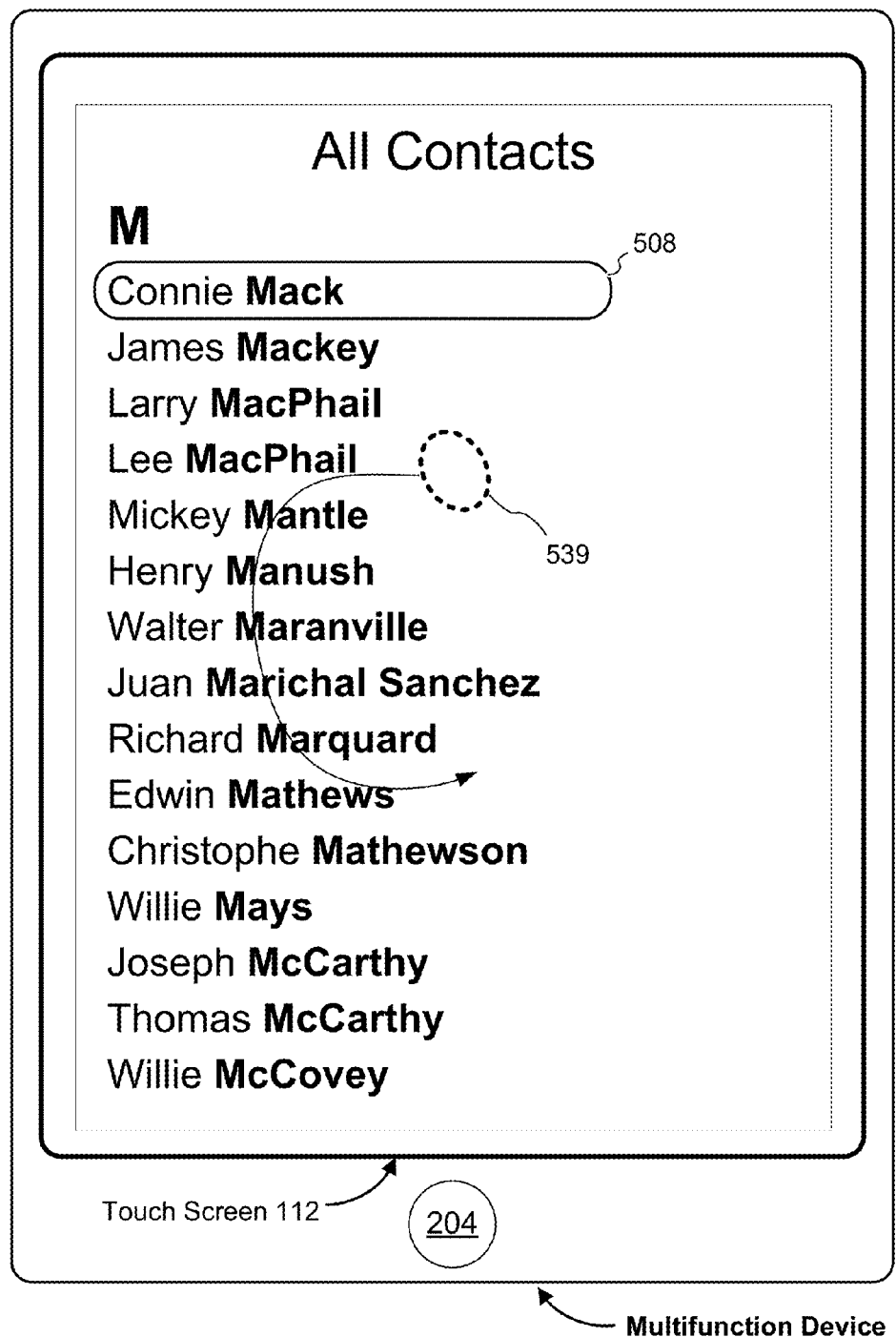

FIG. 5T illustrates that, in response to detecting touch gesture 537 (FIG. 5S), a second portion of the list of entries that corresponds to the character "m" is displayed on touch screen 112. For example, in the list of entries, "Connie Mack" is the first entry 508 that has the last name starting with the character "m". In FIG. 5T, a portion of the list of entries that starts with "Connie Mack" is displayed on touch screen 112.

FIG. 5T also illustrates touch gesture 539 detected on touch screen 112. Touch gesture 539 includes a movement of a finger contact across touch screen 112 along a path that corresponds to the character "c." In FIG. 5T, touch gesture 539 traverses locations on touch screen 112 that correspond to a plurality of entries (e.g., from "Mickey Mantle" to "Edwin Mathews") without activating any of the plurality of entries.

Figure 5U:
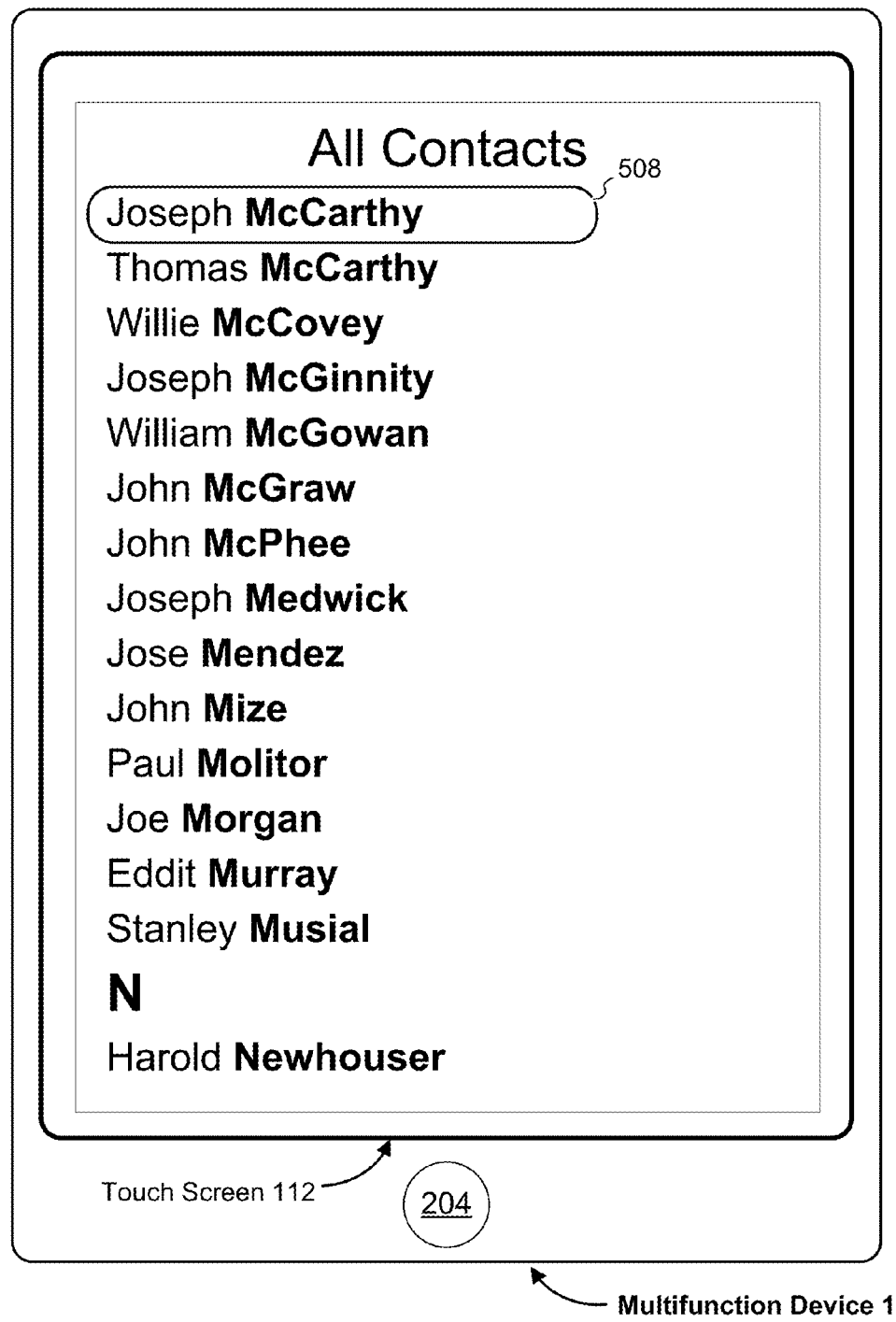

FIG. 5U illustrates that, in some embodiments, in response to detecting touch gesture 539 (FIG. 5T), a third portion of the list of entries that corresponds to the characters "mc" is displayed on touch screen 112. For example, in the list of entries, "Joseph McCarthy" is the first entry 508 that has the last name that starts with the characters "mc." In FIG. 5U, a portion of the list of entries that starts with "Joseph McCarthy" is displayed on touch screen 112. As shown in FIG. 5U, in some embodiments, one or more entries subsequent to the entry "Joseph McCarthy" that have last names not starting with "mc" are also displayed on touch screen 112 (e.g., "Joseph Medwick," "Stanley Musial," "Harold Newhouser," etc.).

Figure 5V:
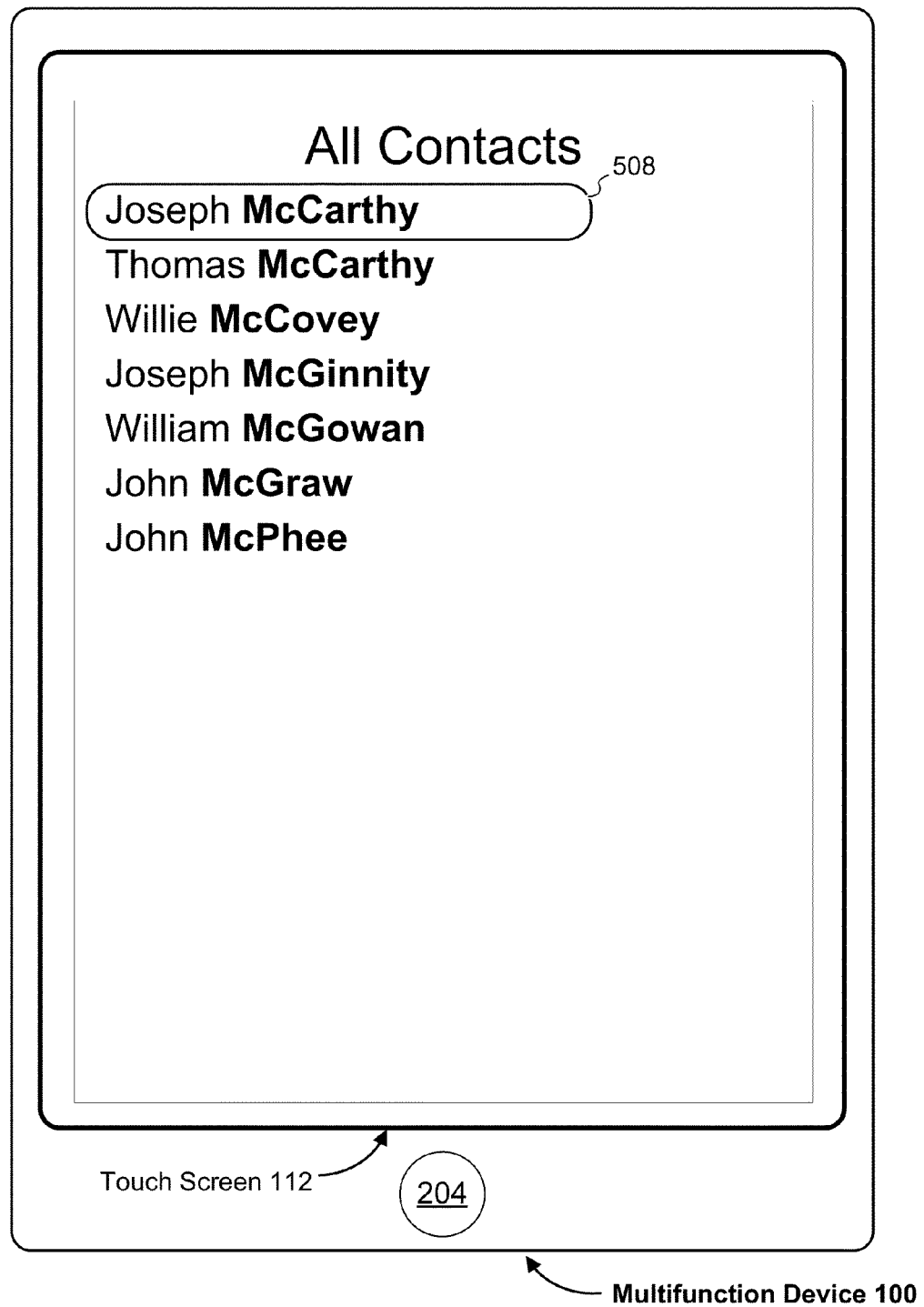

FIG. 5V illustrates an alternative user interface displayed in response to detecting touch gesture 539 (FIG. 5T) in accordance with some embodiments. In FIG. 5V, only a list of entries that have last names starting with the received characters (e.g., "mc") is displayed on touch screen 112. Entries that have last names not starting with the received characters (e.g., "mc") are not displayed on touch screen 112 (e.g., "Joseph Medwick" is not displayed).

FIGS. 5AM-5AO illustrate alternative user interfaces associated with one or more lists of entries in accordance with some embodiments.

FIG. 5AM illustrates an alternative user interface including a portion (e.g., an initial portion) of a list of entries (e.g., a list of contacts or names) and index 524. In FIG. 5AM, current focus 522 is displayed over the words "All Contacts." FIG. 5AM also illustrates touch gesture 575 (e.g., a tap gesture) detected at a location corresponding to index 524 on touch screen 112.

FIG. 5AN illustrates that current focus 522 moves to index 524. Figure 5AN also illustrates touch gesture 577 detected on touch screen 112. Touch gesture 577 includes a movement of a finger contact across touch screen 112 along a path that corresponds to the character "m" (e.g., the path corresponds to the shape of the character "m"). In FIG. 5AN, touch gesture 577 traverses locations on touch screen 112 that correspond to a plurality of entries (e.g., from "Grover Alexander" to "Howard Earl Averill") without activating any of the plurality of entries. In some embodiments, activating a respective entry initiates displaying additional information about the respective entry (e.g., contact information, such as a phone number, address, email address, etc.).

FIG. 5AO illustrates that, in response to detecting touch gesture 577 (FIG. 5AN), a second portion of the list of entries that corresponds to the character "m" is displayed on touch screen 112. For example, in the list of entries, "Connie Mack" is the first entry that has the last name starting with the character "m". In FIG. 5AO, a portion of the list of entries that starts with "Connie Mack" is displayed on touch screen 112.

FIGS. 5W-5Z illustrate exemplary user interfaces associated with a list of items in accordance with some embodiments.

Figure 5W:
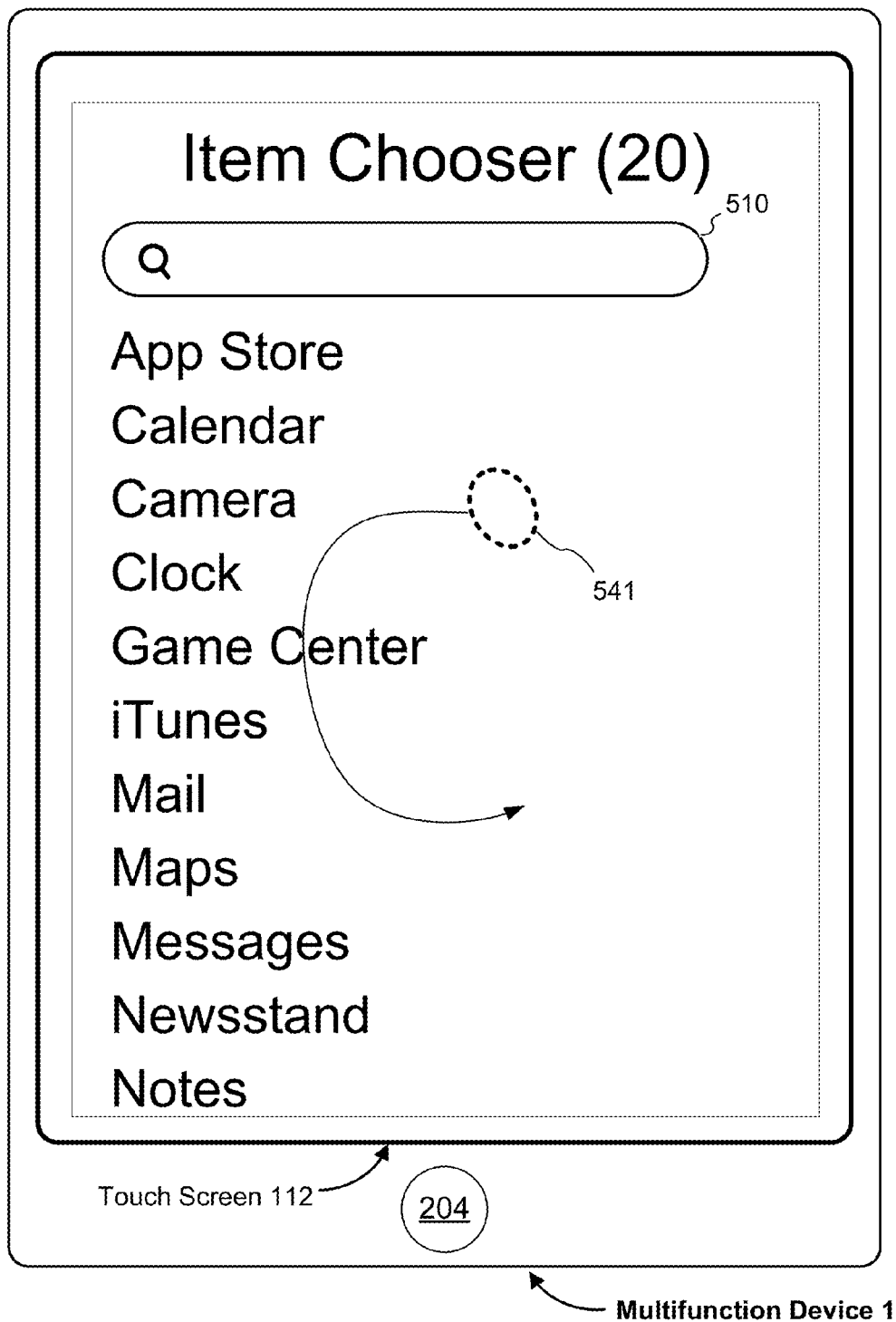

FIG. 5W illustrates an exemplary user interface for an item chooser including a search entry area 510 and a list of items (e.g., a list of applications). FIG. 5W also illustrates touch gesture 541 detected on touch screen 112. Touch gesture 541 includes a movement of a finger contact across touch screen 112 along a path that corresponds to the character "c." In FIG. 5W, touch gesture 541 traverses a location on touch screen 112 that corresponds to an item "games center" without activating the item "games center." In some embodiments, activating an item in the user interface for the item chooser initiates launching an application corresponding to the item. For example, activating the "games center" item may initiate launching a "games center" application.

Figure 5X:
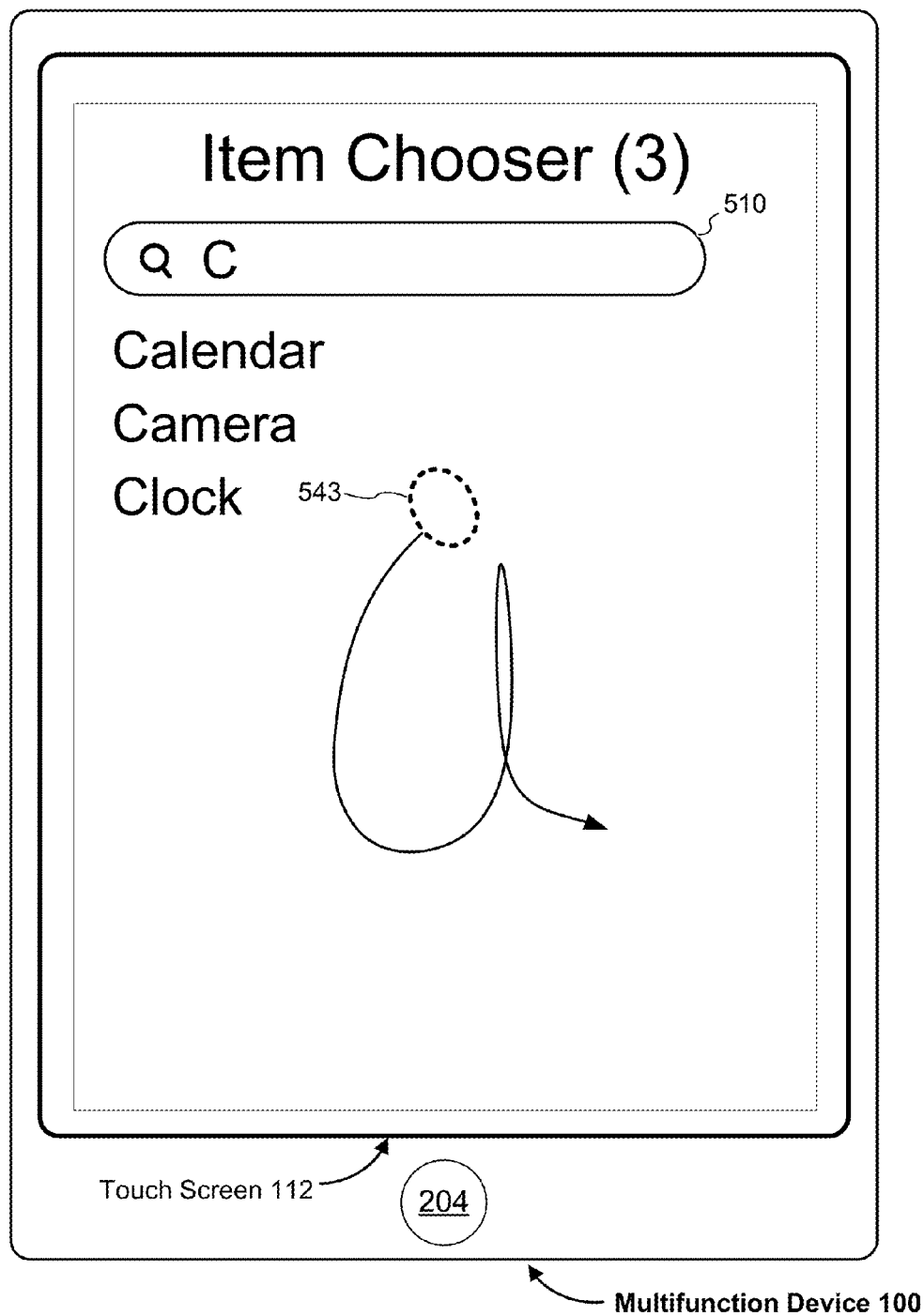

FIG. 5X illustrates that, in response to detecting touch gesture 541 (FIG. 5W), a list of items that correspond to the received character "c" is displayed on touch screen 112 (e.g., "calendar," "camera," and "clock"). In some embodiments, device 100 outputs audible accessibility information indicating a number of items displayed on touch screen 112. For example, in FIG. 5X, device 100 may generate a voice output that includes "three items." In some embodiments, device 100 outputs audible accessibility information indicating the items displayed on touch screen 112 (e.g., a voice output that states "calendar," "camera," and "clock").

FIG. 5X also illustrates touch gesture 543 detected on touch screen 112. Touch gesture 543 includes a movement of a finger contact across touch screen 112 along a path that corresponds to the character "a." In FIG. 5X, touch gesture 543 does not traverse a location on touch screen 112 that corresponds to any of the items displayed on touch screen 112.

Figure 5Y:
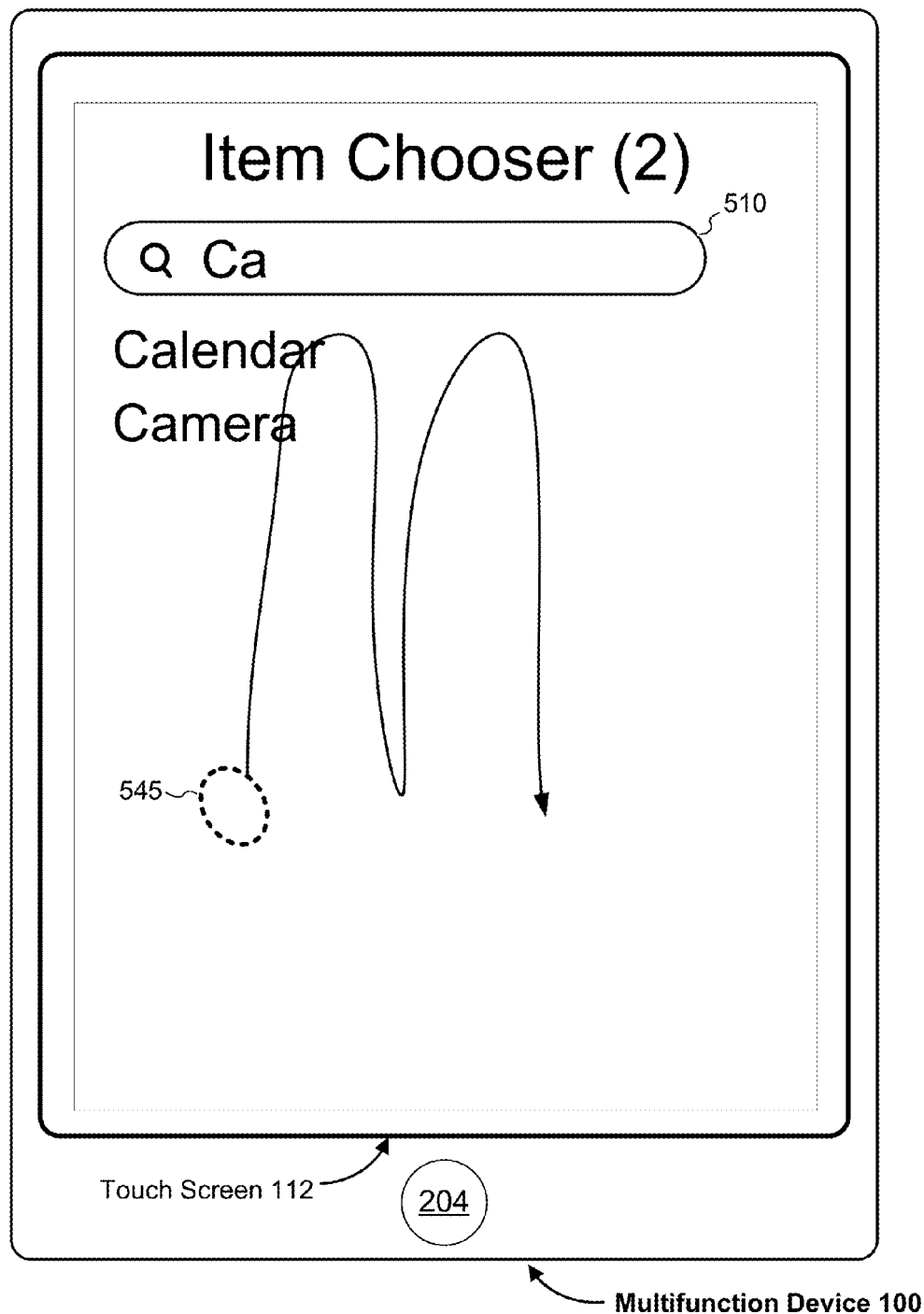

FIG. 5Y illustrates that, in response to detecting touch gesture 543 (FIG. 5X), a list of items that correspond to the received characters "ca" is displayed on touch screen 112 (e.g., "calendar" and "camera"). In some embodiments, device 100 outputs audible accessibility information indicating a number of items displayed on touch screen 112. For example, in FIG. 5Y, device 100 may generate a voice output that includes "two items." In some embodiments, device 100 outputs audible accessibility information indicating the items displayed on touch screen 112 (e.g., a voice output that states "calendar" and "camera").

FIG. 5Y also illustrates touch gesture 545 detected on touch screen 112. Touch gesture 545 includes a movement of a finger contact across touch screen 112 along a path that corresponds to the character "m." In FIG. 5Y, touch gesture 545 traverses locations on touch screen 112 that correspond to the items displayed on touch screen 112 (e.g., "calendar" and "camera") without activating the traversed items.

Figure 5Z:
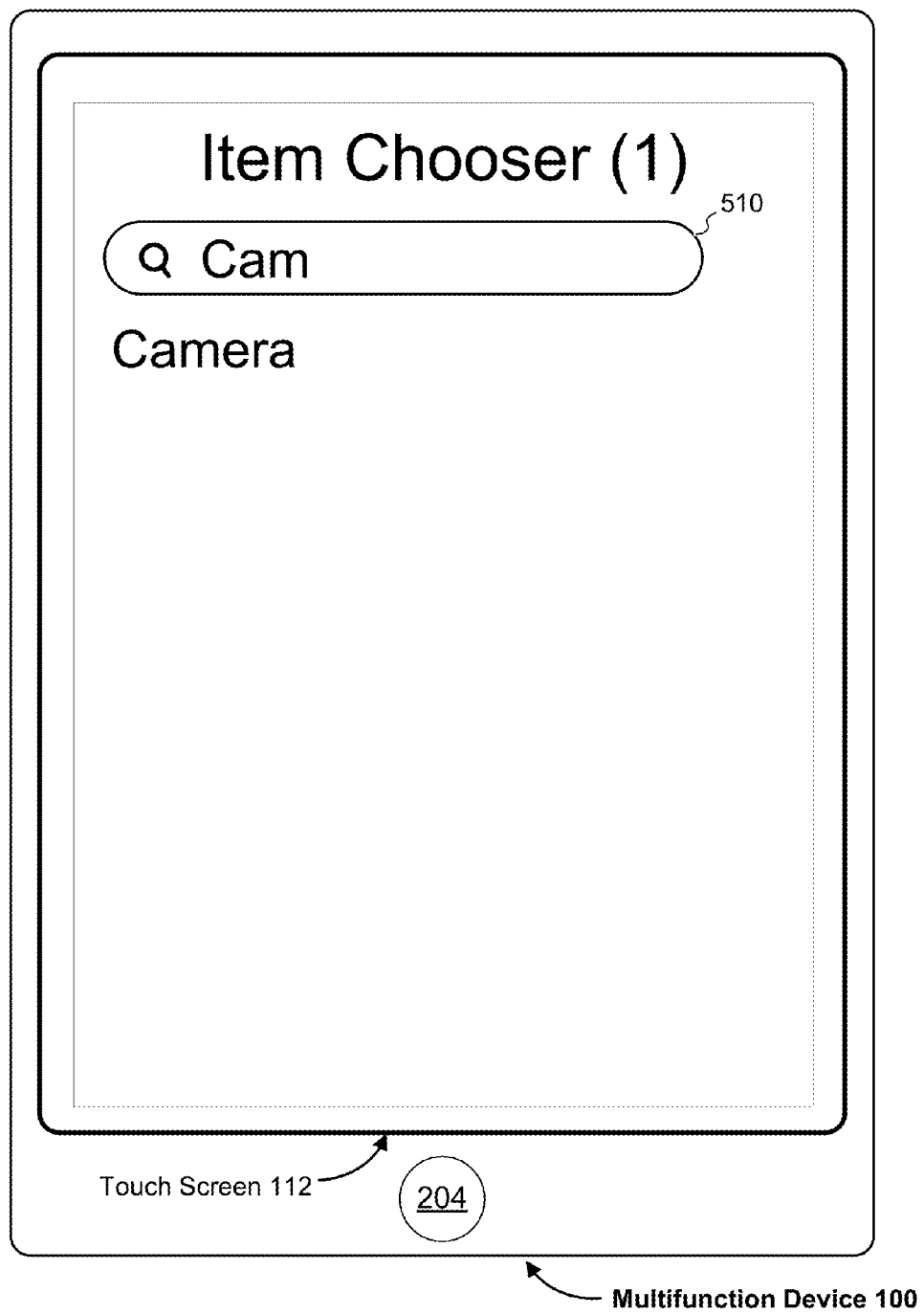
Figure 5A:
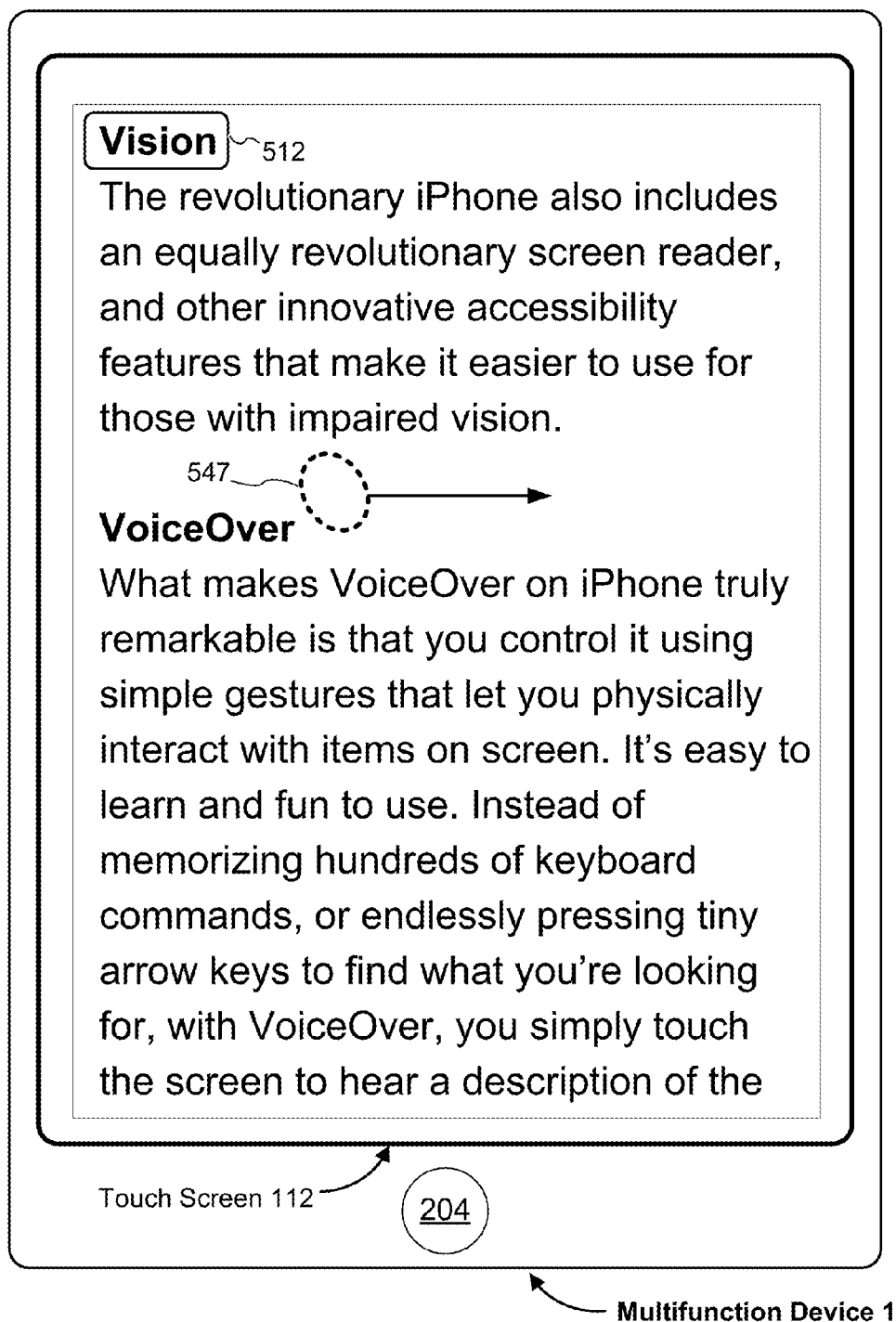
Figure 5A:
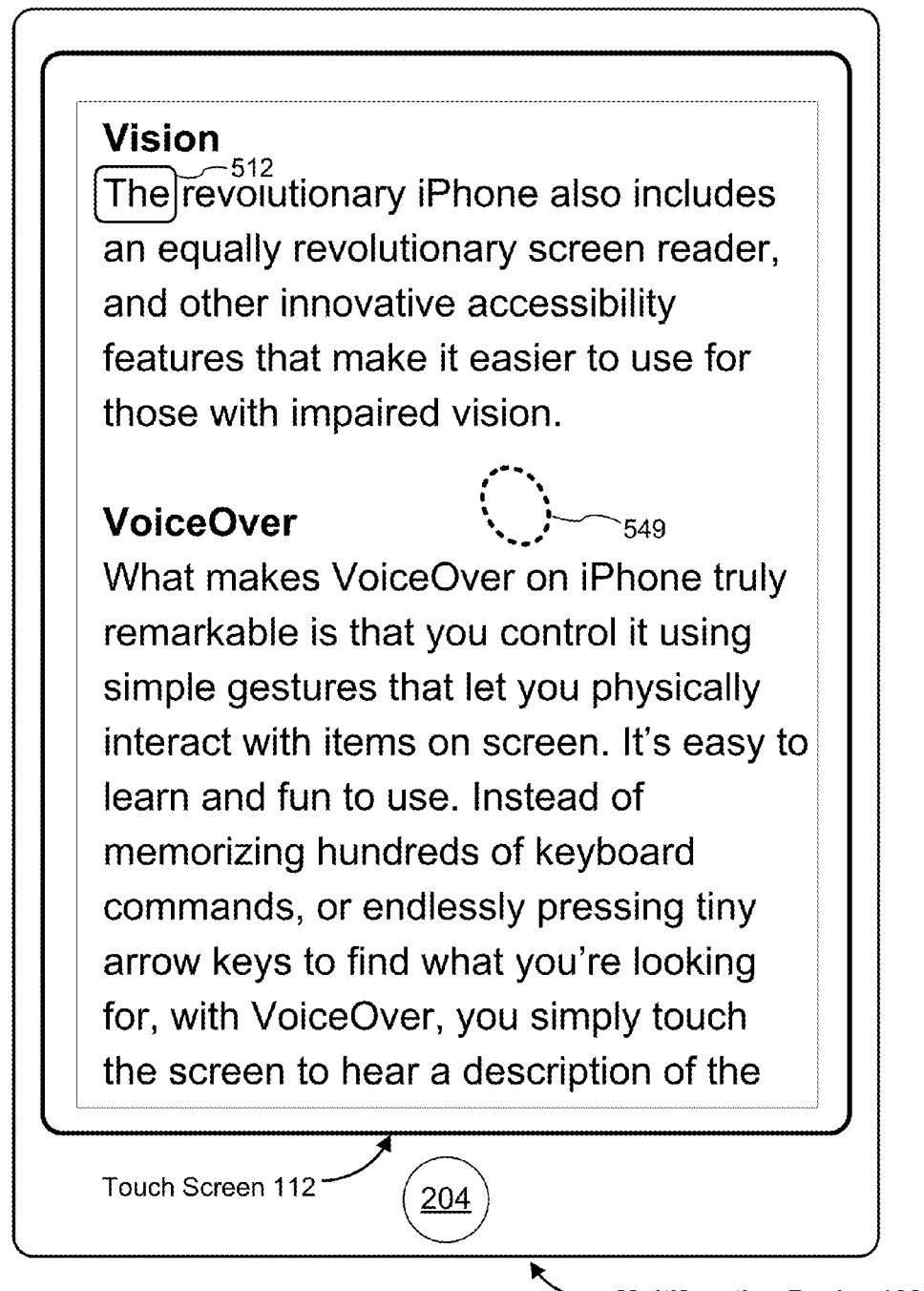
Figure 5A:
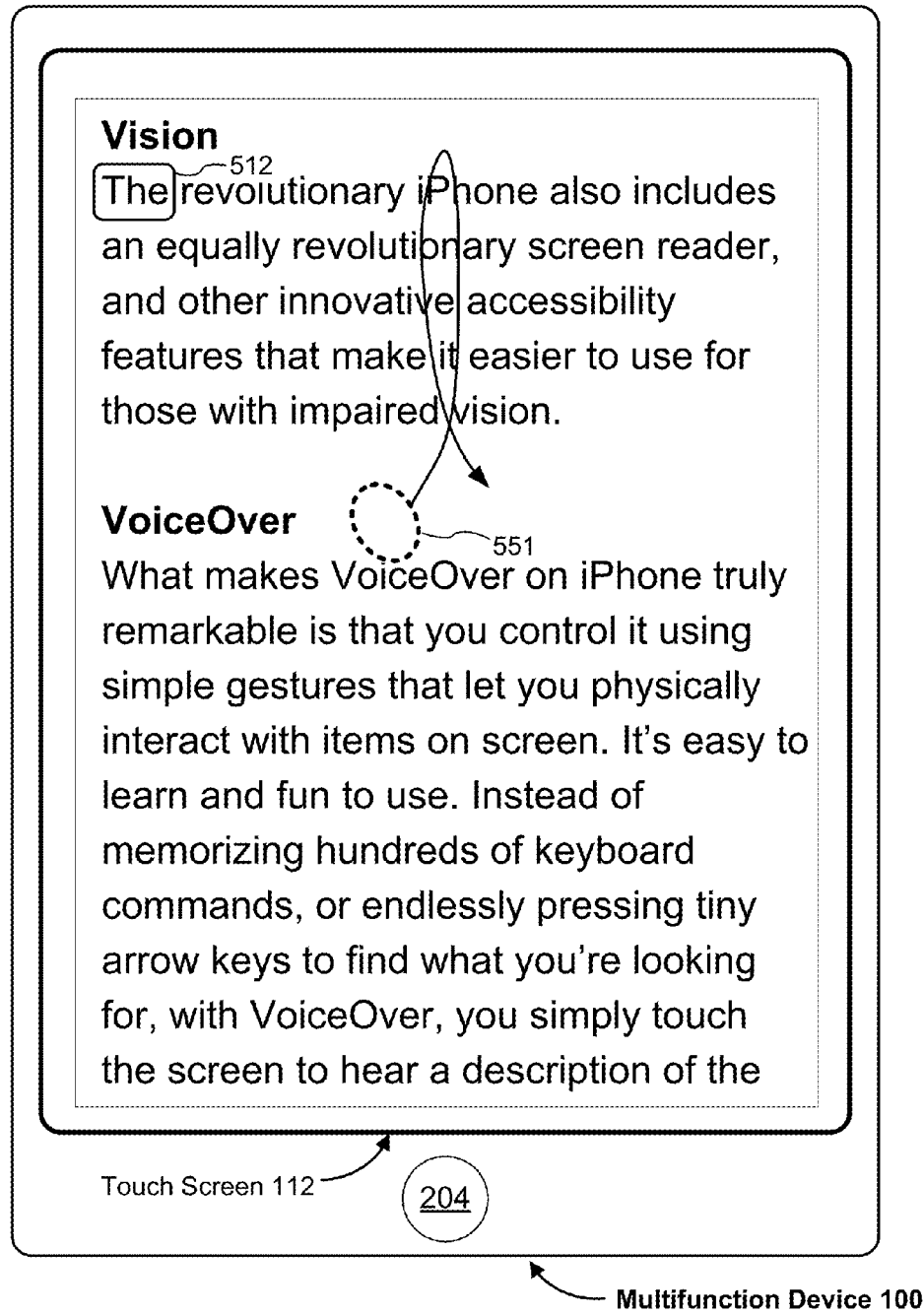
Figure 5A:
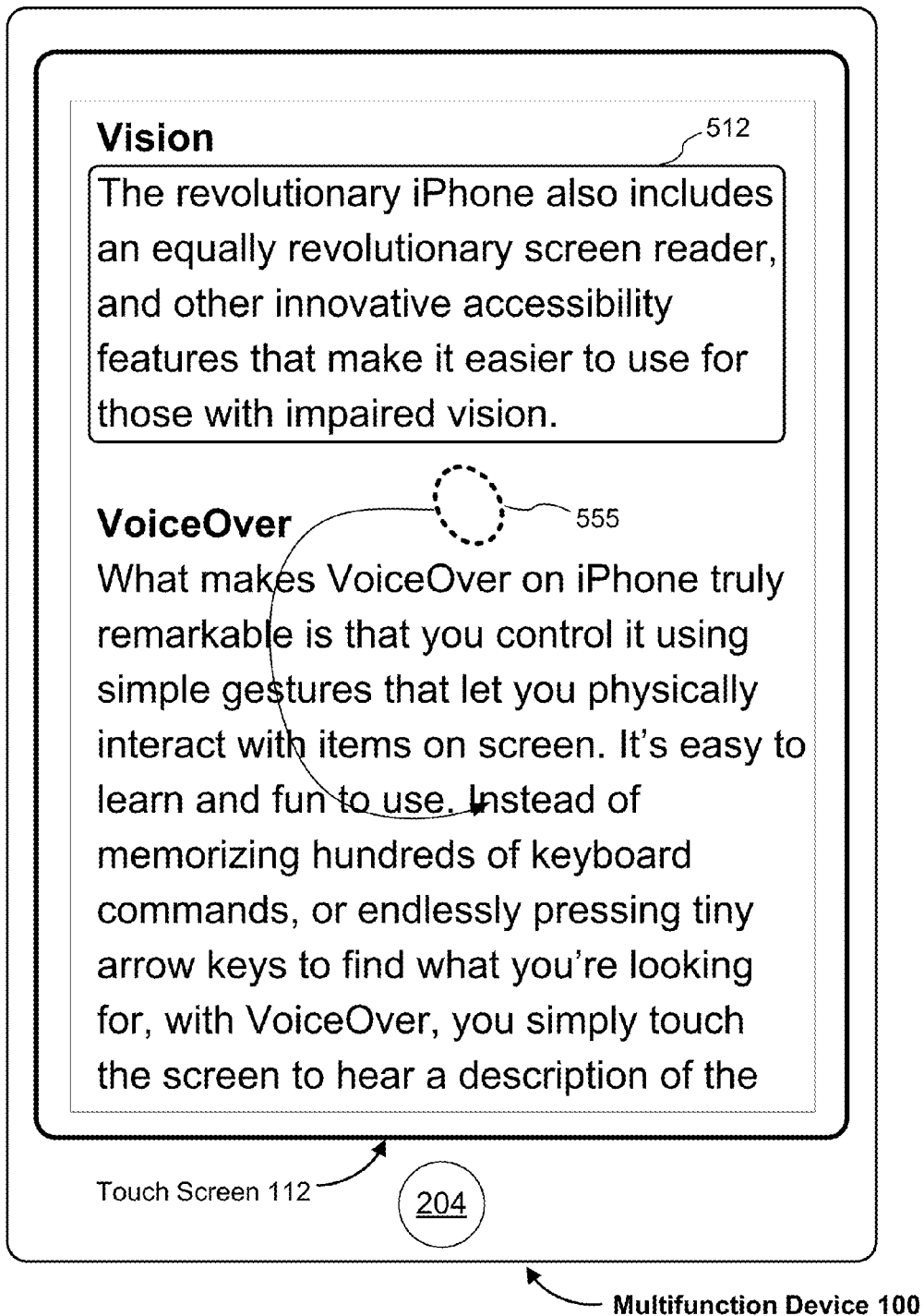
Figure 5A:
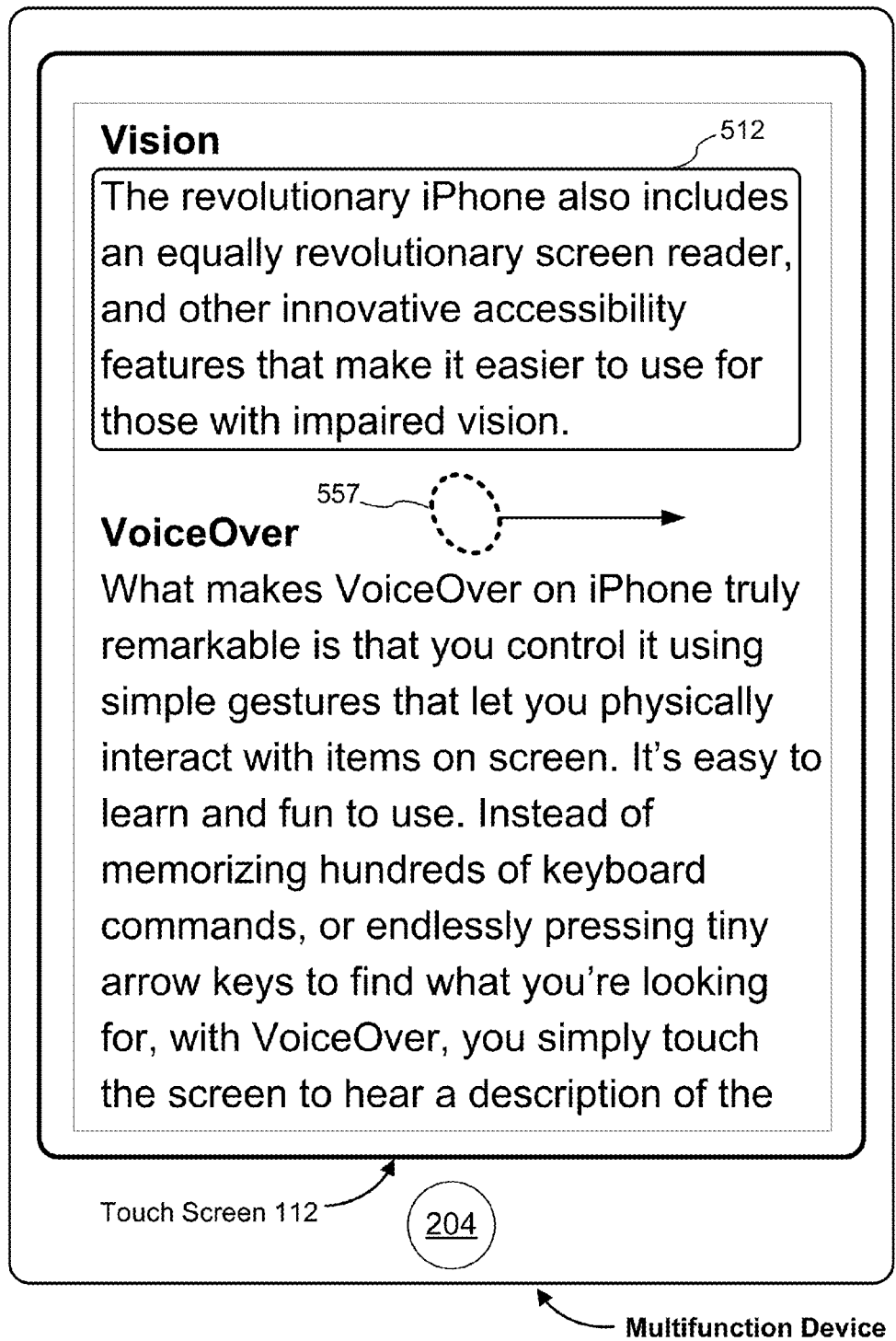
Figure 5A:
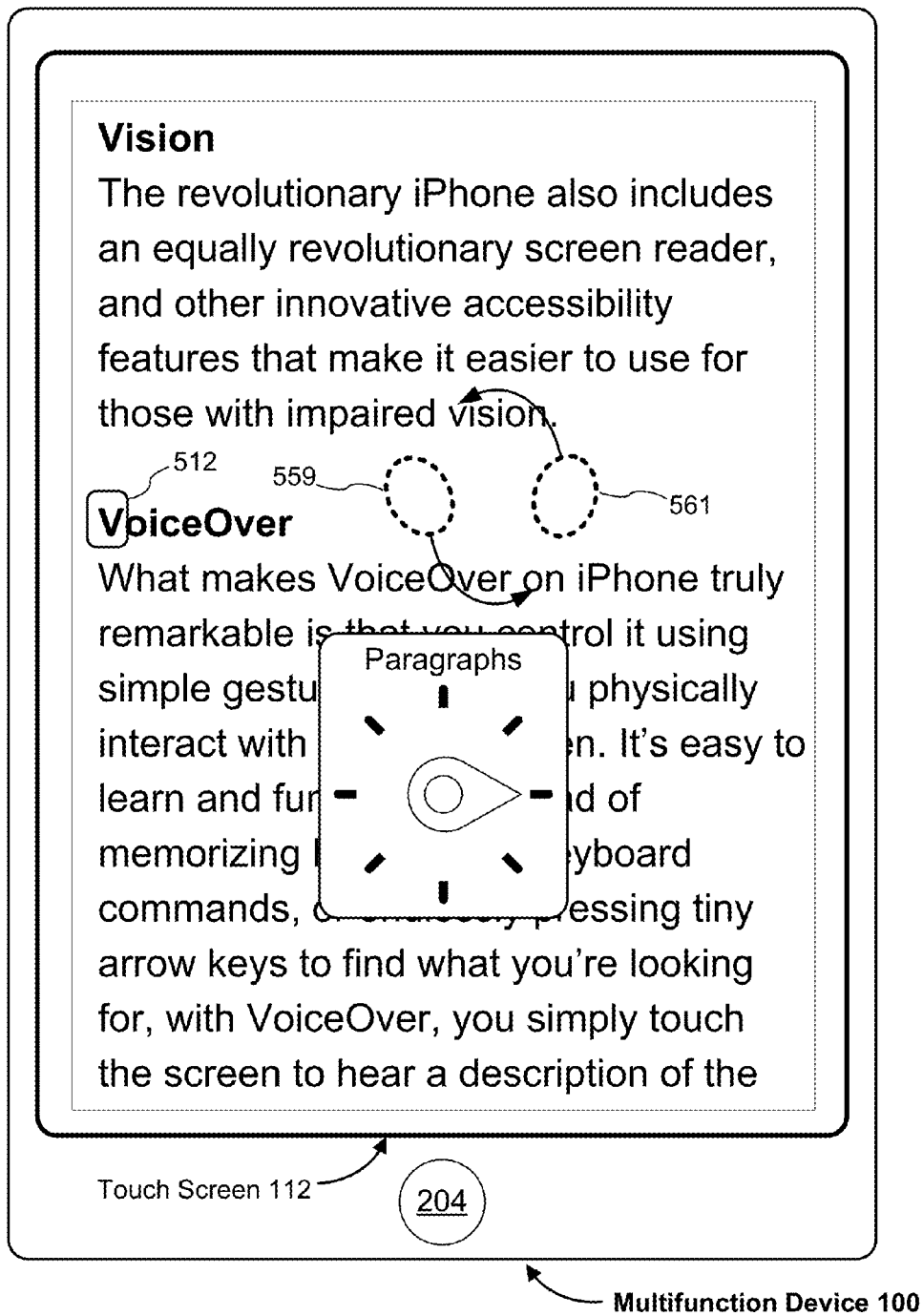
Figure 5A:
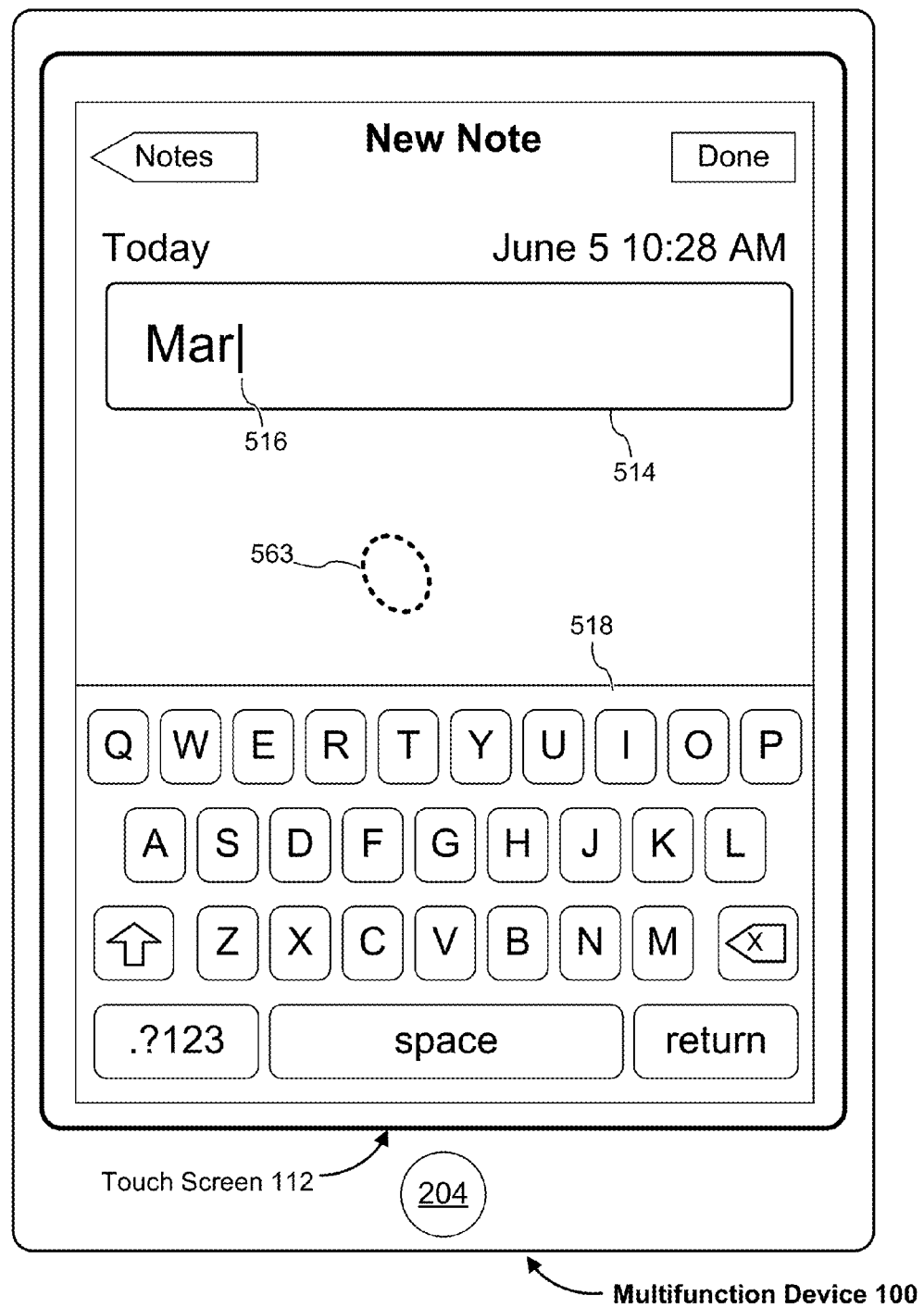
Figure 5A:
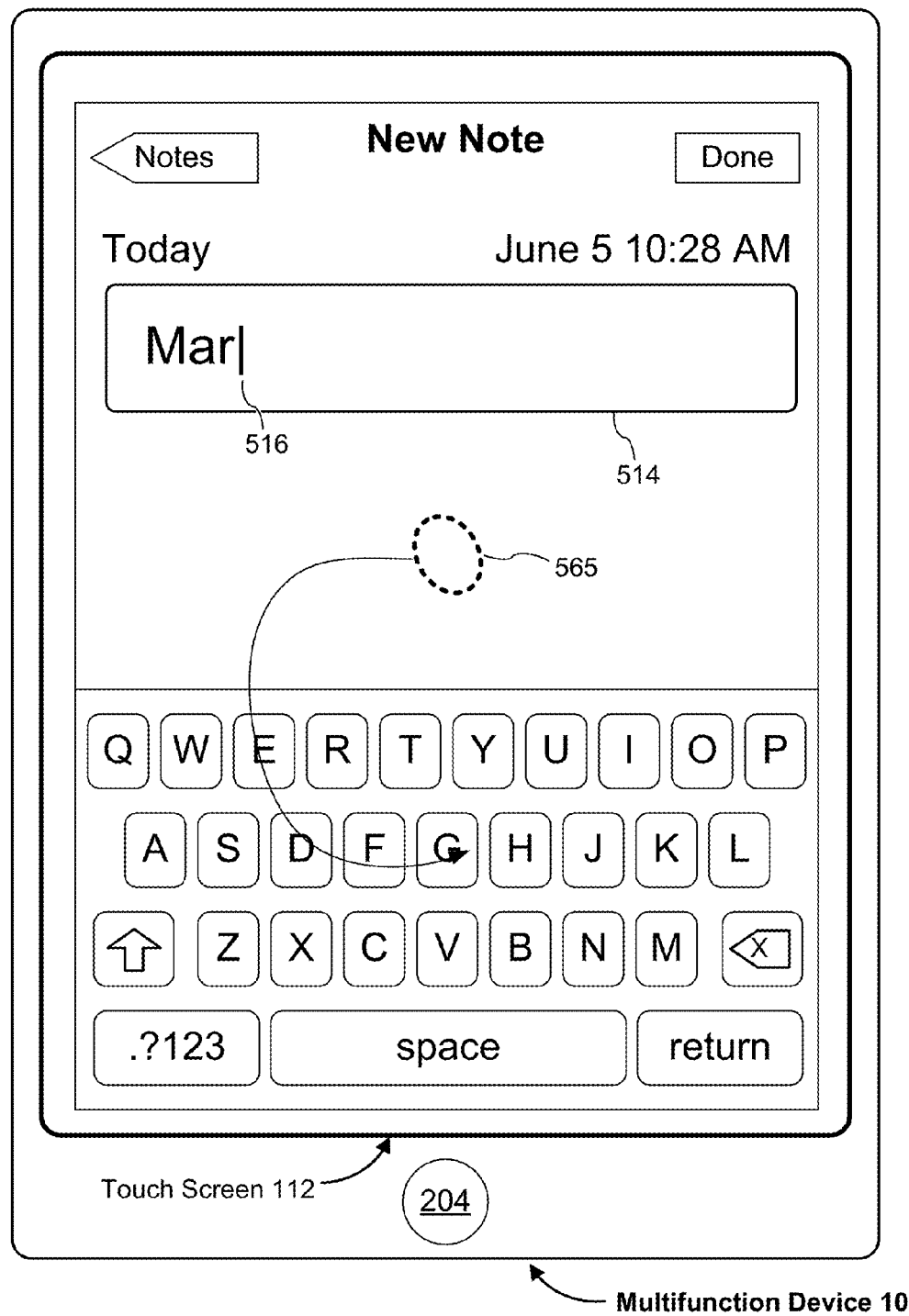
Figure 5A:
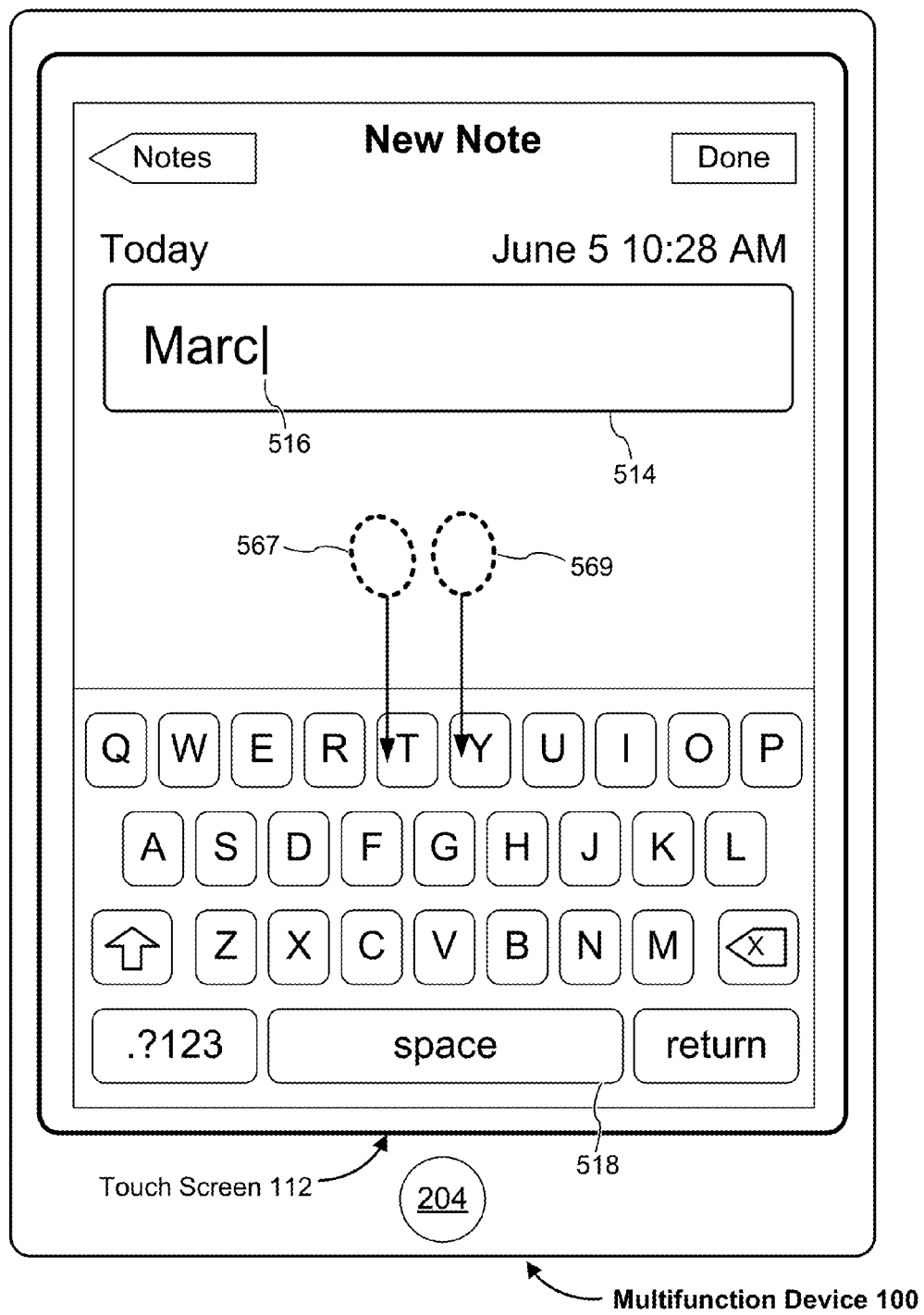
Figure 5A:
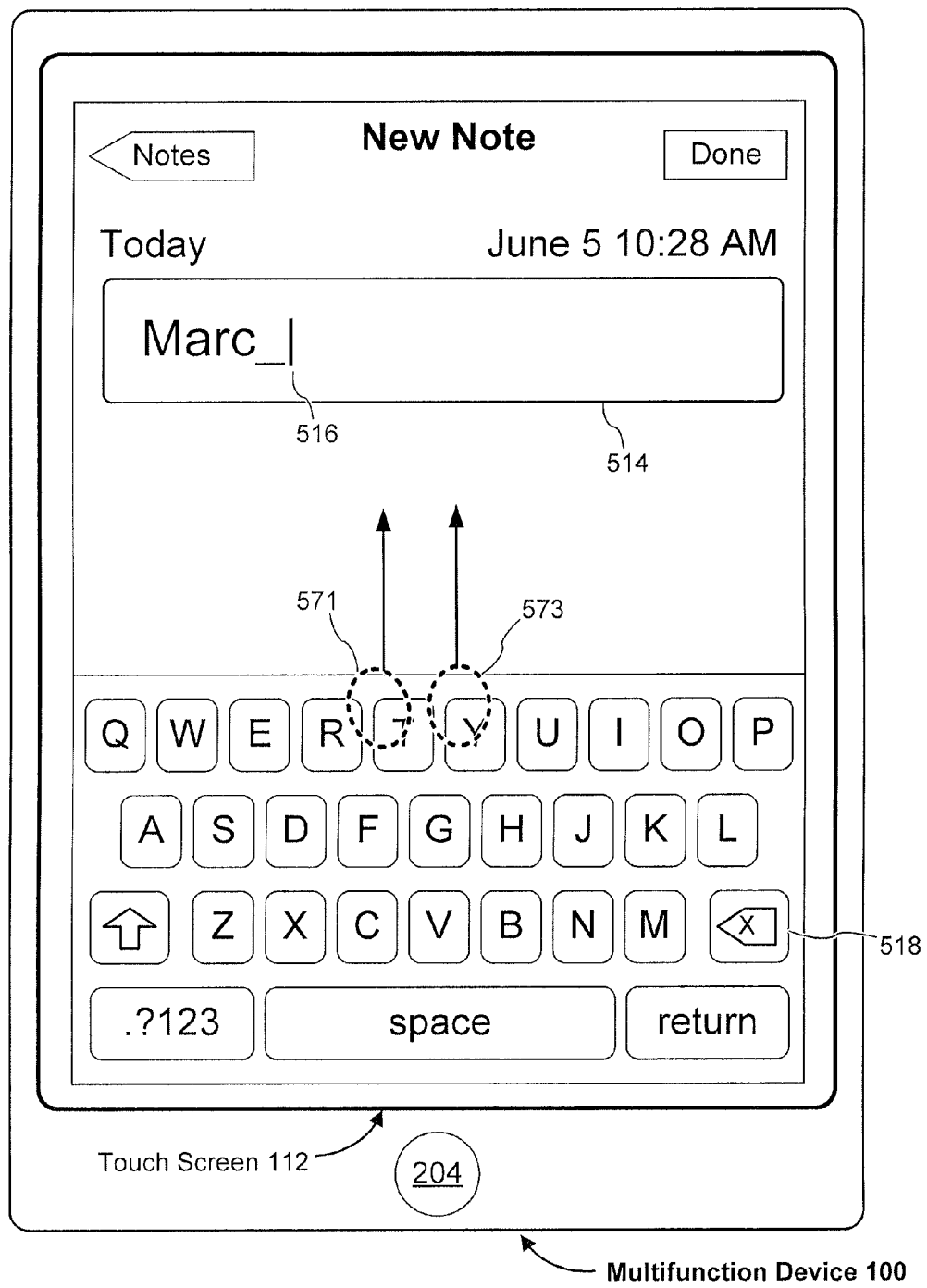
Figure 5A:
Figure 5A:
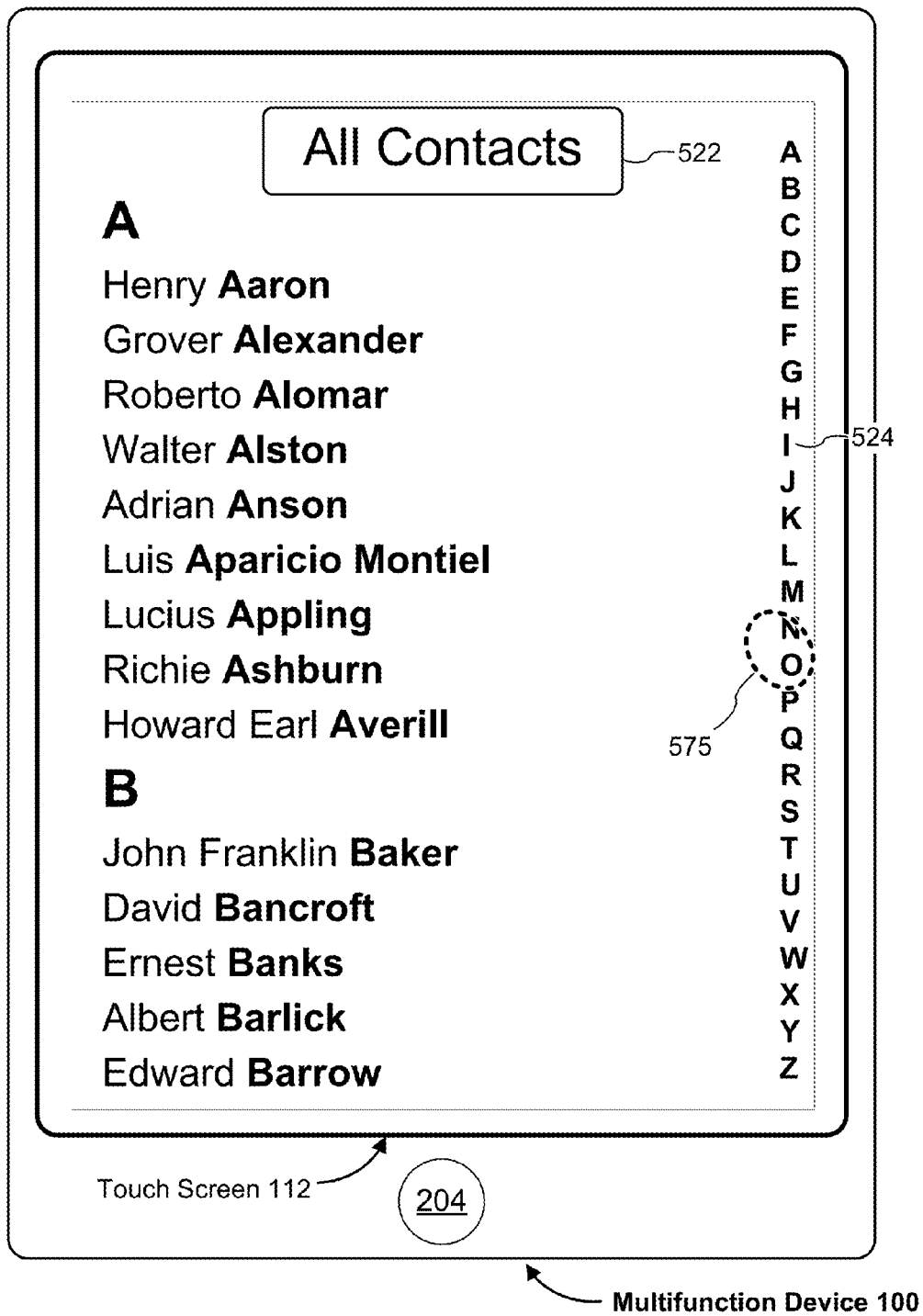
Figure 5A:
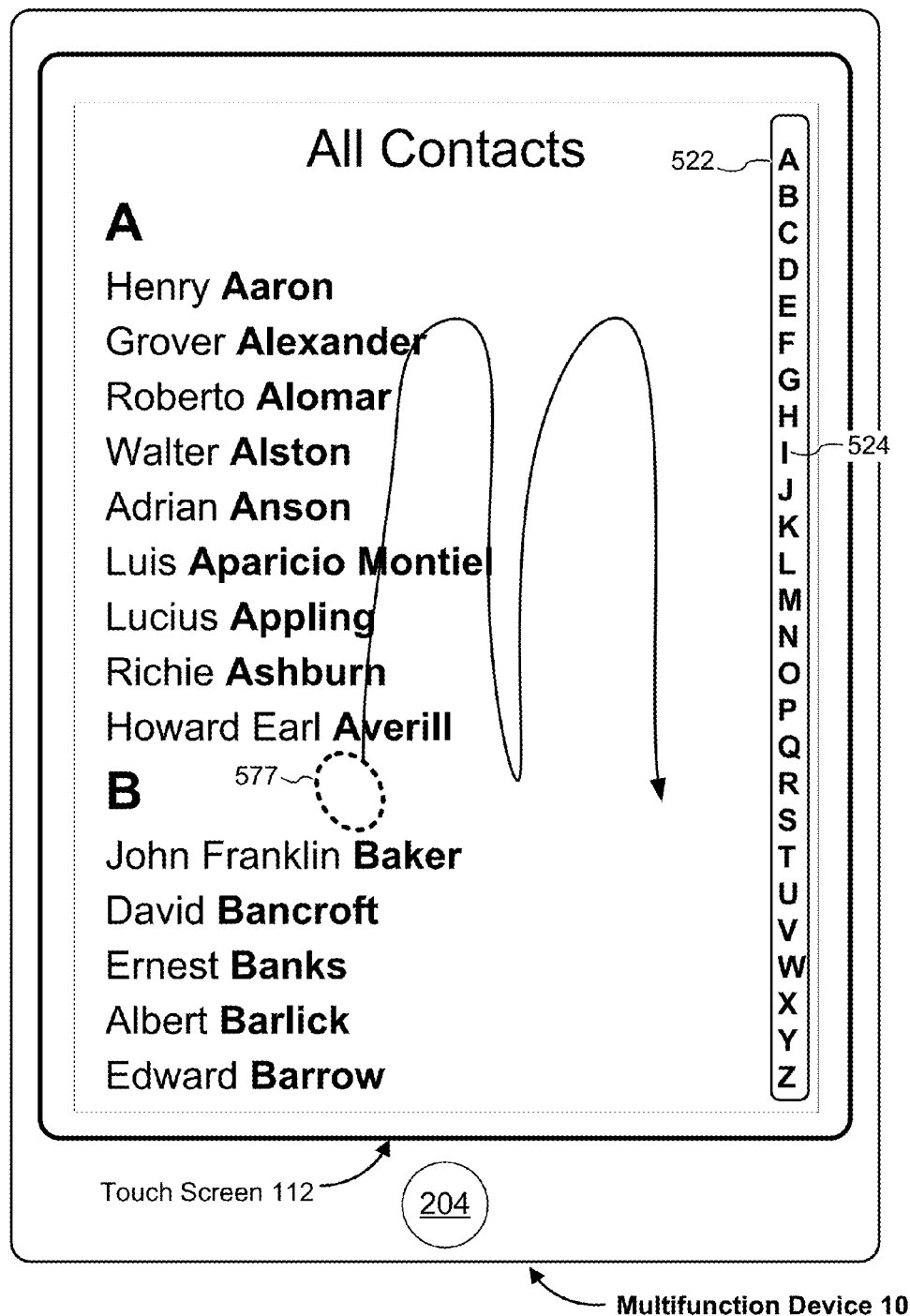
Figure 5A:
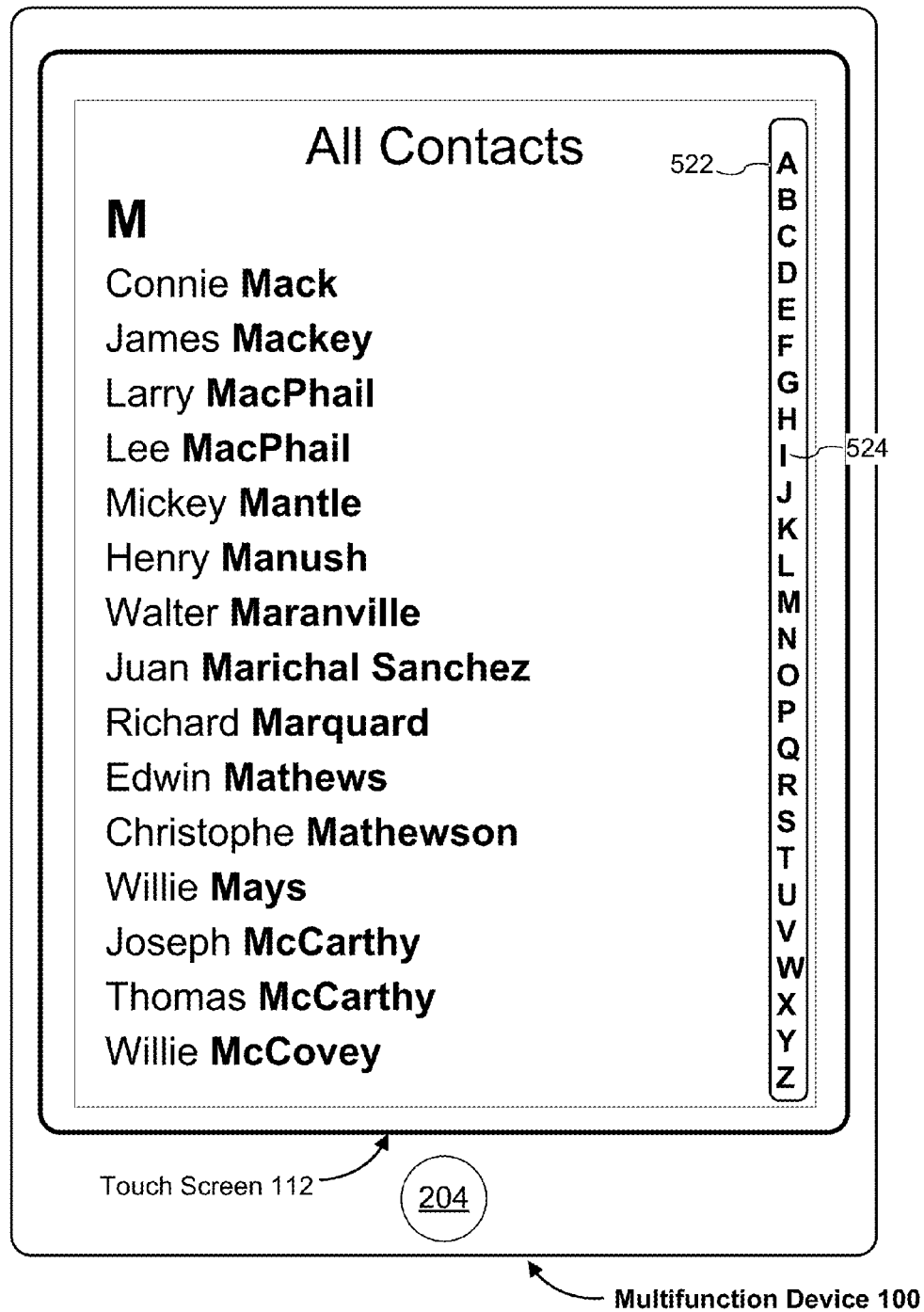

FIG. 5Z illustrates that, in response to detecting touch gesture 545 (FIG. 5Y), an item that corresponds to the received characters "cam" is displayed on touch screen 112 (e.g., "camera"). In some embodiments, device 100 outputs audible accessibility information indicating that there is one item that corresponds to the received characters. In some embodiments, device 100 outputs audible accessibility information indicating the item that corresponds to the received characters (e.g., audio output of "camera").

In some embodiments, in response to determining that a single item corresponds to the received characters, device 100 launches an application corresponding to the single item (e.g., FIG. 5N). In some embodiments, the application is launched in response to receiving a confirmation input (e.g., a double tap gesture after the device outputs "camera," "camera application," or "camera application, double tap to open the camera application.").

FIGS. 5AA-5AG illustrate exemplary user interfaces associated with navigating a structured electronic document in accordance with some embodiments.

FIG. 5AA illustrates an exemplary user interface including a portion of a document (e.g., a web page). The displayed portion of the document includes two headings (e.g., "Vision" and "VoiceOver") and two paragraphs. In FIG. 5AA, current focus 512 is displayed over the word "Vision." We assume that, in FIG. 5AA, a current navigable unit type is set to "words." In some embodiments, device 100 outputs audible accessibility information corresponding to the text in current focus 512 (e.g., audio output of the word "vision"). FIG. 5AA also illustrates touch gesture 547 (e.g., a right-swipe gesture) detected on touch screen 112.

FIG. 5AB illustrates that, in response to detecting touch gesture 547 (FIG. 5AA), current focus 512 moves to a next word "The." In some embodiments, device 100 outputs audible accessibility information corresponding to the text in current focus 512 (e.g., audio output of "the").

FIG. 5AB also illustrates touch gesture 549 (e.g., a double-tap gesture) detected on touch screen 112. In some embodiments, in response to detecting touch gesture 549, device 100 enters a handwriting gesture recognition mode. Alternatively, device 100 may already be in the handwriting gesture recognition mode regardless of touch gesture 549.

FIG. 5AC illustrates touch gesture 551 detected on touch screen 112. Touch gesture 551 includes a movement of a finger contact across touch screen 112 along a path that corresponds to the character "l." In FIG. 5AC, touch gesture 551 traverses locations on touch screen 112 that correspond to a plurality of displayed words without activating the plurality of displayed words. In some embodiments, in response to touch gesture 551, device 100 changes the current navigable unit type from "words" to "lines," which starts with the received character "l." In some embodiments, in response to touch gesture 551, device 100 outputs audible accessibility information indicating that the current navigable unit type has changed to "lines."

FIG. 5AD illustrates touch gesture 553 (e.g., a right-swipe gesture) detected on touch screen 112.

FIG. 5AE illustrates that, in response to detecting touch gesture 553 (FIG. 5AD), current focus 512 expands to include a line (or sentence) of text. In some embodiments, device 100 outputs audible accessibility information corresponding to the text in current focus 512 (e.g., audio output of the text in current focus 512).

FIG. 5AE also illustrates touch gesture 555 detected on touch screen 112. Touch gesture 555 includes a movement of a finger contact across touch screen 112 along a path that corresponds to the character "c." In FIG. 5AE, touch gesture 555 traverses locations on touch screen 112 that correspond to a plurality of displayed words and sentences without activating the plurality of displayed words and sentences. In some embodiments, in response to touch gesture 555, device 100 changes the current navigable unit type from "lines" to "characters," which starts with the received character "c" from touch gesture 555. In some embodiments, in response to touch gesture 555, device 100 outputs audible accessibility information indicating that the current navigable unit type has changed to "characters."

FIG. 5AF illustrates touch gesture 557 (e.g., a right-swipe gesture) detected on touch screen 112.

FIG. 5AG illustrates that, in response to detecting touch gesture 557 (FIG. 5AF), current focus 512 moves to a next character "v" in "VoiceOver," instead of the next line, because the current navigable unit type has changed from "lines" to "characters." In some embodiments, device 100 outputs audible accessibility information corresponding to the character "v" in current focus 512 (e.g., audio output of the character "v").

FIG. 5AG also illustrates that a touch gesture including finger contacts 559 and 561 are detected on touch screen 112. In some embodiments, the touch gesture includes a rotor gesture, where finger contacts 559 and 561 rotate around a point on touch screen 112. FIG. 5AG illustrates that, in response to the touch gesture including finger contacts 559 and 561, device 100 changes the current navigable unit type to "paragraphs."

FIGS. 5AH-5AL illustrate exemplary user interfaces associated with receiving handwritten character inputs in accordance with some embodiments.

FIG. 5AH illustrates an exemplary user interface of a notes application. The user interface includes character input area 514 and a keyboard 518 with a plurality of key icons (e.g., alphabet key icons, a space key icon, a backspace key icon, etc.). In FIG. 5AH, character input area 514 includes characters "Mar" and cursor 516 indicating a location where a next text entry/deletion operation is to be performed.

FIG. 5AH also illustrates touch gesture 563 (e.g., a double-tap gesture) detected on touch screen 112. In some embodiments, device 100 enters a handwriting gesture recognition mode in response to detecting touch gesture 563. Alternatively, device 100 may already be in the handwriting gesture recognition mode regardless of touch gesture 563.

FIG. 5AI illustrates touch gesture 565 detected on touch screen 112. Touch gesture 565 includes a movement of a finger contact across touch screen 112 along a path that corresponds to the character "c." In FIG. 5AI, touch gesture 565 traverses locations on touch screen 112 that correspond to a plurality of key icons (e.g., "E," "D," "F," and "G") without activating any of the plurality of key icons.

FIG. 5AJ illustrates that, in response to detecting touch gesture 565 (FIG. 5AI), the character "c" is entered into character input area 514 at the location of cursor 516.

FIG. 5AJ also illustrates that a touch gesture (e.g., two-finger swipe-down gesture) that includes concurrent downward movements of finger contacts 567 and 569 is detected on touch screen 112.

FIG. 5AK illustrates that, in response to the two-finger swipe-down gesture (FIG. 5AJ), a space character is entered into character input area 514 at a previous location of cursor 516 (shown in FIG. 5AJ). Although the space character is illustrated as an underline in FIG. 5AK, a true space character (" ") may be used instead.

FIG. 5AK also illustrates that a touch gesture (e.g., two-finger swipe-up gesture) including concurrent upward movements of finger contacts 571 and 573 is detected on touch screen 112.

FIG. 5AL illustrates that, in response to the two-finger swipe-up gesture, the character preceding the location of cursor 516 in character input area 514 (e.g., the space character) has been deleted.

In some embodiments, additional characters are entered into character input area 514 in response to detecting additional touch gestures that correspond to the additional characters (not shown). In some embodiments, additional characters in character input area 514 are deleted in response to detecting additional occurrences of the two-finger swipe-up gesture.

FIGS. 6A-6B are flow diagrams illustrating method 600 of unlocking an electronic device in a locked, passcode-protected state in accordance with some embodiments. Method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 enables users with limited vision to provide passcodes via handwriting gestures on a touch-sensitive surface, without needing to find or use the correct keys on a virtual keyboard or keypad on a passcode screen. The method reduces the cognitive burden on a user with limited vision when providing a passcode on a touch-sensitive surface, thereby creating a more efficient human-machine interface. For battery-operated electronic devices, enabling a user with limited vision to provide a passcode on a touch-sensitive surface faster and more efficiently conserves power and increases the time between battery charges.

While the electronic device is in a locked, passcode-protected state with a screen reader accessibility mode turned on, the electronic device displays (602) a passcode screen for receiving a passcode on the display (e.g., FIG. 5A). The passcode includes a predefined sequence of characters, and the passcode screen includes a plurality of character icons (e.g., icons 504-1 through 504-10, FIG. 5A).

In some embodiments, while the electronic device is in the locked, passcode-protected state with the screen reader accessibility mode turned on, prior to detecting a sequence of gestures on the touch-sensitive surface that correspond to characters in the passcode, the electronic device detects (604) a predefined input (e.g., selection of an icon, a rotor gesture, double tap, such as touch gesture 505, FIG. 5A, etc.), and, in response to detecting the predefined input, enters a handwriting gesture recognition mode within the screen reader accessibility mode. In some embodiments, the electronic device is in the handwriting gesture recognition mode in accordance with a predetermined setting (e.g., a user setting value) regardless of the predefined input.

The electronic device detects (606) a sequence of gestures on the touch-sensitive surface that correspond to characters (e.g., touch gestures 507, 509, 511, and 515, FIGS. 5B-5E). A respective gesture of the sequence of gestures that corresponds to a respective character is a single finger gesture that moves across the touch-sensitive surface along a respective path that corresponds to the respective character. For example, in FIG. 5B, touch gesture 507 moves across touch-sensitive surface 112 along a path that corresponds to the character "1." In another example illustrated in FIG. 5D, the respective path includes a plurality of sub-paths (e.g., sub-paths 511-A and 511-B correspond to the character "4").

In some embodiments, the respective path traverses (608) one or more locations on the touch-sensitive surface that correspond to one or more character icons of the plurality of character icons without activating the one or more character icons. For example, in FIG. 5B, touch gesture 507 traverses icons 504-3, 504-6, and 504-9 without entering characters corresponding to icons 504-3, 504-6, and 504-9.

In some embodiments, the respective path is (610) in the shape of the respective character (e.g., the path of touch gesture 507, FIG. 5B, is in the shape of the character "1").

In some embodiments, the respective gesture is (612) independent of contacting a location on the touch-sensitive surface that corresponds to a character icon of the plurality of character icons associated with the respective character. For example, in FIG. 5B, regardless of whether touch gesture 507 traverses (e.g., contacts) icon 504-1, touch gesture 507 is deemed to correspond to the character "1." In other words, touch gesture 507 is deemed to correspond to the character "1" even though touch gesture 507 does not contact icon 504-1.

In some embodiments, the respective gesture is (614) independent of contacting a location on the touch-sensitive surface that corresponds to any of the plurality of character icons. For example, for a finger drawing a character on a touch sensitive display, the device determines the character based on the path drawn by the finger, independent of whether the path happens to contact any of the character icons. The locations of the character icons are ignored (not considered) when a handwritten character is being input.

In some embodiments, while detecting the sequence of gestures on the touch-sensitive surface that correspond to characters, the electronic device foregoes (616) outputting audible accessibility information that corresponds to the characters. This prevents other people around the user from finding out the passcode based on the audible accessibility information.

In some embodiments, while the electronic device is in the locked, passcode-protected state with the screen reader accessibility mode turned on, the electronic device detects (618) a single finger gesture on the touch-sensitive surface at a location that corresponds to a character icon of the plurality of character icons; and, in response to detecting the single finger gesture on the touch-sensitive surface at the location that corresponds to the character icon, enters a respective character that corresponds to the character icon in a received passcode and foregoes outputting audible accessibility information associated with the respective character. For example, in FIG. 5E, device 100 detects touch gesture 517 at a location that corresponds to icon 504-10, and in response, enters the corresponding character "0" in the received passcode. Thus, while a user may input the entire passcode using handwriting gestures alone, the user may also enter characters in the passcode using the character icons on the passcode screen if the user chooses to do so.

The electronic device determines (620) whether the detected sequence of gestures corresponds to (i.e., matches) the predefined sequence of characters in the passcode.

In response to determining that the detected sequence of gestures does not correspond to the predefined sequence of characters in the passcode, the electronic device maintains (622) the electronic device in the locked, passcode-protected state with the screen reader accessibility mode turned on (e.g., FIG. 5I).

In response to determining that the detected sequence of gestures corresponds to the predefined sequence of characters in the passcode, the electronic device unlocks (624) and maintains the screen reader accessibility mode. For example, in FIG. 5G, in response to determining that the detected sequence of handwritten characters corresponds to the predefined sequence of characters in the passcode, device 100 displays an application launcher screen (e.g., a home screen) in the screen reader accessibility mode.

In some embodiments, in response to determining that the detected sequence of gestures corresponds to the predefined sequence of characters in the passcode, the electronic device ceases (626) to display the passcode screen. For example, in FIG. 5G, in response to determining that the detected sequence of gestures corresponds to the predefined sequence of characters in the passcode, the passcode screen is no longer displayed on touch screen 112.

In some embodiments, in response to determining that the detected sequence of gestures corresponds to the predefined sequence of characters in the passcode, the electronic device ceases (628) to display the passcode screen, and displays an application launcher screen that includes a plurality of application icons (e.g., the home screen with application icons 416 through 446, FIG. 5G).

In some embodiments, while displaying the passcode screen, the electronic device foregoes (630) outputting audible accessibility information associated with a respective character when the respective character is entered. On the other hand, while the electronic device is unlocked and in the screen reader accessibility mode, the electronic device detects a single finger gesture on the touch-sensitive surface at a location that corresponds to a respective application icon of the application launcher screen, and, in response to detecting the single finger gesture, outputs audible accessibility information associated with the respective application icon. For example, in FIGS. 5G-5H, in response to detecting touch gesture 519, current focus 506 moves to a location corresponding to application icon 444, and device 100 outputs audible accessibility information indicating that current focus has moved to the location corresponding to application icon 444 (e.g., audio output "notes").

It should be understood that the particular order in which the operations in FIGS. 6A-6B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 700, 800, 900, and 1000 (e.g., FIGS. 7A-7C, 8A-8B, 9A-9C, and 10A-10B respectively) are also applicable in an analogous manner to method 600 described above with respect to FIGS. 6A-6B. For example, the application launcher screen described above with reference to method 600 may have one or more of the characteristics of the application launcher screen described herein with reference to method 700. For brevity, these details are not repeated here.

FIGS. 7A-7C are flow diagrams illustrating method 700 of selecting an application icon in accordance with some embodiments. Method 700 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, method 700 enables users with limited vision to control an application launcher via handwriting gestures on a touch-sensitive surface that are integrated with other gestures in a screen reader accessibility mode. The method reduces the cognitive burden on a user with limited vision when controlling an application launcher with touch inputs on a touch-sensitive surface, thereby creating a more efficient human-machine interface. For battery-operated electronic devices, enabling a user with limited vision to control an application launcher faster and more efficiently with touch inputs on a touch-sensitive surface conserves power and increases the time between battery charges.

While an electronic device with a display and a touch-sensitive surface is in a screen reader accessibility mode, the electronic device displays (702) an application launcher screen on the display (e.g., FIG. 5J). The application launcher screen includes a plurality of application icons (e.g., icons 416 through 446, FIG. 5J). A respective application icon corresponds to a respective application stored in the electronic device. For example, icon 424 (FIG. 5J) corresponds to instant messaging module 141 (FIG. 1A).

In some embodiments, while the electronic device is in the screen reader accessibility mode, prior to detecting a sequence of one or more gestures on the touch-sensitive surface that correspond to one or more characters, the electronic device detects (704) a predefined input (e.g., selection of an icon, rotor gesture, double tap, such as touch gesture 521, FIG. 5J, etc.), and, in response to detecting the predefined input, enters a handwriting gesture recognition mode within the screen reader accessibility mode. In some embodiments, the electronic device is in the handwriting gesture recognition mode in accordance with a predetermined setting (e.g., a user setting value) regardless of the predefined input.

The electronic device detects (706) a sequence of one or more gestures on the touch-sensitive surface that correspond to one or more characters (e.g., touch gestures 523, 527, and 529, FIGS. 5K-5M). A respective gesture of the one or more gestures that corresponds to a respective character of the one or more characters is a single finger gesture that moves across the touch-sensitive surface along a respective path that corresponds to the respective character. For example, in FIG. 5K, touch gesture 523 moves across touch-sensitive surface 112 along a path that corresponds to the character "c."

In some embodiments, the respective path traverses (708) one or more locations on the touch-sensitive surface that correspond to one or more application icons of the plurality of application icons without activating the one or more application icons. For example, in FIG. 5K, touch gesture 523 traverses application icons 434 and 440 without moving current focus 506 to a location corresponding to any of application icons 434 and 440 or initiating any operation associated with any of application icons 434 and 440.

In some embodiments, the respective path is (710) in the shape of the respective character. For example, the path of touch gesture 523, FIG. 5K, is in the shape of the character "c."

In some embodiments, the respective gesture is (712) independent of contacting a location on the touch-sensitive surface that corresponds to any of the plurality of application icons. The locations of the application icons are ignored when a handwritten character is being input.

In some embodiments, the electronic device concurrently detects (714) a second predefined input (e.g., touch-modifier, such as pressing on a predefined key or placing a finger on the touch-sensitive surface) while detecting at least a portion of the sequence of one or more gestures. For example, FIG. 5K illustrates that, in some embodiments, device 100 concurrently detects finger contact 525 while detecting at least a portion of touch gesture 523. In some embodiments, the second predefined input indicates that a concurrent touch gesture (e.g., touch gesture 523) is a handwriting gesture.

In some embodiments, while the electronic device is in the screen reader accessibility mode and the application launcher screen is displayed, the electronic device, prior to determining that the detected sequence of one or more gestures corresponds to the respective application icon, outputs (716) audible accessibility information indicating the number of applications consistent with characters that correspond to respective gestures detected thus far. For example, the device audibly outputs "5 applications" in response to detecting a gesture that corresponds to a first letter, then audibly outputs "3 applications" in response to detecting a gesture that corresponds to a second letter, and then outputs the respective application name in response to detecting a gesture that corresponds to a third letter, when the three letters uniquely identify the respective application on the device.

The electronic device determines (718) whether the detected sequence of one or more gestures corresponds to a respective application icon of the plurality of application icons. In some embodiments, a respective application icon is deemed to correspond to the detected sequence of one or more gestures when a label for the respective application icon starts with one or more respective characters corresponding to the detected sequence of one or more gestures. In some embodiments, a respective application icon is deemed to correspond to the detected sequence of one or more gestures when a label for the respective application icon includes a word starting with one or more respective characters corresponding to the detected sequence of one or more gestures. In some embodiments, when the detected sequence of one or more gestures corresponds to multiple application icons, a first application icon of the multiple application icons is selected (e.g., based on an alphabetical order, reverse-alphabetical order, most recently used, most frequently used, etc.). In some embodiments, when the detected sequence of one or more gestures corresponds to multiple application icons, the first application icon of the multiple application icons is selected after a predefined time period has lapsed since a last gesture of the one or more gesture has been received. For example, when the electronic device detects a single gesture corresponding to the character "c" as illustrated in FIG. 5K and no other gesture for the predefined time period, a first application icon that corresponds to the gesture corresponding to the character "c" (e.g., of the three applications illustrated in FIG. 5K starting with the character "c," calendar, camera, and clock, the calendar application is selected based on the alphabetical order).

In some embodiments, in some embodiments, when the detected sequence of one or more gestures does not exactly match any application icon of the plurality of application icons (e.g., a gesture corresponding to a character "Q" for applications illustrated in FIG. 5K), the electronic device identifies a closest matching application (e.g., a photo application, the name of which starts with a character "P" that is next to "Q" in an alphabetical order).

In some embodiments, the respective gesture is (720) independent of contacting a location on the touch-sensitive surface that corresponds to the respective application icon of the plurality of application icons. The location of the respective application icon is ignored when a handwritten character is being input.

The electronic device, in response to determining that the detected sequence of one or more gestures corresponds to the respective application icon of the plurality of application icons, performs (722) a predefined operation associated with the respective application icon (e.g., outputting audible accessibility information associated with the respective application icon, such as providing audio output of a label of the respective application icon).

In some embodiments, performing the predefined operation associated with the respective application icon includes (724) displaying a current focus on the respective application icon and outputting audible accessibility information associated with the respective application icon. For example, in FIG. 5O, in response to determining that the detected sequence of one or more gestures corresponds to camera application icon 430, current focus 506 is displayed at a location corresponding to camera application icon 430. In some cases, device 100 also outputs audible accessibility information about camera application icon 430 (e.g., a voice output stating "camera").

In some embodiments, performing the predefined operation associated with the respective application icon includes (726) displaying a user interface of a respective application corresponding to the respective application icon (e.g., launching the respective application). For example, in FIG. 5N, in response to determining that the detected sequence of one or more gestures corresponds to camera application icon 430, device 100 displays a user interface of a camera application. In some embodiments, displaying the user interface of the respective application corresponding to the respective application icon includes replacing the display of the plurality of application icons with the user interface of the respective application. In some embodiments, the user interface of the respective application occupies the entire display (e.g., FIG. 5N).

In some embodiments, in response to determining that the detected sequence of one or more gestures does not correspond to any of the plurality of application icons, the device outputs (728) audible accessibility information indicating that none of the plurality of application icons corresponds to the detected sequence of one or more gestures (e.g., a voice output stating "there is no application matching the input"). In some embodiments, in response to determining that the detected sequence of one or more gestures does not correspond to any of the plurality of application icons, the electronic device foregoes outputting audible accessibility information that correspond any of the plurality of application icons (e.g., the device remains silent).

In some embodiments, while the electronic device is in the screen reader accessibility mode and the application launcher screen is displayed, the electronic device displays (730) a first application icon of the plurality of application icons next to a second application icon of the plurality of application icons; displays a current focus on the first application icon of the plurality of application icons; and detects a finger gesture on the touch-sensitive surface. The finger gesture is independent of contacting a location on the touch-sensitive surface that corresponds to the second application icon of the plurality of application icons. The electronic device, in response to detecting the finger gesture, moves the current focus from the first application icon to the second application icon (e.g., current focus 506), and outputs audible accessibility information associated with the second application icon. For example, in FIG. 5O, icons 428 and 430 are displayed next to each other, and current focus 506 is displayed at a location corresponding to icon 430. In response to detecting swipe gesture 531 (FIG. 5O), current focus 506 is moved to a location corresponding to icon 428. In some embodiments, device 100 outputs audible accessibility information associated with icon 428 (e.g., a voice output stating "photos").

In some embodiments, while the electronic device is in the screen reader accessibility mode and the application launcher screen is displayed, the electronic device detects (732) a single finger gesture (e.g., touch gesture 533, FIG. 5P) on the touch-sensitive surface at a location that corresponds to a third application icon of the plurality of application icons; and, in response to detecting the single finger gesture on the touch-sensitive surface at the location that corresponds to the third application icon, performs a predefined operation associated with the third application icon (e.g., displaying a current focus on the third application icon and outputting audible accessibility information associated with the third application icon as illustrated in FIG. 5Q, or launching an application that corresponds to the third application icon).

Thus, handwriting gestures may be used to rapidly navigate to a desired application icon, and then other gestures in the screen reader navigation mode can be executed (e.g., swipe gesture 531 or tap gesture 533 to further move the focus and output audible accessibility information). Using handwriting gestures to navigate to a desired application icon may be particularly useful when the number of applications on the device is so large that the plurality of application icons needs to be displayed on multiple pages on the application launcher screen. (For ease of explanation, FIGS. 5J-5M and 5O-5Q show an application launcher screen with a single page of application icons.)

It should be understood that the particular order in which the operations in FIGS. 7A-7C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600, 800, 900, and 1000 (e.g., FIGS. 6A-6A, 8A-8B, 9A-9C, and 10A-10B respectively) are also applicable in an analogous manner to method 700 described above with respect to FIGS. 7A-7C. For example, the respective path corresponding to the respective character described above with reference to method 700 may have one or more of the characteristics of the respective path corresponding to the respective character described herein with reference to methods 600, 800, 900, and 1000. In another example, performing a predefined operation described above with reference to method 700 may have one or more of the characteristics of performing a predefined operation described herein with reference to method 800. For brevity, these details are not repeated here.

FIGS. 8A-8B are flow diagrams illustrating method 800 of selecting a list entry in accordance with some embodiments. Method 800 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, method 800 enables users with limited vision to select a list entry via handwriting gestures on a touch-sensitive surface that are integrated with other gestures in a screen reader accessibility mode. The method reduces the cognitive burden on a user with limited vision when selecting a list entry with touch inputs on a touch-sensitive surface. For battery-operated electronic devices, enabling a user with limited vision to select a list entry faster and more efficiently with touch inputs on a touch-sensitive surface conserves power and increases the time between battery charges.

While the electronic device is in a screen reader accessibility mode, the electronic device displays (802) at least a first portion of a list of entries on the display (e.g., FIG. 5R or FIG. 5W). The list includes a plurality of entries.

In some embodiments, while the electronic device is in the screen reader accessibility mode, prior to detecting a sequence of one or more gestures on the touch-sensitive surface that correspond to one or more characters, the electronic device detects (804) a predefined input (e.g., selection of an icon, rotor gesture, double tap, such as touch gesture 535, FIG. 5R, etc.), and, in response to detecting the predefined input, enters a handwriting gesture recognition mode within the screen reader accessibility mode.

The electronic device detects (806) a sequence of one or more gestures on the touch-sensitive surface that correspond to one or more characters (e.g., touch gestures 537 and 539, FIGS. 5S-5T). A respective gesture of the one or more gestures that corresponds to a respective character of the one or more characters is a single finger gesture that moves across the touch-sensitive surface along a respective path that corresponds to the respective character. For example, in FIG. 5S, touch gesture 537 moves across touch-sensitive surface 112 along a path that corresponds to the character "m."

In some embodiments, the respective path traverses (808) one or more locations on the touch-sensitive surface that correspond to one or more entries of the list of entries without activating the one or more entries. For example, in FIG. 5S, touch gesture 537 traverses multiple entries from "Grover Alexander" to "Howard Earl Averill" without initiating any operation associated with such entries.

In some embodiments, the respective path is (810) in the shape of the respective character. For example, the path of touch gesture 537, FIG. 5S, is in the shape of the character "m."

In some embodiments, the respective gesture is (812) independent of contacting a location on the touch-sensitive surface that corresponds to any of the plurality of entries. The locations of the entries are ignored when a handwritten character is being input.

The electronic device determines (814) whether the detected sequence of one or more gestures corresponds to a respective entry of the list of entries. In some embodiments, the respective entry starts with one or more characters corresponding to the detected sequence of one or more gestures (e.g., "McDonald Restaurant" for "mc"). In some embodiments, the respective entry includes a word starting with one or more characters corresponding to the detected sequence of one or more gestures (e.g., the word that includes the one or more characters may be a second or subsequent word of the respective entry). In some embodiments, the respective entry includes one or more characters corresponding to the detected sequence of one or more gestures (e.g., "Chuck Morris" for "mc" because the entry includes both characters "m" and "c"). In some embodiments, when the respective entry is a name, the respective entry includes a last name starting with one or more characters corresponding to the detected sequence of one or more gestures. In some embodiments, when the respective entry is a name, the respective entry includes a first name starting with one or more characters corresponding to the detected sequence of one or more gestures.

In some embodiments, the respective gesture is (816) independent of contacting a location on the touch-sensitive surface that corresponds to the respective entry of the plurality of entries. The location of the respective entry is ignored when a handwritten character is being input.

In response to determining that the detected sequence of one or more gestures corresponds to the respective entry of the list of entries, the electronic device performs (818) a predefined operation associated with the respective entry (e.g., updating the user interface to display the respective entry or updating the user interface to display additional information concerning the respective entry).

In some embodiments, performing the predefined operation associated with the respective entry includes (820) outputting audible accessibility information associated with the respective entry. For example, in FIG. 5T, device 100 may output audible accessibility information associated with "Connie Mack" (e.g., audio output of "Connie Mack").

In some embodiments, performing the predefined operation associated with the respective entry includes (822) replacing the display of the first portion of the list with display of a second portion of the list. The second portion includes the respective entry, and the second portion of the list is distinct from the first portion of the list. For example, in some embodiments, in response to detecting touch gesture 539 (FIG. 5T), a second portion of the list is displayed (the portion of the list that corresponds to the characters "mc," FIG. 5U).

In some embodiments, performing the predefined operation associated with the respective entry includes (824) replacing the display of the first portion of the list with display of at least a portion of a second list. The second list includes one or more respective entries of the list of entries that correspond to the one or more characters, and the second list includes the respective entry. For example, in some embodiments, in response to detecting touch gesture 539 (FIG. 5T), a second list or a portion of a second list is displayed (FIG. 5V). As illustrated in FIG. 5V, in some embodiments, the second list does not include any entry that does not correspond to the one or more characters.

In some embodiments, performing the predefined operation associated with the respective entry includes (826) determining that the second list includes a plurality of entries; and, in accordance with a determination that the second list includes a plurality of entries, outputting audible accessibility information indicating a number of entries in the second list. For example, in response to detecting touch gesture 541 (FIG. 5W), audible accessibility information indicating a number of entries that correspond to the received touch gestures may be output (e.g., audio output stating "three items"). In another example, in response to detecting touch gesture 543 (FIG. 5X), audible accessibility information indicating a number of entries that correspond to the received characters "ca" may be output (e.g., audio output stating "two items").

In some embodiments, the electronic device performs the predefined operation associated with the respective entry only when the sequence of one or more gestures corresponding to the respective entry of the list of entries is received while a current focus is on an index (e.g., an alphabetical index of entries in the list). For example, in some embodiments, as illustrated in FIGS. 5AN-5AO, the electronic device performs the predefined operation (e.g., updating the user interface to display the respective entry or updating the user interface to display additional information concerning the respective entry) in response to touch gesture 577 detected while current focus 522 is on index 524. In other words, in some embodiments, the electronic device disregards the sequence of one or more gestures corresponding to the respective entry of the list of entries while the current focus is away from the index.

In some embodiments, performing the predefined operation associated with the respective entry includes launching an application corresponding to the respective entry. For example, when the respective entry is "camera," in response to detecting touch gesture 545 (FIG. 5Y), device 100 may launch a camera application. In some embodiments, the application is launched in response to receiving a confirmation input (e.g., a double tap gesture after the device outputs "camera," "camera application," or "camera application, double tap to open the camera application.").

In some embodiments, the electronic device receives two or more gestures on the touch-sensitive screen. Prior to receiving the entire two or more gestures, for each gesture of the two or more gestures, the electronic device determines whether the gesture corresponds to a respective character, and performs a first predefined operation (e.g., updating the user interface to display one or more entries corresponding to a sequence of one or more characters that correspond to one or more received gestures). After receiving the entire two or more gestures, the electronic device determines whether the entire two or more gestures correspond to a respective entry, and performs a second predefined operation with respect to the respective entry (e.g., updating the user interface to display the respective entry, such as displaying a portion of the list including the respective entry, or updating the user interface to display additional information concerning the respective entry).

It should be understood that the particular order in which the operations in FIGS. 8A-8B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600, 700, 900, and 1000 (e.g., FIGS. 6A-6B, 7A-7C, 9A-9C, and 10A-10B respectively) are also applicable in an analogous manner to method 800 described above with respect to FIGS. 8A-8B. For example, the respective path corresponding to the respective character described above with reference to method 800 may have one or more of the characteristics of the respective path corresponding to the respective character described herein with reference to methods 600, 700, 900, and 1000. In another example, performing a predefined operation described above with reference to method 800 may have one or more of the characteristics of performing a predefined operation described herein with reference to method 700. For brevity, these details are not repeated here.

FIGS. 9A-9C are flow diagrams illustrating method 900 of navigating a web page in accordance with some embodiments. Method 900 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 900 may be combined and/or the order of some operations may be changed.

As described below, method 900 enables users with limited vision to navigate web pages via handwriting gestures on a touch-sensitive surface that are integrated with other gestures in a screen reader accessibility mode. The method reduces the cognitive burden on a user with limited vision when navigating web pages with touch inputs on a touch-sensitive surface, thereby creating a more efficient human-machine interface. For battery-operated electronic devices, enabling a user with limited vision to navigate web pages faster and more efficiently with touch inputs on a touch-sensitive surface conserves power and increases the time between battery charges.

While the electronic device is in a screen reader accessibility mode, the electronic device displays (902) at least a portion of a web page (or other structured electronic document) on the display (e.g., FIG. 5AA). The web page includes a plurality of user interface elements (e.g., headings, paragraphs, sentences, words, etc.).

The electronic device detects (904) a first navigation gesture (e.g., touch gesture 547, FIG. 5AA) on the touch-sensitive surface.

In response to detecting the first navigation gesture on the touch-sensitive surface, the electronic device navigates (906) to a first set of one or more user interface elements of the plurality of user interface elements that corresponds to a current navigable unit type. The current navigable unit type is set to a first navigable unit type selected from a plurality of predefined navigable unit types. For example, in FIGS. 5AA-5AB, the current navigable unit type is set to "words," and current focus 512 moves from the header "Vision" (FIG. 5AA) to the next word "The" (FIG. 5AB) in response to touch gesture 547.

In some embodiments, while the electronic device is in the screen reader accessibility mode, prior to detecting the navigation setting gesture on the touch-sensitive surface, the electronic device detects (908) a predefined input (e.g., selection of an icon, rotor gesture, double tap, such as touch gesture 549, FIG. 5AB, etc.), and, in response to detecting the predefined input, enters a handwriting gesture recognition mode within the screen reader accessibility mode. In some embodiments, the electronic device is in the handwriting gesture recognition mode regardless of detecting the predefined input.

The electronic device detects (910) a navigation setting gesture on the touch-sensitive surface that corresponds to a respective character (e.g., touch gesture 551, FIG. 5AC). The navigation setting gesture that corresponds to the respective character is a single finger gesture that moves across the touch-sensitive surface along a respective path that corresponds to the respective character. For example, in FIG. 5AC, touch gesture 551 moves across touch-sensitive surface 112 along a path that corresponds to the character "1."

In some embodiments, the respective path traverses (912) one or more locations on the touch-sensitive surface that correspond to one or more user interface elements of the plurality of user interface elements in the web page without activating the one or more user interface elements. For example, in FIG. 5AC, touch gesture 551 traverses multiple words without moving current focus 512 to a location corresponding to any of the traversed words.

In some embodiments, the respective path is (914) in the shape of the respective character. For example, in FIG. 5AC, the path of touch gesture 551 is in the shape of the character "1."

In some embodiments, the respective gesture is (916) independent of contacting a location on the touch-sensitive surface that corresponds to any of the plurality of user interface elements. The locations of the user interface elements are ignored when a handwritten character is being input.

The electronic device determines (918) whether the navigation setting gesture corresponds to a second navigable unit type of the plurality of predefined navigable unit types. For example, the "lines" navigable unit type corresponds to a touch gesture for the character "1." Alternatively, in some embodiments, the "lines" navigable unit type corresponds to a touch gesture for the character "i," and the "links" navigable unit type corresponds to a touch gesture for the character "1." In some embodiments, the electronic device determines whether the navigation setting gesture corresponds to the second navigable unit type of the plurality of predefined navigable unit types based on language settings of the electronic device. For example, when the electronic device is in a Spanish language mode, the "links" navigable unit type corresponds to a touch gesture for the character "e," because, for example, links are called enlaces in Spanish.

In some embodiments, the plurality of predefined navigable unit types includes (920) four or more navigable unit types in a circular sequence so that a navigable unit type that has a second position in the circular sequence is deemed to be adjacent to a navigable unit type that has a first position in the circular sequence, the navigable unit type that has a third position in the circular sequence is deemed to be adjacent to the navigable unit type that has the second position in the circular sequence, and a navigable unit type that has a last position in the circular sequence is deemed to be adjacent to the navigable unit type that has the first position in the circular sequence. The first navigable unit type is not adjacent to the second navigable unit type in the circular sequence. In other words, the navigation setting gesture enables changing to a navigable unit type that is not next to the current navigable unit type. In comparison, a second navigation setting gesture described below with respect to operation 930 allows changing to a navigable unit type that is next to the current navigable unit type. For example, assume that the device has five predefined navigable unit types: "characters," "words," "links," "lines," and "paragraphs." The "characters" navigable unit type is deemed to be adjacent to the "words" navigable unit type, the "words" navigable unit type is deemed to be adjacent to the "links" navigable unit type, the "links" navigable unit type is deemed to be adjacent to the "lines" navigable unit type, the "lines" navigable unit type is deemed to be adjacent to the "paragraphs" navigable unit type, and the "paragraphs" navigable unit type is deemed to be adjacent to the "characters" navigable unit type. The navigation setting gesture enables changing the current navigable unit type from one predefined navigable unit type to another predefined navigable unit type that is not adjacent to the one predefined navigable unit type (e.g., from "words" to "lines," which are not adjacent to each other; and from "lines" to "characters," which are not adjacent to each other).

In some embodiments, the navigation setting gesture also enables changing the current navigation unit type from one predefined navigable unit type to another predefined navigable unit type that is adjacent to the one predefined navigable unit type.

In some embodiments, a label for the second navigable unit type starts (922) with the respective character. For example, the label for the "lines" navigable unit type starts with the character "l." Therefore, in some embodiments, device 100 determines that a touch gesture for the character "l" corresponds to the "lines" navigable unit type. In some embodiments, a label for the second navigable unit type includes the respective character. For example, the character "k" may correspond to the "links" navigable unit type.

In response to determining that the navigation setting gesture corresponds to the second navigable unit type of the plurality of predefined navigable unit types, the electronic device changes (924) the current navigable unit type from the first navigable unit type to the second navigable unit type, and outputs audible accessibility information indicating that the second navigable unit type has been selected (e.g., audio output stating "lines" or "the current navigable unit type has changed to lines").

In some embodiments, the plurality of navigable unit types includes characters, words, sentences, lines, and/or paragraphs. In some embodiments, the accessibility information about the second navigable unit type is a spoken word selected from the group consisting of "characters," "words," "sentences," "lines," and "paragraphs." In some embodiments, the plurality of navigable unit types includes links, headings, sentences, lines, and/or paragraphs. In some embodiments, the accessibility information about the second navigable unit type is a spoken word selected from the group consisting of "links," "headings," "sentences," "lines," "paragraphs," and "tables."

After changing the current navigable unit type from the first navigable unit type to the second navigable unit type, the electronic device detects (926) a second navigation gesture (e.g., touch gesture 553, FIG. 5AD) on the touch-sensitive surface.

In response to detecting the second navigation gesture on the touch-sensitive surface, the electronic device navigates (928) to a second set of one or more user interface elements of the plurality of user interface elements that corresponds to the second navigable unit type. For example, in FIG. 5AE, current focus 512 is updated to include a portion of the web page distinct from the portion of the web page included in current focus 512 prior to detecting touch gesture 553 (FIG. 5AD).

In some embodiments, the electronic device detects (930) a second navigation setting gesture on the touch-sensitive surface. The second navigation setting gesture is a multi-finger gesture (e.g., a two-finger rotor gesture), and the second navigation setting gesture is independent of contacting a location on the touch-sensitive surface that corresponds to any of the plurality of user interface elements. In response to detecting the second navigation setting gesture on the touch-sensitive surface, the electronic device changes the current navigable unit type from the second navigable unit type to a third navigable unit type that is adjacent to the second navigable unit type in the sequence of the plurality of navigable unit types, and outputs accessibility information about the third navigable unit type. For example, in FIG. 5AG, the current navigable unit type changes from the "characters" navigable unit type to the "paragraphs" navigable unit type. It is noted that, in the above example with five predefined navigable unit types: "characters," "words," "links," "lines," and "paragraphs," the "characters" navigable unit type and the "paragraphs" navigable unit type are adjacent to each other. Thus, in some embodiments, the second navigation setting gesture enables changing the current focus to an adjacent navigable unit type (e.g., from "characters" to "paragraphs").

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600, 700, 800, and 1000 (e.g., FIGS. 6A-6B, 7A-7C, 8A-8B, and 10A-10B respectively) are also applicable in an analogous manner to method 900 described above with respect to FIGS. 9A-9C. For example, the respective path corresponding to the respective character described above with reference to method 900 may have one or more of the characteristics of the respective path corresponding to the respective character described herein with reference to methods 600, 700, 800, and 1000. For brevity, these details are not repeated here.

FIGS. 10A-10B are flow diagrams illustrating method 1000 of receiving handwriting gestures in accordance with some embodiments. Method 1000 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 100 may be combined and/or the order of some operations may be changed.

As described below, method 1000 enables users with limited vision to provide character inputs via handwriting gestures on a touch-sensitive surface that are integrated with other gestures in a screen reader accessibility mode. The method reduces the cognitive burden on a user with limited vision when providing character inputs, thereby creating a more efficient human-machine interface. For battery-operated electronic devices, enabling a user with limited vision to provide character inputs faster and more efficiently conserves power and increases the time between battery charges.

While the electronic device with a display and a touch-sensitive surface is in a screen reader accessibility mode, the electronic device displays (1002) a character input area and a keyboard on the display. The keyboard includes a plurality of key icons. For example, in FIG. 5AH, character input area 514 and a keyboard 518 with a plurality of key icons are displayed on touch screen 112.

In some embodiments, while the electronic device is in the screen reader accessibility mode, prior to detecting a sequence of one or more gestures on the touch-sensitive surface that correspond to one or more characters, the electronic device detects (1004) a predefined input (e.g., selection of an icon, rotor gesture, double tap, such as touch gesture 563, etc.), and, in response to detecting the predefined input, enters a handwriting gesture recognition mode within the screen reader accessibility mode. In some embodiments, the electronic device is in the handwriting gesture recognition mode regardless of the predefined input.

The electronic device detects (1006) a sequence of one or more gestures on the touch-sensitive surface that correspond to one or more characters (e.g., touch gesture 565, FIG. 5AI). A respective gesture of the one or more gestures that corresponds to a respective character is a single finger gesture that moves across the touch-sensitive surface along a respective path that corresponds to the respective character. The respective path traverses one or more locations on the touch-sensitive surface that correspond to one or more key icons of the plurality of key icons without activating the one or more key icons. For example, in FIG. 5AI, touch gesture traverses a plurality of key icons, such as "E," "D," "F," and "G" icons, without entering any character corresponding to such keys into character input area 514.

In some embodiments, the respective path is (1008) in the shape of the respective character. For example, in FIG. 5AI, the path of touch gesture 565 is in the shape of the character "c."

In some embodiments, the respective gesture is (1010) independent of contacting a location on the touch-sensitive surface that corresponds to a key icon of the plurality of key icons associated with the respective character. The location of the key icon associated with the respective character is ignored when a handwritten character is being input.

In some embodiments, the respective gesture is (1012) independent of contacting a location on the touch-sensitive surface that corresponds to any of the plurality of key icons. The locations of the key icons are ignored when a handwritten character is being input.

In some embodiments, in response to detecting the respective gesture, the electronic device enters (1014) the corresponding respective character in the character input area of the display (e.g., inserting and displaying the corresponding character at a current cursor position in the character input area). For example, in FIG. 5AJ, device 100 has entered the character "c" in response to detecting touch gesture 565 (FIG. 5AI). In some embodiments, the device enters a corresponding respective character in response to detecting each of the rest of the sequence of one or more gestures.

In some embodiments, in response to detecting the respective gesture, the electronic device outputs (1016) audible accessibility information about the corresponding respective character (e.g., a voice output "c"). In some embodiments, the electronic device enters the corresponding respective character in the character input area of the display after outputting the audible accessibility information about the corresponding respective character (e.g., a voice output "c") and receiving a confirmation input (e.g., a single tap or double tap gesture).

In some embodiments, the electronic device detects (1018) a first predefined finger gesture on the touch-sensitive surface (e.g., a two-finger swipe-down gesture). The first predefined finger gesture traverses one or more locations on the touch-sensitive surface that correspond to one or more key icons of the plurality of key icons without activating the one or more key icons. In response to detecting the first predefined finger gesture on the touch-sensitive surface, the electronic device enters a space in the character input area at a current location of a cursor, and outputs audible accessibility information indicating that a space has been entered. For example, in FIG. 5AK, the device has entered a space character in character input area 514 in response to the two-finger swipe-down gesture including finger contacts 567 and 569 (FIG. 5AJ).

In some embodiments, the first predefined finger gesture is (1020) independent of contacting a location on the touch-sensitive surface that corresponds to a space key icon in the plurality of key icons. The location of the space key icon is ignored when the first predefined finger gesture is being input.

In some embodiments, the electronic device detects (1022) a second predefined finger gesture on the touch-sensitive surface (e.g., a two-finger swipe-up gesture). The second predefined finger gesture traverses one or more locations on the touch-sensitive surface that correspond to one or more key icons of the plurality of key icons without activating the one or more key icons. In response to detecting the second predefined finger gesture on the touch-sensitive surface, the electronic device deletes a character in the character input area at a current location of a cursor, and outputs audible accessibility information indicating that a character has been deleted. For example, in FIG. 5AL, the device has deleted the space character previously located before cursor 516 (as shown in FIG. 5AK). Alternatively, a different predefined finger gesture may be used for deleting a character in the character input area. For example, in some embodiments, the electronic device detects a scrub gesture (e.g., in some embodiments, a scrub gesture corresponds scrubbing back and forth one or more fingers on the touch-sensitive surface), and deletes a character in the character input area at a current location of a cursor. In some embodiments, the two-finger swipe-up gesture may be used to initiate a different operation instead of deleting a character. For example, in some embodiments, the electronic device detects a two-finger swipe-up gesture on the touch-sensitive surface and inserts a visible or invisible new line character at the current location of the cursor. In some embodiments, the electronic device also moves the cursor to a new line in response to detecting the two-finger swipe-up gesture.

In some embodiments, the second predefined finger gesture is (1024) independent of contacting a location on the touch-sensitive surface that corresponds to a backspace key icon in the plurality of key icons. The location of the backspace key icon is ignored when the second predefined finger gesture is being input.

In some embodiments, the electronic device has a plurality of character input modes (e.g., two or more of: a lowercase input mode, an uppercase input mode, a numbers input mode, and a symbols input mode). In some embodiments, the electronic device detects a third predefined finger gesture on the touch-sensitive surface (e.g., a three-finger tap), and indicates a current character input mode. For example, the electronic device outputs an audible information indicating the current character input mode (e.g., a voice output "lowercase" when the electronic device is in a lowercase input mode). In some embodiments, the electronic device determines that a respective gesture on the touch-sensitive surface corresponds to a respective character in accordance with the current character input mode. For example, in some embodiments, when the electronic device is in a lowercase input mode, the electronic device attempts to match the respective gesture to a lowercase character. Alternatively, in some embodiments, the electronic device determines that a respective gesture on the touch-sensitive surface corresponds to a respective character regardless of the current character input mode, and uses a character that matches the current character input mode and corresponds to the respective character. For example, in some embodiments, the electronic device receives a lowercase character "m" while the electronic device in an uppercase input mode, and enters an uppercase character "M" in the character input area of the display.

In some embodiments, the electronic device detects a fourth predefined finger gesture on the touch-sensitive surface (e.g., a three-finger swipe-up gesture or a three-finger swipe-down gesture), and changes the current character input mode from a first character input mode (e.g., a lowercase input mode) to a second character input mode (e.g., an upper case input mode) that is distinct from the first character input mode. Similarly, a user may circle through the plurality of character input modes by repeating the fourth predefined finger gesture on the touch-sensitive surface. For example, when the electronic device has four character input modes, in some embodiments, the electronic device changes the current character input mode from the second character input mode (e.g., the upper case input mode) to a third character input mode (e.g., the numbers input mode) in response to a second occurrence of the fourth predefined finger gesture on the touch-sensitive surface, and from the third character input mode (e.g., the numbers input mode) to a fourth character input mode (e.g., a symbols input mode) in response to a third occurrence of the fourth predefined finger gesture on the touch-sensitive surface. In some embodiments, the electronic device changes the current character input mode from the fourth character input mode (e.g., the symbols input mode) to the first character input mode (e.g., the lowercase input mode).

In some embodiments, the electronic device detects a fifth predefined finger gesture on the touch-sensitive surface (e.g., a three-finger swipe-down gesture or a three-finger swipe-up gesture) that is distinct from the fourth predefined finger gesture, and changes a current character input in an order reverse. For example, when the electronic device has four character input modes, in response to detecting the fifth predefined finger gesture on the touch-sensitive surface, the electronic device changes the current character input from the first character input mode (e.g., the lowercase input mode) to the fourth character input mode (e.g., the symbols input mode).

In some embodiments, while the electronic device is in the handwriting gesture input mode within the screen reader accessibility mode, the electronic device detects a predefined input (e.g., selection of an icon, rotor gesture, double tap, such as touch gesture 563, etc.), and, in response to detecting the predefined input, exits the handwriting gesture recognition mode. In some embodiments, when the electronic device exits the handwriting gesture recognition mode, the electronic device remains in the screen reader accessibility mode. In some embodiments, the electronic device exits the handwriting gesture recognition mode, regardless of the predefined input, after a predefined time period has lapsed since a last gesture input corresponding to a character has been received.

It should be understood that the particular order in which the operations in FIGS. 10A-10B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600, 700, 800, and 900 (e.g., FIGS. 6A-6B, 7A-7C, 8A-8B, and 9A-9C respectively) are also applicable in an analogous manner to method 1000 described above with respect to FIGS. 10A-10B. For example, the respective path corresponding to the respective character described above with reference to method 1000 may have one or more of the characteristics of the respective path corresponding to the respective character described herein with reference to methods 600, 700, 800, and 900. For brevity, these details are not repeated here.

Figure 11:
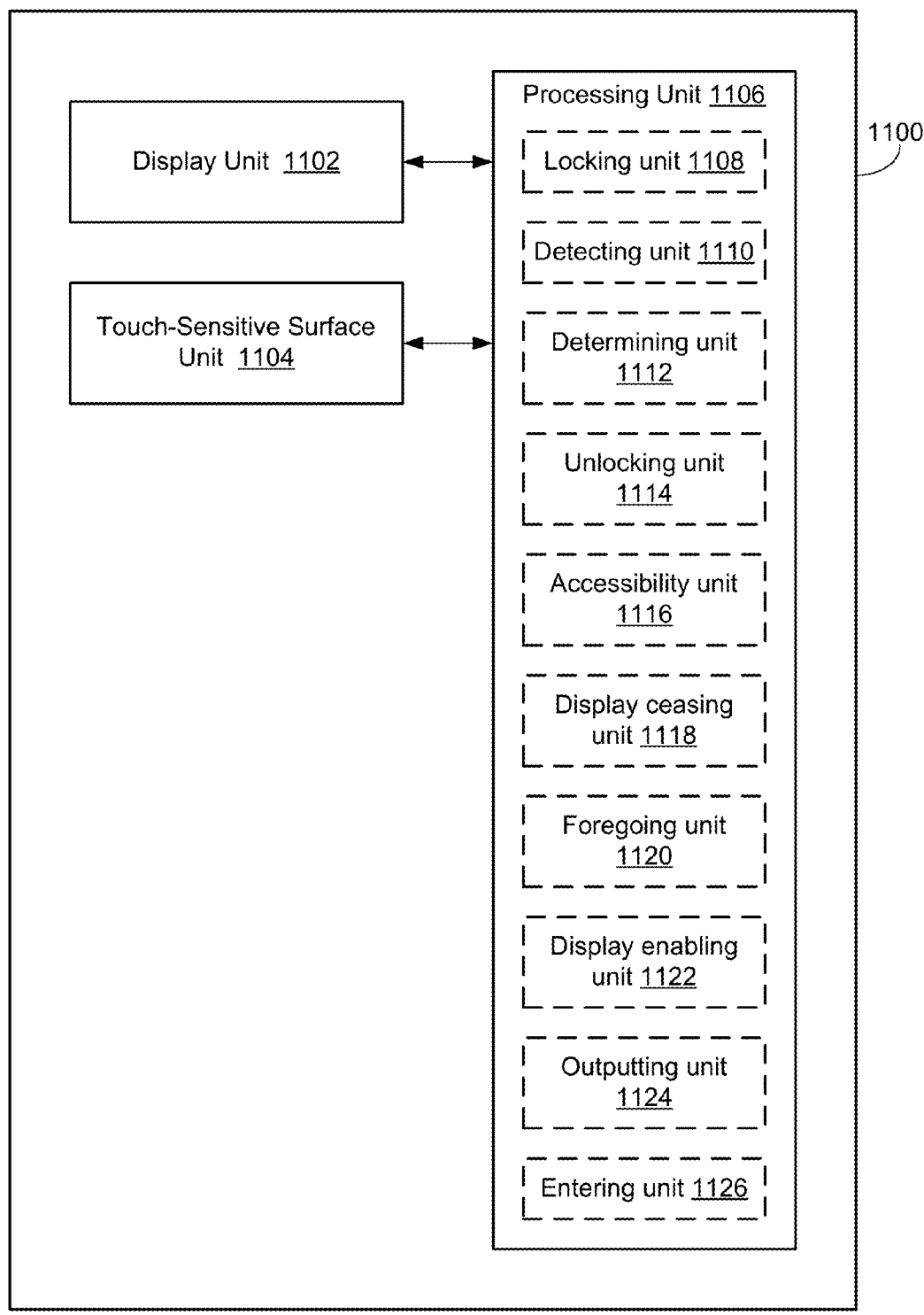
FIG. 11 is a functional block diagram of an electronic device in accordance with some embodiments.

In accordance with some embodiments, FIG. 11 shows a functional block diagram of an electronic device 1100 configured in accordance with the principles of the invention as described above. The functional blocks of the device may be implemented by hardware, software, or a combination of hardware and software to carry out the principles of the invention. It is understood by persons of skill in the art that the functional blocks described in FIG. 11 may be combined or separated into sub-blocks to implement the principles of the invention as described above. Therefore, the description herein may support any possible combination or separation or further definition of the functional blocks described herein.

As shown in FIG. 11, electronic device 1100 includes display unit 1102 configured to display a passcode screen for receiving a passcode while electronic device 1100 is in a locked, passcode-protected state with a screen reader accessibility mode turned on, the passcode including a predefined sequence of characters, the passcode screen including a plurality of character icons. Electronic device 1100 also includes touch-sensitive surface unit 1104 configured to detect a sequence of gestures on touch-sensitive surface unit 1104 that correspond to characters, wherein a respective gesture of the sequence of gestures that corresponds to a respective character is a single finger gesture that moves across touch-sensitive surface unit 1104 along a respective path that corresponds to the respective character. Electronic device 1100 further includes processing unit 1106 coupled to display unit 1102 and touch-sensitive surface unit 1104. In some embodiments, processing unit 1106 includes locking unit 1108, detecting unit 1110, determining unit 1112, unlocking unit 1114, accessibility unit 1116, display ceasing unit 1118, foregoing unit 1120, display enabling unit 1122, outputting unit 1124, and entering unit 1126.

Processing unit 1106 is configured to determine whether the detected sequence of gestures corresponds to the predefined sequence of characters in the passcode (e.g., with determining unit 1112); in response to determining that the detected sequence of gestures corresponds to the predefined sequence of characters in the passcode: unlock electronic device 1100 (e.g., with unlocking unit 1114); and maintain electronic device 1100 in the screen reader accessibility mode (e.g., with accessibility unit 1116); and, in response to determining that the detected sequence of gestures does not correspond to the predefined sequence of characters in the passcode: maintain electronic device 1100 in the locked, passcode-protected state with the screen reader accessibility mode turned on (e.g., with locking unit 1108 and accessibility unit 1116).

In some embodiments, the respective path traverses one or more locations on touch-sensitive surface unit 1104 that correspond to one or more character icons of the plurality of character icons without activating the one or more character icons.

In some embodiments, the respective path is in the shape of the respective character.

In some embodiments, the respective gesture is independent of contacting a location on touch-sensitive surface unit 1104 that corresponds to a character icon of the plurality of character icons associated with the respective character.

In some embodiments, the respective gesture is independent of contacting a location on touch-sensitive surface unit 1104 that corresponds to any of the plurality of character icons.

In some embodiments, processing unit 1106 is configured to, in response to determining that the detected sequence of gestures corresponds to the predefined sequence of characters in the passcode, cease to display the passcode screen (e.g., with display ceasing unit 1118).

In some embodiments, processing unit 1106 is configured to, while detecting the sequence of gestures on touch-sensitive surface unit 1104 that correspond to characters (e.g., with detecting unit 1110), forego outputting audible accessibility information that corresponds to the characters (e.g., with foregoing unit 1120).

In some embodiments, processing unit 1106 is configured to, in response to determining that the detected sequence of gestures corresponds to the predefined sequence of characters in the passcode, cease to display the passcode screen (e.g., with display ceasing unit 1118); and enable display of an application launcher screen that includes a plurality of application icons (e.g., with display enabling unit 1122, on display unit 1102).

In some embodiments, processing unit 1106 is configured to, while enabling display of the passcode screen (e.g., with display enabling unit 1122), forego outputting audible accessibility information associated with a respective character when the respective character is entered (e.g., with foregoing unit 1120). Processing unit 1106 is also configured to, while electronic device 1100 is unlocked and in the screen reader accessibility mode, detect a single finger gesture on touch-sensitive surface unit 1104 at a location that corresponds to a respective user interface element of the home screen (e.g., with detecting unit 1110); and, in response to detecting the single finger gesture, output audible accessibility information associated with the respective user interface element (e.g., outputting unit 1124).

In some embodiments, processing unit 1106 is configured to, while electronic device 1100 is in the locked, passcode-protected state with the screen reader accessibility mode turned on, prior to detecting the sequence of gestures on touch-sensitive surface unit 1104 that correspond to characters in the passcode, detect a predefined input (e.g., with detecting unit 1110); and, in response to detecting the predefined input, enter a handwriting gesture recognition mode within the screen reader accessibility mode (e.g., with entering unit 1126).

In some embodiments, processing unit 1106 is configured to, while electronic device 1100 is in the locked, passcode-protected state with the screen reader accessibility mode turned on: detect a single finger gesture on touch-sensitive surface unit 1104 at a location that corresponds to a character icon of the plurality of character icons (e.g., with detecting unit 1110); and, in response to detecting the single finger gesture on touch-sensitive surface unit 1104 at the location that corresponds to the character icon: enter a respective character that corresponds to the character icon in a received passcode (e.g., with entering unit 1126); and forego outputting audible accessibility information associated with the respective character (e.g., with foregoing unit 1120).

Figure 12:
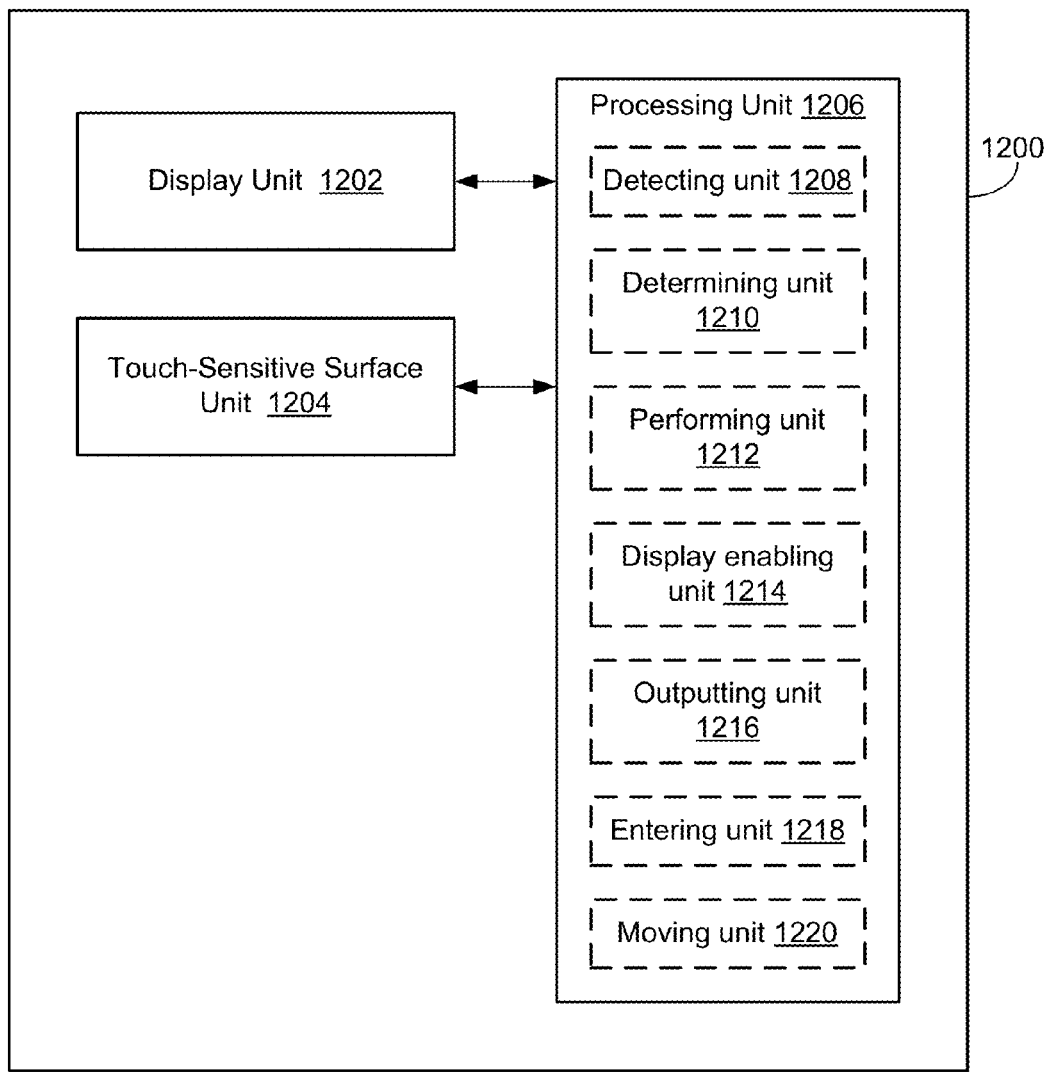
FIG. 12 is a functional block diagram of an electronic device in accordance with some embodiments.

In accordance with some embodiments, FIG. 12 shows a functional block diagram of electronic device 1200 configured in accordance with the principles of the invention as described above. The functional blocks of the device may be implemented by hardware, software, or a combination of hardware and software to carry out the principles of the invention. It is understood by persons of skill in the art that the functional blocks described in FIG. 12 may be combined or separated into sub-blocks to implement the principles of the invention as described above. Therefore, the description herein may support any possible combination or separation or further definition of the functional blocks described herein.

As shown in FIG. 12, electronic device 1200 includes display unit 1202 configured to display an application launcher screen while electronic device 1200 is in a screen reader accessibility mode, the application launcher screen including a plurality of application icons, wherein a respective application icon corresponds to a respective application stored in electronic device 1200. Electronic device 1200 also includes touch-sensitive surface unit 1204 configured to detect a sequence of one or more gestures on touch-sensitive surface unit 1204 that correspond to one or more characters, wherein a respective gesture of the one or more gestures that corresponds to a respective character of the one or more characters is a single finger gesture that moves across touch-sensitive surface unit 1204 along a respective path that corresponds to the respective character. Electronic device 1200 further includes processing unit 1206 coupled to display unit 1202 and touch-sensitive surface unit 1204. In some embodiments, processing unit 1206 includes detecting unit 1208, determining unit 1210, performing unit 1212, display enabling unit 1214, outputting unit 1216, entering unit 1218, and moving unit 1220.

Processing unit 1206 is configured to: determine whether the detected sequence of one or more gestures corresponds to a respective application icon of the plurality of application icons (e.g., with determining unit 1210); and, in response to determining that the detected sequence of one or more gestures corresponds to the respective application icon of the plurality of application icons, perform a predefined operation associated with the respective application icon (e.g., with performing unit 1212).

In some embodiments, the respective path traverses one or more locations on touch-sensitive surface unit 1204 that correspond to one or more application icons of the plurality of application icons without activating the one or more application icons.

In some embodiments, the respective path is in the shape of the respective character.

In some embodiments, the respective gesture is independent of contacting a location on touch-sensitive surface unit 1204 that corresponds to the respective application icon of the plurality of application icons.

In some embodiments, the respective gesture is independent of contacting a location on touch-sensitive surface unit 1204 that corresponds to any of the plurality of application icons.

In some embodiments, processing unit 1206 is configured to: enable display of a current focus on the respective application icon (e.g., with display enabling unit 1214 on display unit 1202); and output audible accessibility information associated with the respective application icon (e.g., with outputting unit 1216).

In some embodiments, processing unit 1206 is configured to enable display of a user interface of a respective application corresponding to the respective application icon (e.g., with display enabling unit 1214 on display unit 1202).

In some embodiments, processing unit 1206 is configured to concurrently detect a second predefined input while detecting at least a portion of the sequence of one or more gestures (e.g., with detecting unit 1208).

In some embodiments, processing unit 1206 is configured to, in response to determining that the detected sequence of one or more gestures does not correspond to any of the plurality of application icons, output audible accessibility information indicating that none of the plurality of application icons corresponds to the detected sequence of one or more gestures (e.g., with outputting unit 1216).

In some embodiments, processing unit 1206 is configured to, while electronic device 1200 is in the screen reader accessibility mode, prior to detecting the sequence of one or more gestures on touch-sensitive surface unit 1204 that correspond to one or more characters: detect a predefined input (e.g., with detecting unit 1208); and, in response to detecting the predefined input, enter a handwriting gesture recognition mode within the screen reader accessibility mode (e.g., with entering unit 1218).

In some embodiments, processing unit 1206 is configured to, while electronic device is in the screen reader accessibility mode and the application launcher screen is displayed: enable display of a first application icon of the plurality of application icons next to a second application icon of the plurality of application icons (e.g., with display enabling unit 1214 on display unit 1202); enable display of a current focus on the first application icon of the plurality of application icons (e.g., with display enabling unit 1214 on display unit 1202); detect a finger gesture on touch-sensitive surface unit 1204 (e.g., with detecting unit 1208), wherein the finger gesture is independent of contacting a location on touch-sensitive surface unit 1204 that corresponds to the second application icon of the plurality of application icons; and, in response to detecting the finger gesture: move the current focus from the first application icon to the second application icon (e.g., with moving unit 1220); and output audible accessibility information associated with the second application icon (e.g., with outputting unit 1216).

In some embodiments, processing unit 1206 is configured to, while electronic device 1200 is in the screen reader accessibility mode and the application launcher screen is displayed: detect a single finger gesture on touch-sensitive surface unit 1204 at a location that corresponds to a third application icon of the plurality of application icons (e.g., with detecting unit 1208); and, in response to detecting the single finger gesture on touch-sensitive surface unit 1204 at the location that corresponds to the third application icon, perform a predefined operation associated with the third application icon (e.g., with performing unit 1212).

In some embodiments, processing unit 1206 is configured to, while electronic device 1200 is in the screen reader accessibility mode and the application launcher screen is displayed, prior to determining that the detected sequence of one or more gestures corresponds to the respective application icon, output audible accessibility information indicating the number of applications consistent with characters that correspond to respective gestures detected thus far (e.g., with outputting unit 1216).

Figure 13:
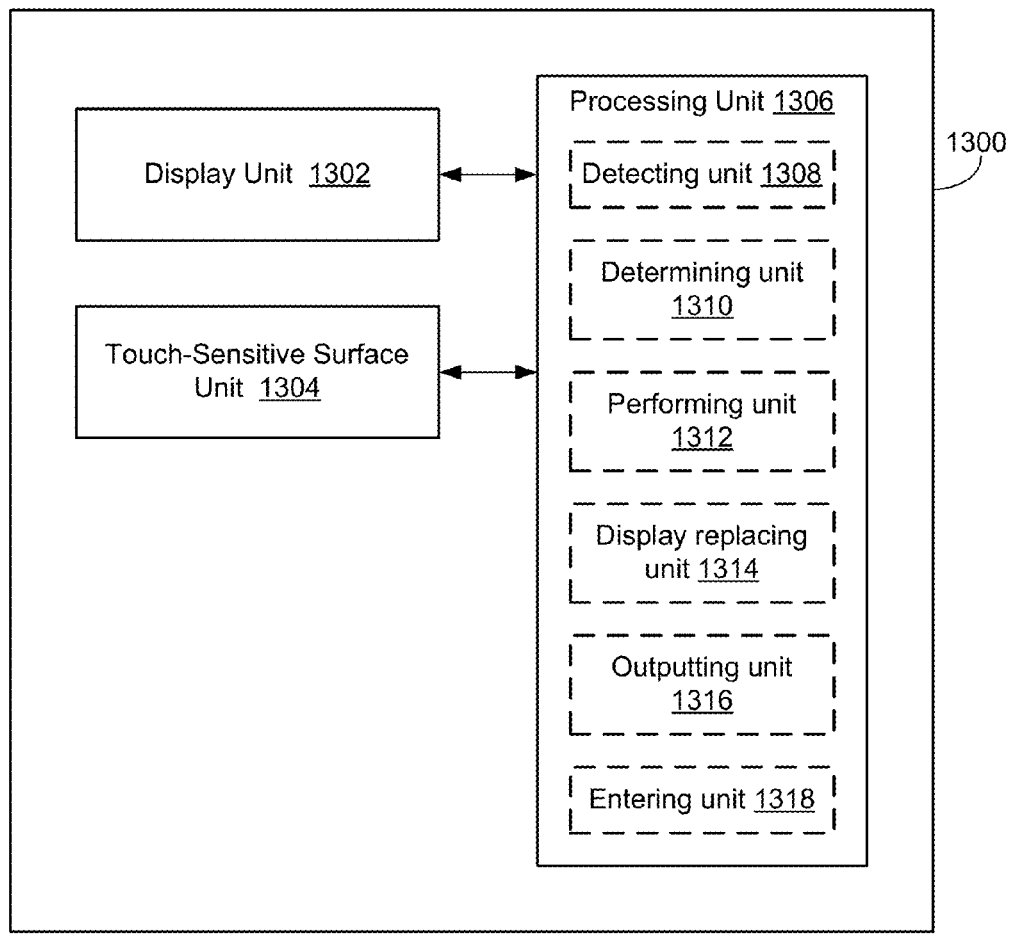
FIG. 13 is a functional block diagram of an electronic device in accordance with some embodiments.

In accordance with some embodiments, FIG. 13 shows a functional block diagram of electronic device 1300 configured in accordance with the principles of the invention as described above. The functional blocks of the device may be implemented by hardware, software, or a combination of hardware and software to carry out the principles of the invention. It is understood by persons of skill in the art that the functional blocks described in FIG. 13 may be combined or separated into sub-blocks to implement the principles of the invention as described above. Therefore, the description herein may support any possible combination or separation or further definition of the functional blocks described herein.

As shown in FIG. 13, electronic device 1300 includes display unit 1302 configured to display at least a first portion of a list of entries while electronic device 1300 is in a screen reader accessibility mode, the list including a plurality of entries. Electronic device 1300 also includes touch-sensitive surface unit 1304 configured to detect a sequence of one or more gestures on touch-sensitive surface unit 1304 that correspond to one or more characters, wherein a respective gesture of the one or more gestures that corresponds to a respective character is a single finger gesture that moves across touch-sensitive surface unit 1304 along a respective path that corresponds to the respective character. Electronic device 1300 further includes processing unit 1306 coupled to display unit 1302 and touch-sensitive surface unit 1304. In some embodiments, processing unit 1306 includes detecting unit 1308, determining unit 1310, performing unit 1312, display replacing unit 1314, outputting unit 1316, and entering unit 1318.

Processing unit 1306 configured to: determine whether the detected sequence of one or more gestures correspond to a respective entry of the list of entries (e.g., with determining unit 1310); and, in response to determining that the detected sequence of one or more gestures corresponds to the respective entry of the list of entries, perform a predefined operation associated with the respective entry (e.g., with performing unit 1312).

In some embodiments, the respective path traverses one or more locations on touch-sensitive surface unit 1304 that correspond to one or more entries of the list of entries without activating the one or more entries.

In some embodiments, the respective path is in the shape of the respective character.

In some embodiments, the respective gesture is independent of contacting a location on touch-sensitive surface unit 1304 that corresponds to the respective entry of the plurality of entries.

In some embodiments, the respective gesture is independent of contacting a location on touch-sensitive surface unit 1304 that corresponds to any of the plurality of entries.

In some embodiments, processing unit 1306 is configured to output audible accessibility information associated with the respective entry (e.g., with outputting unit 1316).

In some embodiments, processing unit 1306 is configured to replace the display of the first portion of the list with display of a second portion of the list (e.g., with display replacing unit 1314 on display unit 1302), the second portion including the respective entry, wherein the second portion of the list is distinct from the first portion of the list.

In some embodiments, processing unit 1306 is configured to replace the display of the first portion of the list with display of at least a portion of a second list (e.g., with display replacing unit 1314 on display unit 1302), the second list including one or more respective entries of the list of entries that correspond to the one or more characters, wherein the second list includes the respective entry.

In some embodiments, processing unit 1306 is configured to: determine that the second list includes a plurality of entries (e.g., with determining unit 1310); and, in accordance with a determination that the second list includes a plurality of entries, output audible accessibility information indicating a number of entries in the second list (e.g., with outputting unit 1316).

In some embodiments, processing unit 1306 is configured to, while electronic device 1300 is in the screen reader accessibility mode, prior to detecting the sequence of one or more gestures on touch-sensitive surface unit 1304 that correspond to one or more characters: detect a predefined input (e.g., with detecting unit 1308); and, in response to detecting the predefined input, enter a handwriting gesture recognition mode within the screen reader accessibility mode (e.g., with entering unit 1318).

Figure 14:
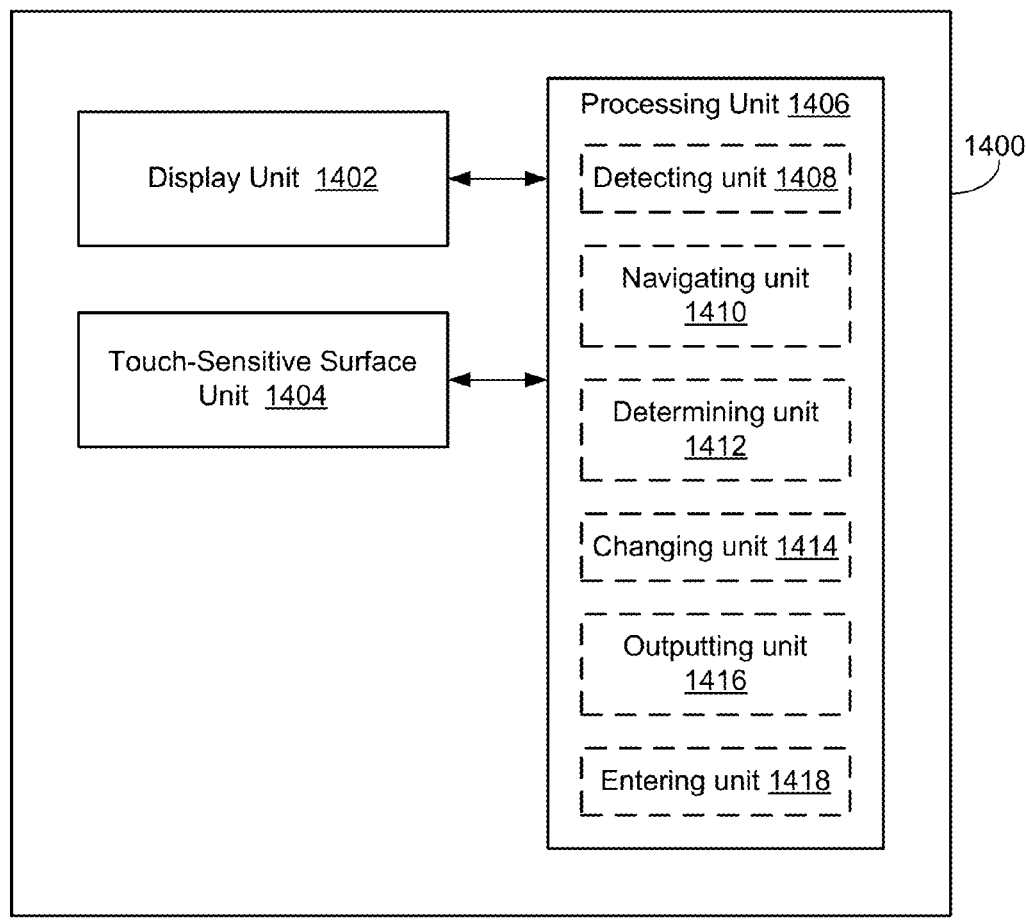
FIG. 14 is a functional block diagram of an electronic device in accordance with some embodiments.

In accordance with some embodiments, FIG. 14 shows a functional block diagram of electronic device 1400 configured in accordance with the principles of the invention as described above. The functional blocks of the device may be implemented by hardware, software, or a combination of hardware and software to carry out the principles of the invention. It is understood by persons of skill in the art that the functional blocks described in FIG. 14 may be combined or separated into sub-blocks to implement the principles of the invention as described above. Therefore, the description herein may support any possible combination or separation or further definition of the functional blocks described herein.

As shown in FIG. 14, electronic device 1400 includes display unit 1402 configured to display at least a portion of a web page while electronic device 1400 is in a screen reader accessibility mode, the web page including a plurality of user interface elements; touch-sensitive surface unit 1404 configured to detect a first navigation gesture on touch-sensitive surface unit 1404; and processing unit 1406 coupled to the display unit 1402 and touch-sensitive surface unit 1404. In some embodiments, processing unit 1406 includes detecting unit 1408, navigating unit 1410, determining unit 1412, changing unit 1414, outputting unit 1416, and entering unit 1418.

Processing unit 1406 is configured to, in response to detecting the first navigation gesture on touch-sensitive surface unit 1404, navigate to a first set of one or more user interface elements of the plurality of user interface elements that corresponds to a current navigable unit type (e.g., with navigating unit 1410), wherein the current navigable unit type is set to a first navigable unit type selected from a plurality of predefined navigable unit types. Processing unit 1406 is configured to detect a navigation setting gesture on touch-sensitive surface unit 1404 that corresponds to a respective character (e.g., with detecting unit 1408), wherein the navigation setting gesture that corresponds to the respective character is a single finger gesture that moves across touch-sensitive surface unit 1404 along a respective path that corresponds to the respective character. Processing unit 1406 is configured to determine whether the navigation setting gesture corresponds to a second navigable unit type of the plurality of predefined navigable unit types (e.g., with determining unit 1412); and, in response to determining that the navigation setting gesture corresponds to the second navigable unit type of the plurality of predefined navigable unit types: change the current navigable unit type from the first navigable unit type to the second navigable unit type (e.g., with changing unit 1414); and output audible accessibility information indicating that the second navigable unit type has been selected (e.g., with outputting unit 1416). Processing unit 1406 is configured to, after changing the current navigable unit type from the first navigable unit type to the second navigable unit type, detect a second navigation gesture on touch-sensitive surface unit 1404 (e.g., with detecting unit 1408); and, in response to detecting the second navigation gesture on touch-sensitive surface unit 1404, navigate to a second set of one or more user interface elements of the plurality of user interface elements that corresponds to the second navigable unit type (e.g., with navigating unit 1410).

In some embodiments, the respective path traverses one or more locations on touch-sensitive surface unit 1404 that correspond to one or more user interface elements of the plurality of user interface elements in the web page without activating the one or more user interface elements.

In some embodiments, the respective path is in the shape of the respective character.

In some embodiments, the respective gesture is independent of contacting a location on touch-sensitive surface unit 1404 that corresponds to any of the plurality of user interface elements.

In some embodiments, the plurality of predefined navigable unit types includes four or more navigable unit types in a circular sequence so that a navigable unit type that has a second position in the circular sequence is deemed to be adjacent to a navigable unit type that has a first position in the circular sequence, the navigable unit type that has a third position in the circular sequence is deemed to be adjacent to the navigable unit type that has the second position in the circular sequence, and a navigable unit type that has a last position in the circular sequence is deemed to be adjacent to the navigable unit type that has the first position in the circular sequence. The first navigable unit type is not adjacent to the second navigable unit type in the circular sequence.

In some embodiments, processing unit 1406 is configured to detect a second navigation setting gesture on touch-sensitive surface unit 1404 (e.g., with detecting unit 1408), wherein the second navigation setting gesture is a multi-finger gesture, and the second navigation setting gesture is independent of contacting a location on touch-sensitive surface unit 1404 that corresponds to any of the plurality of user interface elements. Processing unit 1406 is configured to, in response to detecting the second navigation setting gesture on touch-sensitive surface unit 1404: change the current navigable unit type from the second navigable unit type to a third navigable unit type that is adjacent to the second navigable unit type in the sequence of the plurality of navigable unit types (e.g., with changing unit 1414); and output accessibility information about the third navigable unit type (e.g., with outputting unit 1416).

In some embodiments, processing unit 1406 is configured to, while electronic device 1400 is in the screen reader accessibility mode, prior to detecting the navigation setting gesture on touch-sensitive surface unit 1404: detect a predefined input (e.g., with detecting unit 1408); and, in response to detecting the predefined input, enter a handwriting gesture recognition mode within the screen reader accessibility mode (e.g., with entering unit 1418).

In some embodiments, a label for the second navigable unit type starts with the respective character.

Figure 15:
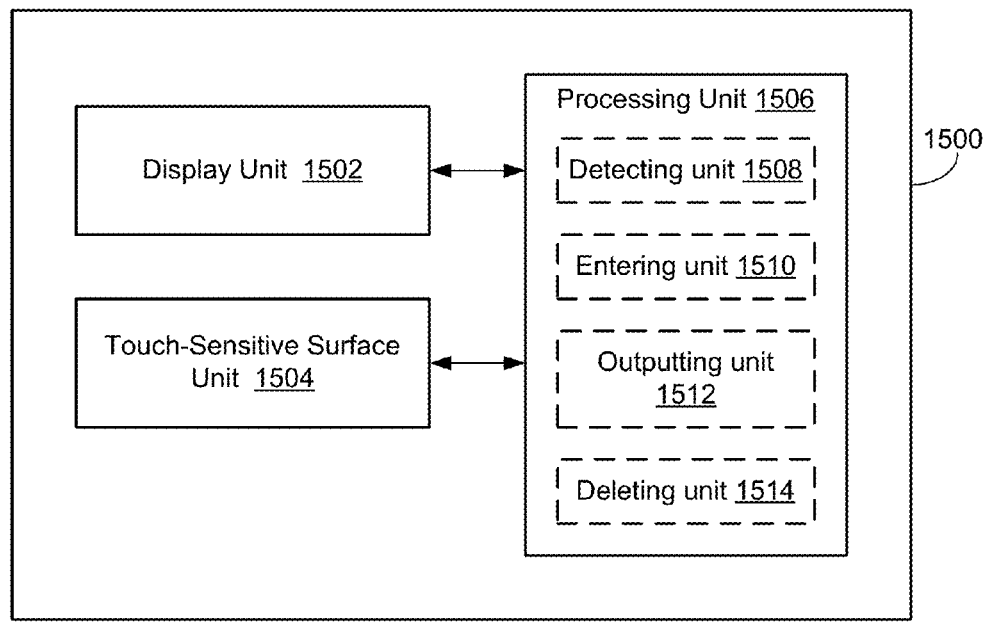
FIG. 15 is a functional block diagram of an electronic device in accordance with some embodiments.

In accordance with some embodiments, FIG. 15 shows a functional block diagram of electronic device 1500 configured in accordance with the principles of the invention as described above. The functional blocks of the device may be implemented by hardware, software, or a combination of hardware and software to carry out the principles of the invention. It is understood by persons of skill in the art that the functional blocks described in FIG. 15 may be combined or separated into sub-blocks to implement the principles of the invention as described above. Therefore, the description herein may support any possible combination or separation or further definition of the functional blocks described herein.

As shown in FIG. 15, electronic device 1500 includes display unit 1502 configured to display a character input area and a keyboard while electronic device 1500 is in a screen reader accessibility mode, the keyboard including a plurality of key icons. Electronic device 1500 also includes touch-sensitive surface unit 1504 configured to detecting a sequence of one or more gestures on touch-sensitive surface unit 1504 that correspond to one or more characters, wherein a respective gesture of the one or more gestures that corresponds to a respective character is a single finger gesture that moves across touch-sensitive surface unit 1504 along a respective path that corresponds to the respective character, and the respective path traverses one or more locations on touch-sensitive surface unit 1504 that correspond to one or more key icons of the plurality of key icons without activating the one or more key icons. Electronic device further includes processing unit 1506 coupled to display unit 1502 and touch-sensitive surface unit 1504. In some embodiments, processing unit 1506 includes detecting unit 1508, entering unit 1510, outputting unit 1512, and deleting unit 1514.

Processing unit 1506 is configured to, in response to detecting the respective gesture, enter the corresponding respective character in the character input area of display unit 1502 (e.g., with entering unit 1510).

In some embodiments, the respective path is in the shape of the respective character.

In some embodiments, the respective gesture is independent of contacting a location on touch-sensitive surface unit 1504 that corresponds to a key icon of the plurality of key icons associated with the respective character.

In some embodiments, the respective gesture is independent of contacting a location on touch-sensitive surface unit 1504 that corresponds to any of the plurality of key icons.

In some embodiments, processing unit 1506 is configured to, in response to detecting the respective gesture, output audible accessibility information about the corresponding respective character (e.g., with outputting unit 1512).

In some embodiments, processing unit 1506 is configured to detect a first predefined finger gesture on touch-sensitive surface unit 1504 (e.g., with detecting unit 1508), wherein the first predefined finger gesture traverses one or more locations on touch-sensitive surface unit 1504 that correspond to one or more key icons of the plurality of key icons without activating the one or more key icons. Processing unit 1506 is also configured to, in response to detecting the first predefined finger gesture on touch-sensitive surface unit 1504: enter a space in the character input area at a current location of a cursor (e.g., with entering unit 1510), and output audible accessibility information indicating that a space has been entered (e.g., with outputting unit 1512).

In some embodiments, the first predefined finger gesture is independent of contacting a location on touch-sensitive surface unit 1504 that corresponds to a space key icon in the plurality of key icons.

In some embodiments, processing unit 1506 is configured to detect a second predefined finger gesture on touch-sensitive surface unit 1504 (e.g., with detecting unit 1508), wherein the second predefined finger gesture traverses one or more locations on touch-sensitive surface unit 1504 that correspond to one or more key icons of the plurality of key icons without activating the one or more key icons. Processing unit 1506 is also configured to, in response to detecting the second predefined finger gesture on touch-sensitive surface unit 1504: delete a character in the character input area at a current location of a cursor (e.g., with deleting unit 1514), and output audible accessibility information indicating that a character has been deleted (e.g., with outputting unit 1512).

In some embodiments, the second predefined finger gesture is independent of contacting a location on touch-sensitive surface unit 1504 that corresponds to a backspace key icon in the plurality of key icons.

In some embodiments, processing unit 1506 is configured to, while electronic device 1500 is in the screen reader accessibility mode, prior to detecting a sequence of one or more gestures on touch-sensitive surface unit 1504 that correspond to one or more characters: detect a predefined input (e.g., with detecting unit 1508); and, in response to detecting the predefined input, enter a handwriting gesture recognition mode within the screen reader accessibility mode (e.g., with entering unit 1510).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6B, 7A-7C, 8A-8B, 9A-9C, and 10A-10B may be implemented by components depicted in FIGS. 1A-1B. For example, detection operation 606, determining operation 620, and unlocking operation 624 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    while an electronic device with a display and a touch-sensitive surface is in a locked, passcode-protected state with a screen reader accessibility mode turned on:
        displaying a passcode screen for receiving a passcode on the display, the passcode including a predefined sequence of characters, the passcode screen including a plurality of character icons;
        detecting a sequence of gestures on the touch-sensitive surface that correspond to characters, wherein:
            a respective gesture of the sequence of gestures that corresponds to a respective character is a single finger gesture that moves across the touch-sensitive surface along a respective path that corresponds to the respective character;
        determining whether the detected sequence of gestures corresponds to the predefined sequence of characters in the passcode;
        in response to determining that the detected sequence of gestures corresponds to the predefined sequence of characters in the passcode:
            unlocking the electronic device; and
            maintaining the electronic device in the screen reader accessibility mode; and,
        in response to determining that the detected sequence of gestures does not correspond to the predefined sequence of characters in the passcode:
            maintaining the electronic device in the locked, passcode-protected state with the screen reader accessibility mode turned on.

2. The method of claim 1, wherein:
    the respective path traverses one or more locations on the touch-sensitive surface that correspond to one or more character icons of the plurality of character icons without activating the one or more character icons.

3. The method of claim 1, wherein the respective path is in the shape of the respective character.

4. The method of claim 1, wherein the respective gesture is independent of contacting a location on the touch-sensitive surface that corresponds to a character icon of the plurality of character icons associated with the respective character.

5. The method of claim 1, wherein the respective gesture is independent of contacting a location on the touch-sensitive surface that corresponds to any of the plurality of character icons.

6. The method of claim 1, including:
in response to determining that the detected sequence of gestures corresponds to the predefined sequence of characters in the passcode:
ceasing to display the passcode screen.

7. The method of claim 1, including:
while detecting the sequence of gestures on the touch-sensitive surface that correspond to characters:
foregoing outputting audible accessibility information that corresponds to the characters.

8. The method of claim 1, including:
in response to determining that the detected sequence of gestures corresponds to the predefined sequence of characters in the passcode:
ceasing to display the passcode screen; and
displaying an application launcher screen that includes a plurality of application icons.

9. The method of claim 8, including:
while displaying the passcode screen, foregoing outputting audible accessibility information associated with a respective character when the respective character is entered; and
while the device is unlocked and in the screen reader accessibility mode:
detecting a single finger gesture on the touch-sensitive surface at a location that corresponds to a respective application icon of the application launcher screen; and,
in response to detecting the single finger gesture, outputting audible accessibility information associated with the respective application icon.

10. The method of claim 1, including:
while the electronic device is in the locked, passcode-protected state with the screen reader accessibility mode turned on, prior to detecting the sequence of gestures on the touch-sensitive surface that correspond to characters in the passcode:
detecting a predefined input; and,
in response to detecting the predefined input, entering a handwriting gesture recognition mode within the screen reader accessibility mode.

11. The method of claim 1, including:
while the electronic device is in the locked, passcode-protected state with the screen reader accessibility mode turned on:
detecting a single finger gesture on the touch-sensitive surface at a location that corresponds to a character icon of the plurality of character icons; and,
in response to detecting the single finger gesture on the touch-sensitive surface at the location that corresponds to the character icon:
entering a respective character that corresponds to the character icon in a received passcode; and
foregoing outputting audible accessibility information associated with the respective character.

12. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
while the electronic device is in a locked, passcode-protected state with a screen reader accessibility mode turned on:
displaying a passcode screen for receiving a passcode on the display, the passcode including a predefined sequence of characters, the passcode screen including a plurality of character icons;
detecting a sequence of gestures on the touch-sensitive surface that correspond to characters, wherein:
a respective gesture of the sequence of gestures that corresponds to a respective character is a single finger gesture that moves across the touch-sensitive surface along a respective path that corresponds to the respective character;
determining whether the detected sequence of gestures corresponds to the predefined sequence of characters in the passcode;
in response to determining that the detected sequence of gestures corresponds to the predefined sequence of characters in the passcode:
unlocking the electronic device; and
maintaining the electronic device in the screen reader accessibility mode; and,
in response to determining that the detected sequence of gestures does not correspond to the predefined sequence of characters in the passcode:
maintaining the electronic device in the locked, passcode-protected state with the screen reader accessibility mode turned on.

13. The electronic device of claim 12, wherein:
the respective path traverses one or more locations on the touch-sensitive surface that correspond to one or more character icons of the plurality of character icons without activating the one or more character icons.

14. The electronic device of claim 12, wherein the respective gesture is independent of contacting a location on the touch-sensitive surface that corresponds to a character icon of the plurality of character icons associated with the respective character.

15. A non-transitory computer readable storage medium storing one or more programs, the one or more programs comprising instructions, which when executed by an electronic device with a display and a touch-sensitive surface, cause the device to:
while the electronic device is in a locked, passcode-protected state with a screen reader accessibility mode turned on:
display a passcode screen for receiving a passcode on the display, the passcode including a predefined sequence of characters, the passcode screen including a plurality of character icons;
detect a sequence of gestures on the touch-sensitive surface that correspond to characters, wherein:
a respective gesture of the sequence of gestures that corresponds to a respective character is a single finger gesture that moves across the touch-sensitive surface along a respective path that corresponds to the respective character;
determine whether the detected sequence of gestures corresponds to the predefined sequence of characters in the passcode;

in response to determining that the detected sequence of gestures corresponds to the predefined sequence of characters in the passcode:
  unlock the electronic device; and
  maintain the electronic device in the screen reader accessibility mode; and,
in response to determining that the detected sequence of gestures does not correspond to the predefined sequence of characters in the passcode:
  maintain the electronic device in the locked, passcode-protected state with the screen reader accessibility mode turned on.

16. The computer readable storage medium of claim 15, wherein:
the respective path traverses one or more locations on the touch-sensitive surface that correspond to one or more character icons of the plurality of character icons without activating the one or more character icons.

17. The computer readable storage medium of claim 15, wherein the respective gesture is independent of contacting a location on the touch-sensitive surface that corresponds to a character icon of the plurality of character icons associated with the respective character.

18. A graphical user interface on an electronic device with a display and a touch-sensitive surface, a memory, and one or more processors to execute one or more programs stored in the memory, the graphical user interface comprising:
a passcode screen for receiving a passcode displayed on the display while the electronic device is in a locked, passcode-protected state with a screen reader accessibility mode turned on, the passcode including a predefined sequence of characters, the passcode screen including a plurality of character icons;
wherein:
  a sequence of gestures that correspond to characters is detected on the touch-sensitive surface, wherein:
    a respective gesture of the sequence of gestures that corresponds to a respective character is a single finger gesture that moves across the touch-sensitive surface along a respective path that corresponds to the respective character;
  whether the detected sequence of gestures corresponds to the predefined sequence of characters in the passcode is determined;
  in response to determining that the detected sequence of gestures corresponds to the predefined sequence of characters in the passcode:
    the electronic device is unlocked; and
    the electronic device is maintained in the screen reader accessibility mode; and,
  in response to determining that the detected sequence of gestures does not correspond to the predefined sequence of characters in the passcode:
    the electronic device is maintained in the locked, passcode-protected state with the screen reader accessibility mode turned on.

19. The graphical user interface of claim 18, wherein:
the respective path traverses one or more locations on the touch-sensitive surface that correspond to one or more character icons of the plurality of character icons without activating the one or more character icons.

20. The graphical user interface of claim 18, wherein the respective gesture is independent of contacting a location on the touch-sensitive surface that corresponds to a character icon of the plurality of character icons associated with the respective character.

* * * * *